(12) United States Patent
Kumamoto et al.

(10) Patent No.: US 12,325,801 B2
(45) Date of Patent: Jun. 10, 2025

(54) INK JET INK SET, INK JET RECORDING METHOD, AND INK JET RECORDING APPARATUS

(71) Applicant: Seiko Epson Corporation, Toyko (JP)

(72) Inventors: Kiyomi Kumamoto, Shiojiri (JP); Yusuke Mizutaki, Shiojiri (JP); Jun Ito, Shimosuwa (JP); Tomohito Nakano, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 550 days.

(21) Appl. No.: 17/162,068

(22) Filed: Jan. 29, 2021

(65) Prior Publication Data
US 2021/0246324 A1    Aug. 12, 2021

(30) Foreign Application Priority Data
Jan. 31, 2020   (JP) .................................. 2020-014621

(51) Int. Cl.
*C09D 11/328*  (2014.01)
*B41J 2/14*    (2006.01)
(Continued)

(52) U.S. Cl.
CPC ........... *C09D 11/328* (2013.01); *B41J 2/1433* (2013.01); *C08L 71/02* (2013.01); *C09B 47/063* (2013.01); *C09D 11/322* (2013.01)

(58) Field of Classification Search
CPC ..... C09D 11/328; C09D 11/322; C09D 11/38; C09D 11/40; B41J 2/1433; C08L 71/02; C09B 47/063
See application file for complete search history.

(56) References Cited

U.S. PATENT DOCUMENTS

2003/0193555 A1   10/2003   Koga et al.
2003/0227529 A1   12/2003   Hosono
(Continued)

FOREIGN PATENT DOCUMENTS

JP   2003-246949 A   9/2003
JP   2005179210 A  *  7/2005   ........... C09D 11/324
(Continued)

OTHER PUBLICATIONS

English Machine Translation of JP2005179210A ("Machine_Translation_Oshita_JP_2005179210_A") (Year: 2005).*

(Continued)

*Primary Examiner* — Jennifer A Smith
*Assistant Examiner* — Jeffrey Eugene Barzach
(74) *Attorney, Agent, or Firm* — Harness, Dickey & Pierce, P.L.C.

(57) ABSTRACT

An ink jet ink set includes: an aqueous dye ink and an aqueous pigment ink, the ink jet ink set is an ink set to be used for an ink jet recording apparatus which has a first ejection port to eject the aqueous dye ink, a second ejection port to eject the aqueous pigment ink, and a cap to collectively cap the first ejection port and the second ejection port, the cap being composed of the same member as that forming the first ejection port and the second ejection port, the aqueous dye ink contains a dye and a poly(oxyalkylene) alkyl ether, the dye includes a copper phthalocyanine compound having two or less benzene ring structures other than a phthalocyanine skeleton, and the aqueous pigment ink contains a self-dispersible pigment.

5 Claims, 2 Drawing Sheets

(51) Int. Cl.
*C08L 71/02* (2006.01)
*C09B 47/06* (2006.01)
*C09D 11/322* (2014.01)

(56) References Cited

U.S. PATENT DOCUMENTS

| | | | |
|---|---|---|---|
| 2004/0233263 A1* | 11/2004 | Goto | C09D 11/40 |
| | | | 347/100 |
| 2005/0235868 A1 | 10/2005 | Goto et al. | |
| 2005/0279246 A1 | 12/2005 | Ohira et al. | |
| 2010/0056704 A1 | 3/2010 | Iwamura et al. | |
| 2010/0058853 A1* | 3/2010 | Sadohara | G01N 33/32 |
| | | | 73/150 R |
| 2010/0242794 A1 | 9/2010 | Nagano | |
| 2011/0187770 A1 | 8/2011 | Aoyama et al. | |
| 2011/0292108 A1 | 12/2011 | Izumi et al. | |
| 2012/0081453 A1 | 4/2012 | Tsuzaka et al. | |
| 2013/0002757 A1 | 1/2013 | Aruga et al. | |
| 2013/0197144 A1 | 8/2013 | Katoh et al. | |
| 2014/0345494 A1* | 11/2014 | Miyake | C09D 11/40 |
| | | | 106/31.5 |
| 2015/0054885 A1* | 2/2015 | Sugiyama | D06P 1/525 |
| | | | 347/21 |
| 2015/0275010 A1 | 10/2015 | Tsuzaka | |
| 2016/0130454 A1* | 5/2016 | Ohori | C09B 47/0678 |
| | | | 106/31.49 |
| 2018/0001643 A1 | 1/2018 | Hama et al. | |
| 2019/0023926 A1* | 1/2019 | Kumamoto | C09D 11/324 |
| 2020/0216701 A1* | 7/2020 | Tateishi | C09B 31/30 |
| 2021/0292566 A1* | 9/2021 | Nagatsuka | C09D 11/328 |

FOREIGN PATENT DOCUMENTS

| | | |
|---|---|---|
| JP | 2005-314443 A | 11/2005 |
| JP | 2006-002094 A | 1/2006 |
| JP | 2010-084136 A | 4/2010 |
| JP | 2012-077187 A | 4/2012 |
| JP | 2013-010826 A | 1/2013 |
| JP | 2018-002858 A | 1/2018 |
| JP | 2018-150412 A | 9/2018 |
| JP | 2018-167462 A | 11/2018 |

OTHER PUBLICATIONS

"Newcol 1006." Nippon Nyukazai, Jan. 10, 2023, www.nipponnyukazai.co.jp/media/file/products/products_sds_en_0142.pdf. (Year: 2023).*

* cited by examiner

INK JET INK SET, INK JET RECORDING METHOD, AND INK JET RECORDING APPARATUS

The present application is based on, and claims priority from JP Application Serial Number 2020-014621, filed Jan. 31, 2020, the disclosure of which is hereby incorporated by reference herein in its entirety.

BACKGROUND

1. Technical Field

The present disclosure relates to an ink jet ink set, an ink jet recording method, and an ink jet recording apparatus.

2. Related Art

An ink jet recording method is a recording method in which small liquid droplets of ink compositions are ejected from fine nozzles and then adhered to a recording medium. This method is characterized in that a high resolution and high quality image can be recorded at a high speed using a relatively inexpensive apparatus. In order to improve color development and glossiness of a recorded matter, an ink set using at least one dye ink and at least one pigment ink has been proposed.

As an ink set in which even when a pigment ink and a dye ink are mixed with each other, dispersibility of a pigment contained in the pigment ink is excellent, JP-A-2013-10826 has disclosed an ink set which includes a first ink containing water, a pigment, and first metal ions as counter ions of the pigment and a second ink containing water, a specific dye, and second metal ions as counter ions of the dye and which has a limit equivalent conductance [S·cm$^2$/eq] of the first metal ions under a predetermined condition higher than a limit equivalent conductance [S·cm$^2$/eq] of the second metal ions under another predetermined condition.

In an ink jet recording apparatus, in order to prevent drying of an ink at an ejection port and to suppress nozzle clogging, the ejection port may be capped with a cap in some cases. In addition, when an aqueous dye ink and an aqueous pigment ink are used, an ejection port from which the aqueous dye ink is ejected and an ejection port from which the aqueous pigment ink is ejected may be capped with the same cap in some cases. Under the conditions as described above, it was found that when the aqueous dye ink and the aqueous pigment ink which are ejected as described above are mixed with each other in the cap by nozzle cleaning or the like, aggregates of pigment particles are gradually deposited in the cap. When a large amount of aggregates is deposited in the cap, the aggregates interfere with the function of the ejection port, and as a result, the inside of the ink jet recording apparatus may be contaminated and/or a recorded matter may also be contaminated with the aggregates adhered thereto. Hence, in an ink set including an aqueous dye ink and an aqueous pigment ink, to suppress generation of deposits in the cap of the ink jet recording apparatus is an important subject.

SUMMARY

The present inventors found that when an aqueous dye ink contains a dye having a predetermined structure and a poly(oxyalkylene) alkyl ether, and when an aqueous pigment ink contains a self-dispersible pigment, pigment particles are not likely to be aggregated even if those inks are mixed with each other, and the generation of deposits in a cap can be suppressed. That is, the present disclosure is as described below.

According to an aspect of the present disclosure, there is provided an ink jet ink set comprising an aqueous dye ink and an aqueous pigment ink, the ink jet ink set is an ink set to be used for an ink jet recording apparatus which includes a first ejection port to eject the aqueous dye ink, a second ejection port to eject the aqueous pigment ink, and a cap to collectively cap the first ejection port and the second ejection port, the cap being composed of the same member as that forming the first ejection port and the second ejection port, the aqueous dye ink contains a dye and a poly(oxyalkylene) alkyl ether, the dye includes a copper phthalocyanine compound having two or less benzene ring structures other than a phthalocyanine skeleton, and the aqueous pigment ink contains a self-dispersible pigment.

According to another aspect of the present disclosure, there is provided an ink jet recording method using an ink jet recording apparatus which includes a first ejection port to eject an aqueous dye ink, a second ejection port to eject an aqueous pigment ink, and a cap to collectively cap the first ejection port and the second ejection port, the cap being composed of the same member as that forming the first ejection port and the second ejection port, the method comprising: a first ink adhesion step of ejecting the aqueous dye ink by an ink jet method so as to adhere the ink to a recording medium; and a second ink adhesion step of ejecting the aqueous pigment ink by an ink jet method so as to adhere the ink to the recording medium. In the ink jet recording method, the aqueous dye ink contains a dye and a poly(oxyalkylene) alkyl ether, the dye includes a copper phthalocyanine compound having two or less benzene ring structures other than a phthalocyanine skeleton, and the aqueous pigment ink contains a self-dispersible pigment.

According to another aspect of the present disclosure, there is provided an ink jet recording apparatus comprising: an aqueous dye ink; an aqueous pigment ink; a first ejection port to eject the aqueous dye ink; a second ejection port to eject the aqueous pigment ink; and a cap to collectively cap the first ejection port and the second ejection port, the cap being composed of the same member as that forming the first ejection port and the second ejection port. In the ink jet recording apparatus, the aqueous dye ink contains a dye and a poly(oxyalkylene) alkyl ether, the dye includes a copper phthalocyanine compound having two or less benzene ring structures other than a phthalocyanine skeleton, and the aqueous pigment ink contains a self-dispersible pigment.

DESCRIPTION OF EXEMPLARY EMBODIMENTS

Figure 1:
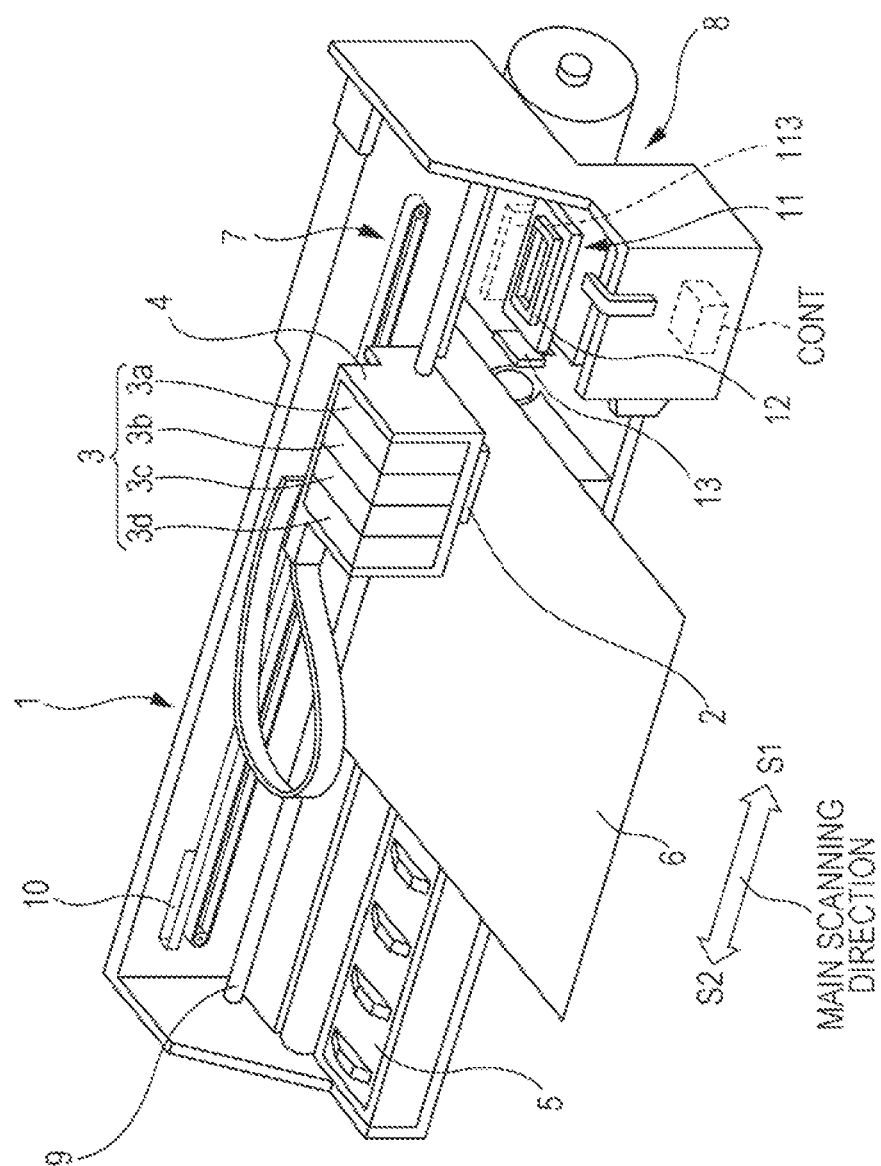
FIG. 1 is a perspective view showing the structure of a printer 1 as an ink jet recording apparatus according to this embodiment.

Hereinafter, if needed, with reference to the drawings, although an embodiment (hereinafter, referred to as "this embodiment") of the present disclosure will be described in detail, the present disclosure is not limited thereto and may be variously changed and/or modified without departing from the scope of the present disclosure. In addition, in the drawings, elements similar or equivalent to each other are designated by the same reference numeral, and duplicated description will be omitted. In addition, the positional relationship, such as top to bottom and/or right to left, is based on the positional relationship shown in the drawings, unless otherwise particularly noted. Furthermore, a dimensional ratio in the drawing is not limited to the ratio shown therein.
Ink Jet Ink Set An ink jet ink set (hereinafter, simply referred to as "ink set" in some cases) according to this embodiment comprises at least one aqueous dye ink and at least one aqueous pigment ink.

The ink set according to this embodiment is an ink set to be used for an ink jet recording apparatus which includes a first ejection port to eject the aqueous dye ink, a second ejection port to eject the aqueous pigment ink, and a cap to collectively cap the first ejection port and the second ejection port, the cap being composed of the same member as that forming the first ejection port and the second ejection port.

In addition, the aqueous dye ink contains a dye and a poly(oxyalkylene) alkyl ether, and the dye includes a copper phthalocyanine compound having two or less benzene ring structures other than a phthalocyanine skeleton (hereinafter, the dye described above may be referred to as "predetermined copper phthalocyanine compound" in some cases).

Furthermore, the aqueous pigment ink contains a self-dispersible pigment.

According to the structure described above, the ink set of this embodiment can suppress generation of deposits in the cap of the ink jet recording apparatus.

The ink set of this embodiment may contain either at least one aqueous dye ink or a plurality of aqueous dye inks. The ink set according to this embodiment preferably includes an aqueous dye cyan ink, an aqueous dye yellow ink, and an aqueous dye magenta ink.

When the ink set according to this embodiment includes at least two types of aqueous dye inks, one aqueous dye ink preferably at least contains a predetermined copper phthalocyanine compound and a poly(oxyalkylene) alkyl ether. In general, the copper phthalocyanine compound according to this embodiment is used as a dye for the cyan ink.

When the ink set includes at least two types of aqueous dye inks, those aqueous dye inks are received in respective containers, and the aqueous pigment ink is also received in its own container. As the container, for example, an ink cartridge which will be described below may be used.

Hereinafter, as an example, with reference to the case in which, as the aqueous dye inks, the ink set includes an aqueous dye cyan ink as a first aqueous dye ink, an aqueous dye magenta ink as a second aqueous dye ink, and an aqueous dye yellow ink as a third aqueous dye ink, and the first aqueous dye ink contains a predetermined copper phthalocyanine compound and a poly(oxyalkylene) alkyl ether, this embodiment will be described.

First, definitions of various types of terms will be described.

The "aqueous" in the ink indicates that with respect to the total mass of the ink, 40 percent by mass or more of water is contained.
Substituent Group A Although a "substituent" of this embodiment or a "substituent" in the case in which each group is substituted is not particularly limited, for example, there may be mentioned a halogen atom, an alkyl group, an aralkyl group, an alkenyl group, an alkynyl group, an aryl group, a heterocyclic group, a cyano group, a hydroxyl group, a nitro group, an alkoxy group, an aryloxy group, silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic thio group, a sulfamoyl group, an alkyl or arylsulfinyl group, an alkyl or arylsulfonyl group, an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, a silyl group, or an ionic hydrophilic group (those mentioned above may be referred to as "substituent group A" in some cases). Those substituents each may be further substituted, and as the further substituent, a group selected from the substituent group A described above may be mentioned.

Although the halogen atom is not particularly limited, for example, a fluorine atom, a chlorine atom, a bromine atom, or an iodine atom may be mentioned.

Although the alkyl group is not particularly limited, for example, a linear, a branched, or a cyclic substituted or unsubstituted alkyl group may be mentioned. The alkyl group includes a cycloalkyl group and a bicycloalkyl group and further includes, for example, a tricyclic structure having many ring structures. An alkyl group (such as an alkyl group of an alkoxy group or an alkylthio group) in the substituent which will be described below also represents the alkyl group defined as described above.

As the linear or the branched substituted or unsubstituted alkyl group, an alkyl group having 1 to 30 carbon atoms may be mentioned. Although the alkyl group described above is not particularly limited, for example, there may be mentioned a methyl group, an ethyl group, an n-propyl group, an isopropyl group, a t-butyl group, an n-octyl group, an eicosyl group, a 2-chloroethyl group, 2-cyanoethyl group, or a 2-ethylhexyl group.

Although the cyclic alkyl group is not particularly limited, for example, a cycloalkyl group, a bicycloalkyl group, or a tricycloalkyl group may be mentioned. Although the cycloalkyl group is not particularly limited, for example, there may be mentioned a substituted or unsubstituted cycloalkyl group, such as a cyclohexyl group, a cyclopentyl group, or a 4-n-dodecylcyclohexyl group, having 3 to 30 carbon atoms. Although the bicycloalkyl group is not particularly limited, for example, there may be mentioned a substituted or unsubstituted bicycloalkyl group, such as a bicycle[1,2,2]heptane-2-yl group or a bicycle[2,2,2]octane-3-yl group, having 5 to 30 carbon atoms.

As the aralkyl group, a substituted or unsubstituted aralkyl group, such as a benzyl group or a 2-phenetyl group, having 7 to 30 carbon atoms may be mentioned.

As the alkenyl group, a linear, a branched, or a cyclic substituted or unsubstituted alkenyl group may be mentioned.

Although as the linear, the branched, or the cyclic substituted or unsubstituted alkenyl group is not particularly limited, for example, there may be mentioned a substituted or unsubstituted alkenyl group, such as a vinyl group, an allyl group, a prenyl group, a geranyl, or an oleyl group, having 2 to 30 carbon atoms.

Although the cyclic substituted or unsubstituted alkenyl group is not particularly limited, for example, a cycloalkenyl group or a bicycloalkenyl group may be mentioned. As the cycloalkenyl group, for example, a substituted or unsubstituted cycloalkenyl group, such as a 2-cyclopenten-1-yl group or 2-cyclohexene-1-yl group, having 3 to 30 carbon atoms may be mentioned. As the bicycloalkenyl group, for example, a substituted or unsubstituted bicycloalkenyl group, such as a bicycle[2,2,1]hepto-2-ene-1-yl group or a bicycle[2,2,2]octo-2-ene-4-yl group, having 5 to 30 carbon atoms may be mentioned.

Although the alkynyl group is not particularly limited, for example, a substituted or unsubstituted alkynyl group, such as an ethynyl group, a propargyl group, or a trimethylsilylethynyl group, having 2 to 30 carbon atoms may be mentioned.

Although the aryl group is not particularly limited, for example, a substituted or unsubstituted aryl group, such as a phenyl group, a p-tolyl group, a naphthyl group, an m-chlorophenyl group, or an o-hexadecanoylaminophenyl group, having 6 to 30 carbon atoms may be mentioned.

Although the heterocyclic group is not particularly limited, for example, a five- or a six-membered aromatic heterocyclic group, such as a 2-furyl group, a 2-thienyl group, a 2-pyrimidyl group, or a 2-benzothiazolyl group, having 3 to 30 carbon atoms; or a five- or a six-membered non-aromatic heterocyclic group, such as a morpholinyl group, having 3 to 30 carbon atoms may be mentioned.

Although the alkoxy group is not particularly limited, for example, a substituted or unsubstituted alkoxy group, such as a methoxy group, an ethoxy group, an isopropoxy group, a t-butoxy group, an n-octyloxy group, or 2-methoxyethoxy group, having 1 to 30 carbon atoms may be mentioned.

Although the aryloxy group is not particularly limited, for example, a substituted or unsubstituted aryloxy group, such as a phenoxy group, a 2-methylphenoxy group, a 4-t-butylphenoxy group, a 3-nitrophenoxy group, or 2-tetradecanoylaminophenoxy group, having 6 to 30 carbon atoms may be mentioned.

Although the silyloxy group is not particularly limited, for example, a substituted or unsubstituted silyloxy group, such as a trimethylsilyloxy group or diphenylmethylsilyloxy group, having 0 to 20 carbon atoms may be mentioned.

Although the heterocyclic oxy group is not particularly limited, for example, a substituted or unsubstituted heterocyclic oxy group, such as a 1-phenyltetrazol-5-oxy group or a 2-tetrahydropyranyloxy group, having 2 to 30 carbon atoms may be mentioned.

Although the acyloxy group is not particularly limited, for example, a formyloxy group; a substituted or unsubstituted alkylcarbonyloxy group, such as an acetyloxy group, a pivaloyloxy group, or a stealoyloxy group, having 2 to 30 carbon atoms; or a substituted or unsubstituted arylcarbonyloxy group, such as a benzoyloxy group or a p-methoxyphenylcarbonyloxy group, having 6 to 30 carbon atoms may be mentioned.

Although the carbamoyloxy group is not particularly limited, for example, a substituted or unsubstituted carbamoyloxy group, such as an N,N-dimethylcarbamoyloxy group, an N,N-diethylcarbamoyloxy group, a morpholinocarbonyloxy group, an N,N-di-n-octylaminocarbonyloxy group, or an N-n-octylcarbamoyloxy group, having 1 to 30 carbon atoms may be mentioned.

Although the alkoxycarbonyloxy group is not particularly limited, for example, a substituted or unsubstituted alkoxycarbonyloxy group, such as a methoxycarbonyloxy group, an ethoxycarbonyloxy group, a t-butoxycarbonyloxy group, or an n-octylcarbonyloxy group, having 2 to 30 carbon atoms may be mentioned.

Although the aryloxycarbonyloxy group is not particularly limited, for example, a substituted or unsubstituted aryloxycarbonyloxy group, such as a phenoxycarbonyloxy group, a p-methoxyphenoxycarbonyloxy group, or a p-n-hexadecyloxyphenoxycarbonyloxy group, having 7 to 30 carbon atoms may be mentioned.

Although the amino group is not particularly limited, for example, an amino group (—NH$_2$ group), an alkylamino group, an arylamino group, or a heterocyclic amino group may be mentioned. Although the alkylamino group is not particularly limited, for example, a substituted or unsubstituted alkylamino group, such as a methylamino group or a dimethylamino group, having 1 to 30 carbon atoms may be mentioned. Although the arylamino group is not particularly limited, for example, a substituted or unsubstituted anilino group, such as an anilino group, an N-methyl-anilino group, a diphenylamino group, or a triazinylamino group, having 6 to 30 carbon atoms may be mentioned.

Although the acylamino group is not particularly limited, for example, there may be mentioned a formylamino group; a substituted or unsubstituted alkylcarbonylamino group, such as an acetylamino group, a pivaloylamino group, or a lauroylamino group, having 1 to 30 carbon atoms; or a substituted or unsubstituted arylcarbonylamino group, such as a benzoylamino group or a 3,4,5-tri-n-octyloxyphenylcarbonylamino group, having 6 to 30 carbon atoms.

Although the aminocarbonylamino group is not particularly limited, for example, a substituted or unsubstituted aminocarbonylamino group, such as a carbamoylamino group, an N,N-dimethylaminocarbonylamino group, an N,N-diethylaminocarbonylamino group, or a morpholinocarbonylamino group, having 1 to 30 carbon atoms may be mentioned.

Although the alkoxycarbonylamino group is not particularly limited, for example, a substituted or unsubstituted alkoxycarbonylamino group, such as a methoxycarbonylamino group, an ethoxycarbonylamino group, a t-butoxycarbonylamino group, an n-octadecyloxycarbonylamino group, or an N-methyl-methoxycarbonylamino group, having 2 to 30 carbon atoms may be mentioned.

Although the aryloxycarbonylamino group is not particularly limited, for example, a substituted or unsubstituted aryloxycarbonylamino group, such as a phenoxycarbonylamino group, a p-chlorophenoxycarbonylamino group, or an m-n-octyloxyphenoxycarbonylamino group, having 7 to 30 carbon atoms may be mentioned.

Although the sulfamoylamino group is not particularly limited, for example, a substituted or unsubstituted sulfamoylamino group, such as a sulfamoylamino group, an N,N-dimethylaminosulfonylamino group, or an N-n-octylaminosulfonylamino group, having 0 to 30 carbon atoms may be mentioned.

Although the alkyl or arylsulfonylamino group is not particularly limited, for example, there may be mentioned a substituted or unsubstituted alkylsulfonylamino group, such as a methylsulfonylamino group or a butylsulfonylamino group, having 1 to 30 carbon atoms; or a substituted or unsubstituted arylsulfonylamino group, such as a phenylsulfonylamino group, a 2,3,5-trichlorophenylsulfonylamino group, or a p-methylphenylsulfonylamino group, having 6 to 30 carbon atoms.

Although the alkylthio group is not particularly limited, for example, a substituted or unsubstituted alkylthio group, such as a methylthio group, an ethylthio group, or an n-hexadecylthio group, having 1 to 30 carbon atoms may be mentioned.

Although the arylthio group is not particularly limited, for example, a substituted or unsubstituted arylthio group, such as a phenylthio group, a p-chlorophenylthio group, or an m-methoxyphenylthio group, having 6 to 30 carbon atoms may be mentioned.

Although the heterocyclic thio group is not particularly limited, for example, a substituted or unsubstituted heterocyclic thio group, such as a 2-benzothiazolylthio group or a 1-phenyltetrazol-5-ylthio group, having 2 to 30 carbon atoms may be mentioned.

Although the sulfamoyl group is not particularly limited, for example, a substituted or unsubstituted sufamoyl group, such as an N-ethylsulfamoyl group, an N-(3-dodecyloxypropyl)sulfamoyl group, an N,N-dimethylsulfamoyl group, an N-acetylsulfamoyl group, an N-benzoylsulfamoyl group, or an N—(N'-phenylcarbamoyl)sulfamoyl group, having 0 to 30 carbon atoms may be mentioned.

Although the alkyl or arylsulfinyl group is not particularly limited, for example, there may be mentioned a substituted or unsubstituted alkylsulfinyl group, such as a methylsulfinyl group or an ethylsulfinyl group, having 1 to 30 carbon atoms; or a substituted or unsubstituted arylsulfinyl group, such as a phenylsulfinyl group or a p-methylphenylsulfinyl group, having 6 to 30 carbon atoms.

Although the alkyl or the arylsulfonyl group is not particularly limited, for example, there may be mentioned a substituted or unsubstituted alkylsulfonyl group, such as a methylsulfonyl group or an ethylsulfonyl group, having 1 to 30 carbon atoms; or a substituted or unsubstituted arylsulfonyl group, such as a phenylsulfonyl group or a p-methylphenylsulfonyl group, having 6 to 30 carbon atoms.

Although the acyl group is not particularly limited, for example, there may be mentioned a formyl group; a substituted or unsubstituted alkylcarbonyl group, such as an acetyl group, a pivaloyl group, a 2-chloroacetyl group, or a stearoyl group, having 2 to 30 carbon atoms; a substituted or unsubstituted arylcarbonyl group, such as a benzoyl group or a p-n-octyloxyphenylcarbonyl group, having 7 to 30 carbon atoms; or a substituted or unsubstituted heterocyclic carbonyl group, such as a 2-pyridylcarbonyl group or a 2-furylcarbonyl group, which has 2 to 30 carbon atoms and in which the carbonyl group is bonded to a carbon atom.

Although the aryloxycarbonyl group is not particularly limited, for example, a substituted or unsubstituted aryloxycarbonyl group, such as a phenoxycarbonyl group, an o-chlorophenoxycarbonyl group, an m-nitrophenoxycarbonyl group, or a p-t-butylphenoxycarbonyl group, having 7 to 30 carbon atoms may be mentioned.

Although the alkoxycarbonyl group is not particularly limited, for example, a substituted or unsubstituted alkoxycarbonyl group, such as a methoxycarbonyl group, an ethoxycarbonyl group, a t-butoxycarbonyl group, or an n-octadecyloxycarbonyl group, having 2 to 30 carbon atoms may be mentioned.

Although the carbamoyl group is not particularly limited, for example, a substituted or unsubstituted carbamoyl group, such as a carbamoyl group, an N-methylcarbamoyl group, an N,N-dimethylcarbamoyl group, an N,N-di-n-octylcarbamoyl group, or an N-(methylsulfonyl)carbamoyl group, having 1 to 30 carbon atoms may be mentioned.

Although the aryl or heterocyclic azo group is not particularly limited, for example, there may be mentioned a substituted or unsubstituted arylazo group, such as a phenylazo group or a p-chlorophenylazo group, having 6 to 30 carbon atoms; or a substituted or unsubstituted heterocyclic azo group, such as a 5-ethylthio-1,3,4-thiadiazol-2-ylazo group, having 3 to 30 carbon atoms.

Although the imide group is not particularly limited, for example, an N-succinimide group or an N-phthalimide group may be mentioned.

Although the phosphino group is not particularly limited, for example, a substituted or unsubstituted phosphino group, such as a dimethylphosphino group, a diphenylphosphino group, or a methylphenoxyphosphino group, having 0 to 30 carbon atoms may be mentioned.

Although the phosphinyl group is not particularly limited, for example, a substituted or unsubstituted phosphinyl group, such as a phosphinyl group, a dioctyloxyphosphinyl group or a diethoxyphosphinyl group, having 0 to 30 carbon atoms may be mentioned.

Although the phosphinyloxy group is not particularly limited, for example, a substituted or unsubstituted phosphinyloxy group, such as a diphenoxyphosphinyloxy group or a dioctyloxyphosphinyloxy group, having 0 to 30 carbon atoms may be mentioned.

Although the phosphinylamino group is not particularly limited, for example, a substituted or unsubstituted phosphinylamino group, such as a dimethoxyphosphinylamino group or a dimethylaminophosphinylamino group, having 0 to 30 carbon atoms may be mentioned.

Although the silyl group is not particularly limited, for example, a substituted or unsubstituted silyl group, such as a trimethylsilyl group, a t-butyldimethylsilyl group, or a phenyldimethylsilyl group, having 0 to 30 carbon atoms may be mentioned.

Although the ionic hydrophilic group is not particularly limited, for example, there may be mentioned a sulfo group, a carboxyl group, a thiocarboxyl group, a sulfino group, a phosphono group, a dihydroxyphosphino group, or a quaternary ammonium group. Among those mentioned above, a sulfo group or a carboxyl group is preferable. In addition, a carboxyl group, a phosphono group, and a sulfo group each may be in the form of salt. Although a counter cation which forms the salt is not particularly limited, for example, there may be mentioned an ammonium ion, an alkali metal ion, such as a lithium ion, a sodium ion, or a potassium ion, or an organic cation, such as a tetramethylammonium ion, a tetramethylguanidium ion, or a tetramethylphosphonium ion. Among those mentioned above, a lithium ion, a sodium ion, a potassium ion, or an ammonium ion is preferable, a sodium salt or a mixed salt containing a sodium salt as a primary component is more preferable, and a sodium salt is further preferable.

In addition, in this embodiment, when the compound is in the form of salt, in the ink, the salt is present in the form of dissociated ions.

First Aqueous Dye Ink

The first aqueous dye ink contains a predetermined dye and a poly(oxyalkylene) alkyl ether.

Copper Phthalocyanine Compound

The predetermined dye includes a copper phthalocyanine compound (hereinafter, simply referred to as "predetermined dye" in some cases) having two or less benzene ring structures other than a phthalocyanine skeleton. As described above, since having two or less benzene ring structures other than a phthalocyanine skeleton, the predetermined dye suppresses aggregation of the pigment ink to be mixed and can further suppress the generation of deposits caused by mixing with the pigment ink.

The benzene ring structure indicates a six-membered aromatic ring structure formed of six carbon atoms. For example, in the case of a phenyl group, the number of benzene ring structures is counted as one, and in the case of a naphthyl group, the number of benzene ring structures is counted as two. In the copper phthalocyanine compound used as the dye, the number of benzene ring structures other than a phthalocyanine skeleton is preferably one or less and more preferably zero.

In the copper phthalocyanine compound used as the dye, the number of aromatic ring structures other than a phthalocyanine skeleton is preferably two or less. Since the number of aromatic ring structures other than a phthalocyanine skeleton is two or less, the pigment ink can be further suppressed from being aggregated. In the copper phthalocyanine compound used as the dye, the number of aromatic ring structures other than a phthalocyanine skeleton is preferably one or less and more preferably zero.

The copper phthalocyanine compound used as the dye preferably includes an aliphatic hydrocarbon chain having at least three carbon atoms. By the structure including the aliphatic hydrocarbon chain, a molecular structure of the dye becomes more flexible, and when being mixed with the pigment ink, the copper phthalocyanine compound further suppresses the aggregation and is further likely to suppress the generation of deposits. The number of carbon atoms of the aliphatic hydrocarbon chain is not particularly limited and is, for example, 6 or less, preferably 5 or less, and more preferably 4 or less. As the aliphatic hydrocarbon chain, for example, a divalent aliphatic hydrocarbon group, such as an alkanediyl group or an alkenediyl group, or a monovalent aliphatic hydrocarbon group, such as an alkyl group or an alkenyl group may be mentioned. Among those mentioned above, the aliphatic hydrocarbon chain is preferably an alkanediyl group.

The copper phthalocyanine compound is preferably a compound represented by the following formula (C-1).

[Chem. 1]

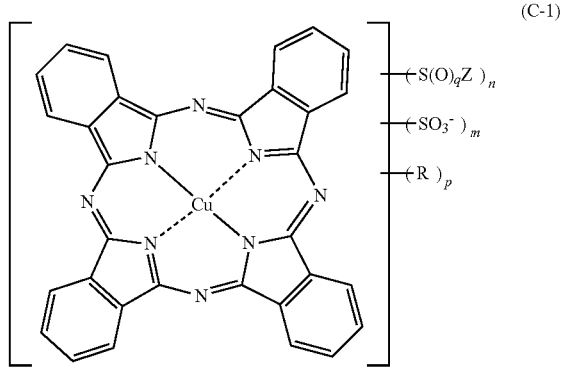

(C-1)

In the formula (C-1), q's each independently represent an integer of one to three; Z's each independently represent a substituted or unsubstituted alkyl group, a substituted or unsubstituted monoalkylamino group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, and at least one of Z's mentioned above has an ionic hydrophilic group as a substituent; R's each independently represent a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, an ureido group, a sulfamoylamino group, an alkylthio group, an arylthio group, an alkoxycarbonylamino group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, an acyl group, or an ionic hydrophilic group, and thoes groups each may further have at leat one substituent; n represets an integer of one to four; m represents an integer of zero to four; p represents an integer of zero to eight; and n+m+p represents 1 to 12.

As the substituent at Z, the substituents described in the above substituent group A may be mentioned.

As the alkyl group at Z, for example, a substituted or unsubstituted alkyl group may be mentioned. The alkyl group is preferably an alkyl group having 1 to 12 carbon atoms other than that of the substituent. Although the substituent is not particularly limited, for example, there may be mentioned a hydroxyl group, an alkoxy group, a cyano group, an alkylamino group ($R^{c1}NH-$, $R^{c1}R^{c2}N-$), a carbamoyl group ($-CONHR^{c1}$), a sulfamoyl group ($-SO_2NHR^{c1}$, $-SO_2NR^{c1}R^{c2}$), a sulfonylamino group ($-NHSO_2R^{c1}$), a $-SONHR^{c1}$ group, a $-SONR^{c1}R^{c2}$ group, a halogen atom, or an ionic hydrophilic group. In addition, $R^{c1}$ and $R^{c2}$ each represent a substituted or unsubstituted alkyl group or a substituted or unsubstituted phenyl group. Although the substituent is not particularly limited, for example, an alkylamino group, a hydroxyl group, or an ionic hydrophilic group may be mentioned. $R^{c1}$ and $R^{c2}$ each may form a ring by chemical bonding. Although the alkyl group is not particularly limited, for example, a methyl, an ethyl, a butyl, an n-propyl, an isopropyl, a t-butyl, a hydroxyethyl, a methoxyethyl, a cyanoethyl, a trifluoromethyl, a 3-sulfopropyl, or a 4-sulfobutyl group may be mentioned.

As the cycloalkyl group at Z, for example, a substituted or unsubstituted cycloalkyl group may be mentioned. As the cycloalkyl group, a cycloalkyl group having 5 to 12 carbon atoms other than that of the substituent is preferable. Although the substituent is not particularly limited, for example, an ionic hydrophilic group may be mentioned. Although the cycloalkyl group is not particularly limited, for example, a cyclohexyl group may be mentioned.

As the alkenyl group at Z, for example, a substituted or unsubstituted alkenyl group may be mentioned. As the alkenyl group, an alkenyl group having 2 to 12 carbon atoms other than that of the substituent is preferable. Although the substituent is not particularly limited, for example, an ionic hydrophilic group may be mentioned. Although the alkenyl group is not particularly limited, for example, a vinyl group or an allyl group may be mentioned.

As the aralkyl group at Z, for example, a substituted or unsubstituted aralkyl group may be mentioned. As the aralkyl group, an aralkyl group having 7 to 12 carbon atoms other than that of the substituent is preferable. Although the substituent is not particularly limited, for example, an ionic hydrophilic group may be mentioned. Although the aralkyl group is not particularly limited, for example, a benzyl group or a 2-phenetyl group may be mentioned.

As the aryl group at Z, for example, a substituted or unsubstituted aryl group may be mentioned. As the aryl group, an aryl group having 6 to 12 carbon atoms other than that of the substituent is preferable. Although the aryl group is not particularly limited, for example, a phenyl, a p-tolyl, a p-methoxyphenyl, an o-chlorophenyl, an m-(3-sulfopropylamino)phenyl, or an m-sulfophenyl group may be mentioned. Although the substituent is not particularly limited, for example, an alkyl group ($R^{c1}$—), an alkoxy group ($R^{c1}O$—), an alkylamino group ($R^{c1}NH$—, $R^{c1}R^{c2}N$—), a carbamoyl group (—$CONHR^{c1}$), a sulfamoyl group (—$SO_2NHR^{c1}$), a sulfonylamino group (—$NHSO_2R^{c1}$), a halogen atom, or an ionic hydrophilic group may be mentioned. In addition, the definitions of $R^{c1}$ and $R^{c2}$ are the same as described above.

As the heterocyclic group at Z, for example, a substituted or unsubstituted heterocyclic group may be mentioned, and the heterocyclic group may further form a condensed ring with another ring. As the heterocyclic group, a five-membered or six-membered heterocyclic group is preferable. Although not particularly limited, for example, the heterocyclic groups each independently represent imidazole, benzimidazole, pyrazole, benzopyrazole, triazole, thiazole, benzothiazole, isothiazole, benzisothiazole, oxazole, benzoxazole, thiadiazole, oxadiazole, pyrrole, benzopyrrole, indole, isoxazole, benzisoxazole, thiophene, benzothiophene, furan, benzofuran, pyridine, quinoline, isoquinoline, pyridazine, pyrimidine, pyrazine, cinnoline, phthalazine, quinazoline, quinoxaline, and triazine. Although the substituent is not particularly limited, for example, an alkyl group ($R^{c1}$—), an aryl group ($R^{c1}$—), an alkoxy group ($R^{c1}O$—), an alkylamino group ($R^{c1}NH$—, $R^{c1}R^{c2}N$—), a carbamoyl group (—$CONHR^{c1}$), a sulfamoyl group (—$SO_2NHR^{c1}$), a sulfonylamino group (—$NHSO_2R^{c1}$), a sulfonyl group (—$SO_2R^{c1}$), an acylamino group (—$NHCOR^{c1}$), a halogen atom, or an ionic hydrophilic group may be mentioned. In addition, the definitions of $R^{c1}$ and $R^{c2}$ are the same as described above.

Among those Z's, a substituted or unsubstituted alkyl group, a substituted or unsubstituted aryl group, or a substituted or unsubstituted heterocyclic group is preferable, a substituted alkyl group, a substituted aryl group, or a substituted heterocyclic group is more preferable, and a substituted alkyl group is further preferable.

At least one of Z's includes an ionic hydrophilic group as the substituent. Although the ionic hydrophilic group as the substituent is not particularly limited, for example, a sulfo group, a carboxyl group, or a quaternary ammonium group may be mentioned. Among those mentioned above, a carboxyl group or a sulfo group is preferable, and a sulfo group is more preferable. A carboxyl group and a sulfo group each may be in the form of salt, and although a counter cation forming the salt is not particularly limited, for example, an alkali metal ion (such as a sodium ion or a potassium ion) or an organic cation (such as a tetramethylguanidium ion) may be mentioned.

q's each preferably independently represent two or three and more preferably two.

n preferably represents two or three and more preferably two.

$S(O)_qZ$ in the formula (C-1) preferably represents at least one selected from the group consisting of a group represented by the following formula (C1-1), a group represented by the following formula (C1-2), and a group represented by the following formula (C1-3).

[Chem. 2]

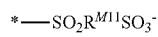

(C1-1)

In the formula (C1-1), $R^{M11}$ represents a divalent hydrocarbon group having one to six carbon atoms, and * represents a bonding site.

The number of carbon atoms of the hydrocarbon group of $R^{M11}$ is preferably two or more and more preferably three or more. Since the number of carbon atoms is in the range described above, the aggregation of the pigment ink to be mixed is further suppressed, and in addition, the deposit generation caused by mixing with the pigment ink can be further suppressed. The divalent hydrocarbon group is preferably a divalent linear or branched aliphatic hydrocarbon group, more preferably a divalent linear aliphatic hydrocarbon group, and further preferably a divalent linear alkanediyl group.

In the compound represented by the formula (C-1), the number of the groups represented by the formula (C1-1) is preferably an integer of 0 to 8, more preferably an integer of 0 to 6, and further preferably an integer of 0 to 4.

As the group represented by the formula (C1-1), for example, the following groups may be mentioned.

[Chem. 3]

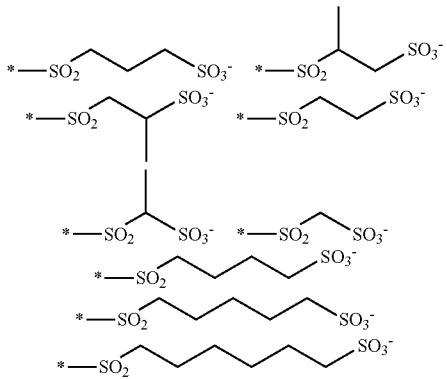

[Chem. 4]

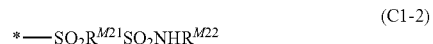

(C1-2)

In the formula (C1-2), $R^{M21}$ represents a divalent hydrocarbon group having one to six carbon atoms, $R^{M22}$ represents a linear or a branched substituted or unsubstituted alkyl group, and * represents a bonding site.

The definition of the hydrocarbon group of $R^{M21}$ is the same as that of the hydrocarbon group of $R^{M11}$.

The number of carbon atoms of the alkyl group of $R^{M22}$ is preferably 1 to 20, more preferably 2 to 10, and further preferably 3 to 6. The alkyl group of $R^{M22}$ is preferably a linear or a branched substituted alkyl group and more preferably a linear alkyl group having a hydroxyl group.

In the compound represented by the formula (C-1), the number of the groups represented by the formula (C1-2) is preferably an integer of 0 to 8, more preferably an integer of 0 to 6, further preferably an integer of 0 to 4, and more further preferably an integer of 0 to 2.

As the group represented by the formula (C1-2), for example, the following groups may be mentioned.

[Chem. 5]

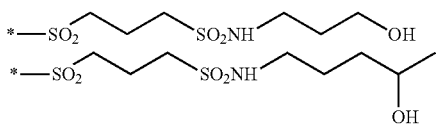

-continued

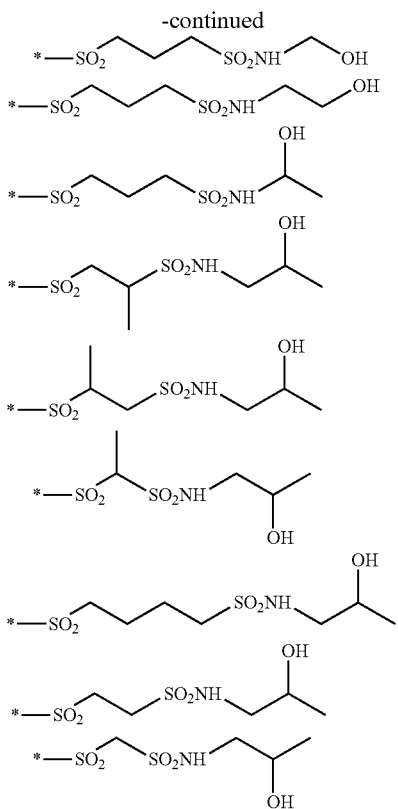

[Chem. 6]

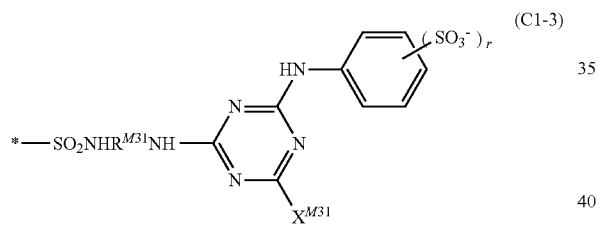

(C1-3)

In the formula (C1-3), $R^{M31}$ represents a divalent hydrocarbon group having one to six carbon atoms, $X^{M31}$ represents a chlorine atom, a hydroxyl group, an alkoxy group, an amino group, a monoalkylamino group, or a dialkylamino group, r represents an integer of one to three, and * represents a bonding site. In addition, the alkyl group of the alkoxy group, the monoalkylamino group, or the dialkylamino group may have a substituent.

The definition of the hydrocarbon group of $R^{M31}$ is the same as that of the hydrocarbon group of $R^{M11}$.

$X^{M31}$ preferably represents an amino group ($—NH_2$ group), a monoalkylamino group, or a dialkylamino group and more preferably an amino group.

r preferably represents two or three and more preferably two.

In the compound represented by the formula (C-1), the number of the groups represented by the formula (C1-3) is preferably an integer of 0 to 8, more preferably an integer of 0 to 6, further preferably an integer of 0 to 4, and even further preferably an integer of 0 to 2.

As the group represented by the formula (C1-3), for example, the following groups may be mentioned.

[Chem. 7]

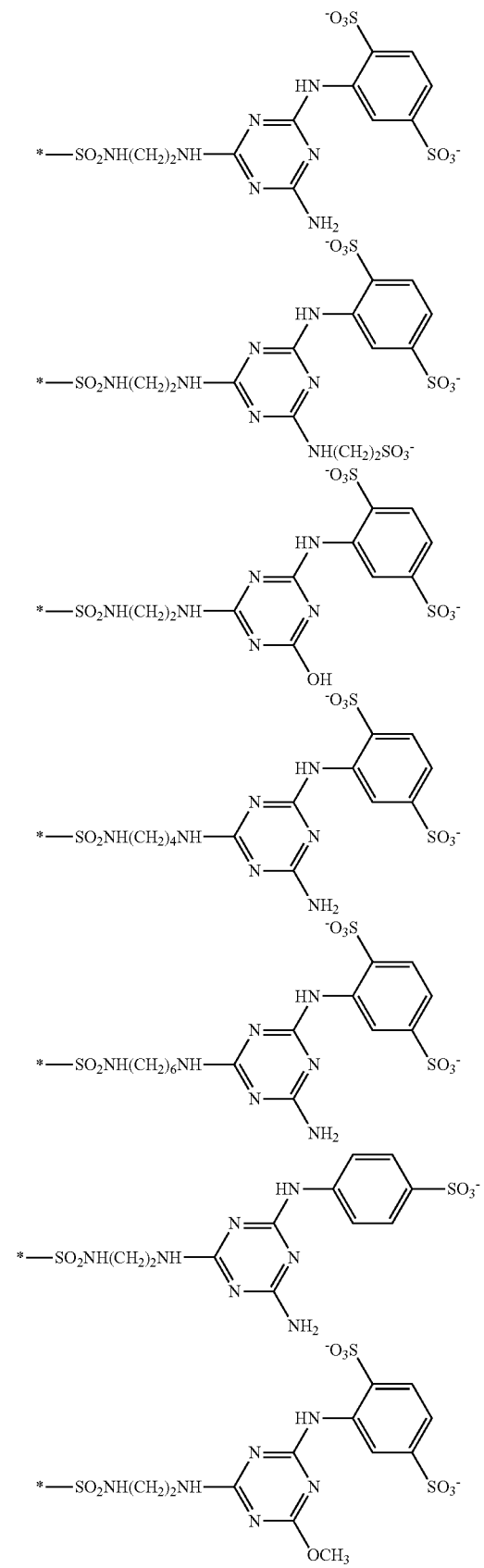

-continued

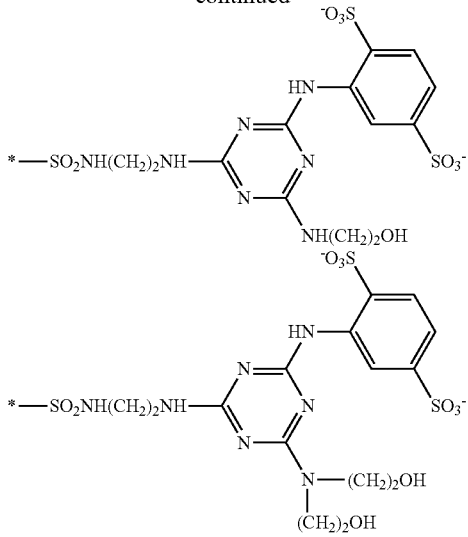

m in the formula (C-1) represents preferably an integer of 1 to 4, more preferably 2 or 3, and further preferably 2.

p in the formula (C-1) represents preferably an integer of 1 to 8, more preferably an integer of 1 to 6, further preferably an integer of 1 to 4, and more further preferably an integer of 1 to 3.

Although the substituent at R of the formula (C-1) is not particularly limited, the substituent described in the above substituent group A may be mentioned.

Although the halogen atom at R is not particularly limited, for example, a fluorine atom, a chlorine atom, or a bromine atom may be mentioned.

Although the alkyl group at R is not particularly limited, for example, a substituted or unsubstituted alkyl group may be mentioned. Although the alkyl group is not particularly limited, for example, an alkyl group having 1 to 12 carbon atoms other than that of the substituent is preferable. In addition, as the substituent, a hydroxyl group, an alkoxy group, a cyano group, a halogen atom, or an ionic hydrophilic group may be mentioned. Although the alkyl group is not particularly limited, for example, there may be mentioned a methyl, an ethyl, a butyl, an isopropyl, a t-butyl, a hydroxyethyl, a methoxyethyl, a cyanoethyl, a trifluoromethyl, a 3-sufopropyl, or a 4-sulfobutyl group.

Although the cycloalkyl group at R is not particularly limited, for example, a substituted or unsubstituted cycloalkyl group may be mentioned. Although the cycloalkyl group is not particularly limited, for example, a cycloalkyl group having 5 to 12 carbon atoms other than that of the substituent is preferable. In addition, as the substituent, an ionic hydrophilic group may be mentioned. Although the cycloalkyl group is not particularly limited, for example, a cyclohexyl group may be mentioned.

Although the alkenyl group at R is not particularly limited, for example, a substituted or unsubstituted alkenyl group may be mentioned. As the alkenyl group, an alkenyl group having 2 to 12 carbon atoms other than that of the substituent is preferable. Although the substituent is not particularly limited, for example, an ionic hydrophilic group may be mentioned. Although the alkenyl group is not particularly limited, for example, a vinyl group or an ally group may be mentioned.

Although the aralkyl group at R is not particularly limited, for example, a substituted or unsubstituted aralkyl group may be mentioned. As the aralkyl group, an aralkyl group having 7 to 12 carbon atoms other than that of the substituent is preferable. Although the substituent is not particularly limited, for example, an ionic hydrophilic group may be mentioned. Although the aralkyl group is not particularly limited, for example, a benzyl group or a 2-phenetyl group may be mentioned.

Although the aryl group at R is not particularly limited, for example, a substituted or unsubstituted aryl group may be mentioned. As the aryl group, an aryl group having 6 to 12 carbon atoms other than that of the substituent is preferable. Although the substituent is not particularly limited, for example, an alkyl group, an alkoxy group, a halogen atom, an alkylamino group, or an ionic hydrophilic group may be mentioned. Although the aryl group is not particularly limited, for example, a phenyl, a p-tolyl, a p-methoxyphenyl, an o-chlorophenyl, or a m-(3-sulfopropylamino) phenyl group may be mentioned.

Although the heterocyclic group at R is not particularly limited, for example, a substituted or unsubstituted heterocyclic group may be mentioned. As the heterocyclic group, a five-membered or six-membered heterocyclic group is preferable. Although the substituent is not particularly limited, for example, an ionic hydrophilic group may be mentioned. Although the heterocyclic group is not particularly limited, for example, a 2-pyridyl group, a 2-thienyl group, or a 2-furyl group may be mentioned.

Although the alkylamino group at R is not particularly limited, for example, a substituted or unsubstituted alkylamino group may be mentioned. As the alkylamino group, an alkylamino group having one to six carbon atoms other than that of the substituent is preferable. Although the substituent is not particularly limited, for example, an ionic hydrophilic group may be mentioned. Although the alkylamino group is not particularly limited, for example, a methylamino group or a diethylamino group may be mentioned.

Although the alkoxy group at R is not particularly limited, for example, a substituted or unsubstituted alkoxy group may be mentioned. As an alkoxy group other than the substituent, an alkoxy group having 1 to 12 carbon atoms is preferable. Although the substituent is not particularly limited, for example, an alkoxy group, a hydroxyl group, or an ionic hydrophilic group may be mentioned. Although the alkoxy group is not particularly limited, for example, a methoxy group, an ethoxy group, an isopropoxy group, a methoxyethoxy group, a hydroxyethoxy group, or a 3-carboxypropoxy group may be mentioned.

Although the aryloxy group at R is not particularly limited, for example, a substituted or unsubstituted aryloxy group may be mentioned. As the aryloxy group, an aryloxy group having 6 to 12 carbon atoms other than that of the substituent is preferable. Although the substituent is not particularly limited, for example, an alkoxy group or an ionic hydrophilic group may be mentioned. Although the aryloxy group is not particularly limited, for example, a phenoxy group, a p-methoxyphenoxy group, or an o-methoxyphenoxy group may be mentioned.

Although the amide group at R is not particularly limited, for example, a substituted or unsubstituted amide group may be mentioned. As the amide group, an amide group having 2 to 12 carbon atoms other than that of the substituent is preferable. Although the substituent is not particularly limited, for example, an ionic hydrophilic group may be mentioned. Although the amide group is not particularly limited, for example, an acetoamide group, a propionamide group, a benzamide group, or a 3,5-disulfobenzamide group may be mentioned.

Although the arylamino group at R is not particularly limited, for example, a substituted or unsubstituted arylamino group may be mentioned. As the arylamino group, an arylamino group having 6 to 12 carbon atoms other than that of the substituent is preferable. Although the substituent is not particularly limited, for example, a halogen atom or an ionic hydrophilic group may be mentioned. Although the arylamino group is not particularly limited, for example, an anilino group or a 2-chloroanilino group may be mentioned.

Although the ureido group at R is not particularly limited, for example, a substituted or unsubstituted ureido group may be mentioned. As the ureido group, a ureido group having 1 to 12 carbon atoms other than that of the substituent is preferable. Although the substituent is not particularly limited, for example, an alkyl group or an aryl group may be mentioned. Although the ureido group is not particularly limited, for example, a 3-methylureido group, a 3,3-dimethylureido group, or a 3-phenylureido group may be mentioned.

Although the sulfamoylamino group at R is not particularly limited, for example, a substituted or unsubstituted sulfamoylamino group may be mentioned. Although the substituent is not particularly limited, for example, an alkyl group may be mentioned. Although the sulfamoylamino group is not particularly limited, for example, an N,N-dipropylsulfamoylamino group may be mentioned.

Although the alkylthio group at R is not particularly limited, for example, a substituted or unsubstituted alkylthio group may be mentioned. As the alkylthio group, an alkylthio group having 1 to 12 carbon atoms other than that of the substituent is preferable. Although the substituent is not particularly limited, for example, an ionic hydrophilic group may be mentioned. Although the alkylthio group is not particularly limited, for example, a methylthio group or an ethylthio group may be mentioned.

Although the arylthio group at R is not particularly limited, for example, a substituted or unsubstituted arylthio group may be mentioned. As the arylthio group, an arylthio group having 6 to 12 carbon atoms other than that of the substituent is preferable. Although the substituent is not particularly limited, for example, an alkyl group or an ionic hydrophilic group may be mentioned. Although the arylthio group is not particularly limited, for example, a phenylthio group or a p-tolylthio group may be mentioned.

Although the alkoxycarbonylamino group at R is not particularly limited, for example, a substituted or unsubstituted alkoxycarbonylamino group may be mentioned. As the alkoxycarbonylamino group, an alkoxycarbonylamino group having 2 to 12 carbon atoms other than that of the substituent is preferable. Although the substituent is not particularly limited, for example, an ionic hydrophilic group may be mentioned. Although the alkoxycarbonylamino group is not particularly limited, for example, an ethoxycarbonylamino group may be mentioned.

Although the sulfonamide group at R is not particularly limited, for example, a substituted or unsubstituted sulfonamide group may be mentioned. As the sulfonamide group, a sulfonamide group having 1 to 12 carbon atoms other than that of the substituent is preferable. Although the substituent is not particularly limited, for example, an ionic hydrophilic group may be mentioned. Although the sulfonamide group is not particularly limited, for example, a methanesulfonamide group, a benzenesulfonamide group, or a 3-carboxybenzenesulfonamide group may be mentioned.

Although the carbamoyl group at R is not particularly limited, for example, a substituted or unsubstituted carbamoyl group may be mentioned. Although the substituent is not particularly limited, for example, an alkyl group may be mentioned. Although the carbamoyl group is not particularly limited, for example, a methylcarbamoyl group or a dimethylcarbamoyl group may be mentioned.

Although the sulfamoyl group at R is not particularly limited, for example, a substituted or unsubstituted sulfamoyl group may be mentioned. Although the substituent is not particularly limited, for example, an alkyl group or an aryl group may be mentioned. Although the sulfamoyl group is not particularly limited, for example, a dimethylsulfamoyl group, a di(2-hydroxyethyl)sulfamoyl group, or a phenylsulfamoyl group may be mentioned.

Although the alkoxycarbonyl group at R is not particularly limited, for example, a substituted or unsubstituted alkoxycarbonyl group may be mentioned. As the alkoxycarbonyl group, an alkoxycarbonyl group having 2 to 12 carbon atoms other than that of the substituent is preferable. Although the substituent is not particularly limited, for example, an ionic hydrophilic group may be mentioned. Although the alkoxycarbonyl group is not particularly limited, for example, a methoxycarbonyl group or an ethoxycarbonyl group may be mentioned.

Although the heterocyclic oxy group at R is not particularly limited, for example, a substituted or unsubstituted heterocyclic oxy group may be mentioned. As the heterocyclic oxy group, a heterocyclic oxy group having a five-membered or six-membered hetero ring is preferable. Although the substituent is not particularly limited, for example, a hydroxyl group or an ionic hydrophilic group may be mentioned. Although the heterocyclic oxy group is not particularly limited, for example, a 2-tetrahydropyranyloxy group may be mentioned.

Although the azo group at R is not particularly limited, for example, a substituted or unsubstituted azo group may be mentioned. Although the azo group is not particularly limited, for example, a p-nitrophenylazo group may be mentioned.

Although the acyloxy group at R is not particularly limited, for example, a substituted or unsubstituted acyloxy group may be mentioned. As the acyloxy group, an acyloxy group having 1 to 12 carbon atoms other than that of the substituent is preferable. Although the substituent is not particularly limited, for example, an ionic hydrophilic group may be mentioned. Although the acyloxy group is not particularly limited, for example, an acetoxy group or a benzoyloxy group may be mentioned.

Although the carbamoyloxy group at R is not particularly limited, for example, a substituted or unsubstituted carbamoyloxy group may be mentioned. Although the substituent is not particularly limited, for example, an alkyl group may be mentioned. Although the carbamoyloxy group is not particularly limited, for example, an N-methylcarbamoyloxy group may be mentioned.

Although the silyloxy group at R is not particularly limited, for example, a substituted or unsubstituted silyloxy group may be mentioned. Although the substituent is not particularly limited, for example, an alkyl group may be mentioned. Although the silyloxy group is not particularly limited, for example, a trimethylsilyloxy group may be mentioned.

Although the aryloxycarbonyl group at R is not particularly limited, for example, a substituted or unsubstituted aryloxycarbonyl group may be mentioned. As the aryloxycarbonyl group, an aryloxycarbonyl group having 7 to 12 carbon atoms other than that of the substituent is preferable. Although the substituent is not particularly limited, for example, an ionic hydrophilic group may be mentioned. Although the aryloxycarbonyl group is not particularly limited, for example, a phenoxcarbonyl group may be mentioned.

Although the aryloxycarbonylamino group at R is not particularly limited, for example, a substituted or unsubstituted aryloxycarbonylamino group may be mentioned. As the aryloxycarbonylamino group, an aryloxycarbonylamino group having 7 to 12 carbon atoms other than that of the substituent is preferable. Although the substituent is not particularly limited, for example, an ionic hydrophilic group may be mentioned. Although the aryloxycarbonylamino group is not particularly limited, for example, a phenoxycarbonylamino group may be mentioned.

Although the imide group at R is not particularly limited, for example, a substituted or unsubstituted imide group may be mentioned. Although the imide group is not particularly limited, for example, an N-phthalimide group or an N-succinimide may be mentioned.

Although the heterocyclic thio group at R is not particularly limited, for example, a substituted or unsubstituted heterocyclic thio group may be mentioned. The heterocyclic thio group preferably has a five-membered or six-membered hetero ring. Although the substituent is not particularly limited, for example, an ionic hydrophilic group may be mentioned. Although the heterocyclic thio group is not particularly limited, for example, a 2-pyridylthio group may be mentioned.

Although the phosphoryl group at R is not particularly limited, for example, a substituted or unsubstituted phosphoryl group may be mentioned. Although the phosphoryl group is not particularly limited, for example, a phenoxyphosphoryl group or a phenylphosphoryl group may be mentioned.

Although the acyl group at R is not particularly limited, for example, a substituted or unsubstituted acyl group may be mentioned. As the acyl group, an acyl group having 1 to 12 carbon atoms other than that of the substituent is preferable. Although the substituent is not particularly limited, for example, an ionic hydrophilic group may be mentioned. Although the acyl group is not particularly limited, for example, an acetyl group or a benzoyl group may be mentioned.

Although the ionic hydrophilic group at R is not particularly limited, for example, a sulfo group, a carboxyl group, or a quaternary ammonium group may be mentioned. As the ionic hydrophilic group, a carboxyl group or a sulfo group is preferable, and a sulfo group is particularly preferable. A carboxyl group and a sulfo group each may be in the form of salt, and although the counter ion forming the salt is not particularly limited, for example, an alkali metal ion (such as a sodium ion or a potassium ion) or an organic cation (such as a tetramethylguanidium ion) may be mentioned.

Among those R's mentioned above, the halogen atom, the alkyl group, the aryl group, the cyano group, the alkoxy group, the amide group, the ureido group, the sulfonamide group, the carbamoyl group, the sulfamoyl group, or the alkoxycarbonyl group is preferable, and the halogen atom, the cyano group, or the sulfonamide group is more preferable, and the sulfonamide group is even more preferable.

p preferably represents an integer of zero to four and more preferably an integer of zero to two.

The copper phthalocyanine compound described above may be either an α-position substitution type (a phthalocyanine compound having at least one specific substituent at 1 and/or 4 position, 5 and/or 8 position, 9 and/or 12 position, and/or 13 and/or 16 position) or a β-position substitution type (a phthalocyanine compound having at least one substituent at 2 and/or 3 position, 6 and/or 7 position, 10 and/or 11 position, and/or 14 and/or 15 position).

Although the copper phthalocyanine compound is not particularly limited, for example, compounds having the following substituents shown in the formula (1) may be mentioned.

TABLE 1

| EXEMPLARY COMPOUND | —S(O)$_q$Z | n | m | —R | p |
|---|---|---|---|---|---|
| 1 (α) | —SO$_2$(CH$_2$)$_3$SO$_3^-$Na$^+$ | 4 | 0 | — | 0 |
| 2 (β) | —SO$_2$(CH$_2$)$_3$SO$_3^-$Na$^+$ | 4 | 0 | — | 0 |
| 3 (α) | —SO(CH$_2$)$_3$SO$_3^-$Na$^+$ | 4 | 0 | — | 0 |
| 4 (β) | —SO(CH$_2$)$_3$SO$_3^-$Na$^+$ | 4 | 0 | — | 0 |
| 5 (α) | —SO$_2$(CH$_2$)$_3$SO$_3^-$Na$^+$ | 8 | 0 | — | 0 |
| 6 (β) | —SO$_2$(CH$_2$)$_3$SO$_3^-$Na$^+$ | 8 | 0 | — | 0 |
| 7 (α) | —SO(CH$_2$)$_3$SO$_3^-$Na$^+$ | 8 | 0 | — | 0 |
| 8 (β) | —SO(CH$_2$)$_3$SO$_3^-$Na$^+$ | 8 | 0 | — | 0 |
| 9 (α) | 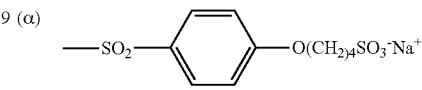 | 4 | 0 | — | 0 |
| 10 (β) | 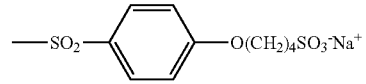 | 4 | 0 | — | 0 |
| 11 (α) | 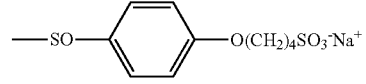 | 4 | 0 | — | 0 |
| 12 (β) | 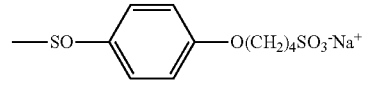 | 4 | 0 | — | 0 |
| 13 (α) | 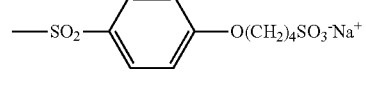 | 8 | 0 | — | 0 |
| 14 (β) | 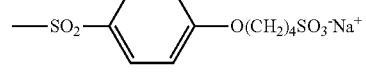 | 8 | 0 | — | 0 |
| 15 (α) | 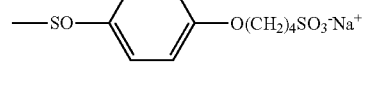 | 8 | 0 | — | 0 |
| 16 (β) | 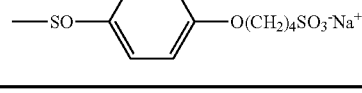 | 8 | 0 | — | 0 |

TABLE 2
| EXEMPLARY COMPOUND | —S(O)$_q$Z | n | m | —R | p |
|---|---|---|---|---|---|
| 17 (α) | 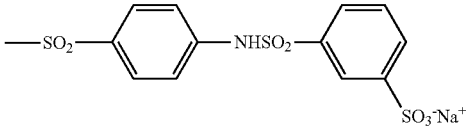 | 4 | 0 | — | 0 |
| 18 (β) | 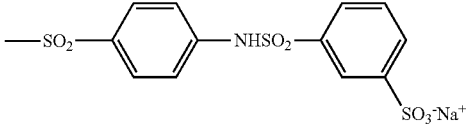 | 4 | 0 | — | 0 |
| 19 (α) | 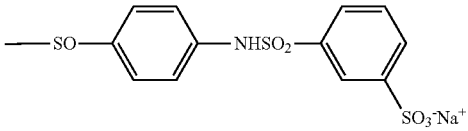 | 4 | 0 | — | 0 |
| 20 (β) | 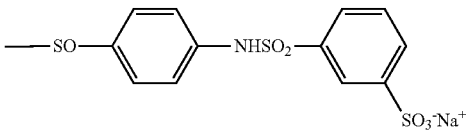 | 4 | 0 | — | 0 |
| 21 (α) | 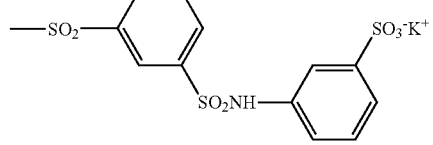 | 4 | 0 | — | 0 |
| 22 (β) | 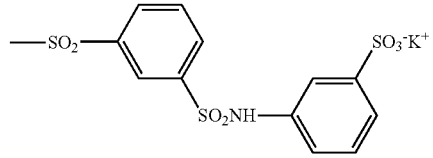 | 4 | 0 | — | 0 |
| 23 (α) | 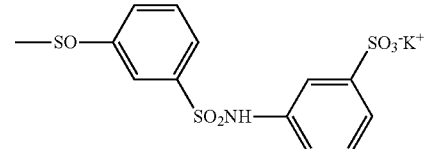 | 4 | 0 | — | 0 |
| 24 (β) | 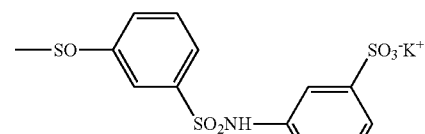 | 4 | 0 | — | 0 |

TABLE 3

| EXEMPLARY COMPOUND | —S(O)$_q$Z | n | m | —R | p |
|---|---|---|---|---|---|
| 25 (α) | —SO$_2$—C$_6$H$_4$—SO$_2$NH—C$_6$H$_3$(SO$_3^-$K$^+$)$_2$ | 4 | 0 | — | 0 |
| 26 (β) | —SO$_2$—C$_6$H$_4$—SO$_2$NH—C$_6$H$_3$(SO$_3^-$K$^+$)$_2$ | 4 | 0 | — | 0 |
| 27 (α) | —SO—C$_6$H$_4$—SO$_2$NH—C$_6$H$_3$(SO$_3^-$K$^+$)$_2$ | 4 | 0 | — | 0 |
| 28 (β) | —SO—C$_6$H$_4$—SO$_2$NH—C$_6$H$_3$(SO$_3^-$K$^+$)$_2$ | 4 | 0 | — | 0 |
| 29 (α) | —SO$_2$—C$_6$H$_4$—CO$_2^-$Na$^+$ | 4 | 0 | — | 0 |
| 30 (β) | —SO$_2$—C$_6$H$_4$—CO$_2^-$Na$^+$ | 4 | 0 | — | 0 |
| 31 (α) | —SO—C$_6$H$_4$—CO$_2^-$Na$^+$ | 4 | 0 | — | 0 |
| 32 (β) | —SO—C$_6$H$_4$—CO$_2^-$Na$^+$ | 4 | 0 | — | 0 |

TABLE 4

| EXEMPLARY COMPOUND | —S(O)$_q$Z | n | m | —R | p |
|---|---|---|---|---|---|
| 33 (α) | —SO$_2$—C$_6$H$_4$—CO$_2^-$Na$^+$ (ortho) | 4 | 0 | — | 0 |
| 34 (β) | —SO$_2$—C$_6$H$_4$—CO$_2^-$Na$^+$ (ortho) | 4 | 0 | — | 0 |

TABLE 4-continued

| EXEMPLARY COMPOUND | —S(O)$_q$Z | n | m | —R | p |
|---|---|---|---|---|---|
| 35 (α) | —SO—C$_6$H$_4$-2-CO$_2^-$Na$^+$ | 4 | 0 | — | 0 |
| 36 (β) | —SO—C$_6$H$_4$-2-CO$_2^-$Na$^+$ | 4 | 0 | — | 0 |
| 37 (α) | —SO$_2$—(imidazol-2-yl)-N-(CH$_2$)$_4$SO$_3^-$K$^+$ | 4 | 0 | — | 0 |
| 38 (β) | —SO$_2$—(imidazol-2-yl)-N-(CH$_2$)$_4$SO$_3^-$K$^+$ | 4 | 0 | — | 0 |
| 39 (α) | —SO—(imidazol-2-yl)-N-(CH$_2$)$_4$SO$_3^-$K$^+$ | 4 | 0 | — | 0 |
| 40 (β) | —SO—(imidazol-2-yl)-N-(CH$_2$)$_4$SO$_3^-$K$^+$ | 4 | 0 | — | 0 |

TABLE 5

| EXEMPLARY COMPOUND | —S(O)$_q$Z | n | m | —R | p |
|---|---|---|---|---|---|
| 41 (α) | —SO$_2$—(benzimidazol-2-yl)-N-(CH$_2$)$_3$SO$_3^-$Na$^+$ | 4 | 0 | — | 0 |
| 42 (β) | —SO$_2$—(benzimidazol-2-yl)-N-(CH$_2$)$_3$SO$_3^-$Na$^+$ | 4 | 0 | — | 0 |
| 43 (α) | —SO—(benzimidazol-2-yl)-N-(CH$_2$)$_3$SO$_3^-$Na$^+$ | 4 | 0 | — | 0 |

TABLE 5-continued

| EXEMPLARY COMPOUND | —S(O)$_q$Z | n | m | —R | p |
|---|---|---|---|---|---|
| 44 (β) | —SO—(benzimidazol-2-yl)-N-(CH$_2$)$_3$SO$_3^-$Na$^+$ | 4 | 0 | — | 0 |
| 45 (α) | —SO$_2$—(1,2,4-triazol-3-yl)-4N-(CH$_2$)$_3$SO$_3^-$K$^+$ | 4 | 0 | — | 0 |
| 46 (β) | —SO$_2$—(1,2,4-triazol-3-yl)-4N-(CH$_2$)$_3$SO$_3^-$K$^+$ | 4 | 0 | — | 0 |
| 47 (α) | —SO—(1,2,4-triazol-3-yl)-4N-(CH$_2$)$_3$SO$_3^-$K$^+$ | 4 | 0 | — | 0 |
| 48 (β) | —SO—(1,2,4-triazol-3-yl)-4N-(CH$_2$)$_3$SO$_3^-$K$^+$ | 4 | 0 | — | 0 |

TABLE 6

| EXEMPLARY COMPOUND | —S(O)$_q$Z | n | m | —R | p |
|---|---|---|---|---|---|
| 49 (α) | —SO$_2$—C$_6$H$_4$-2-CO$_2^-$Na$^+$ | 4 | 0 | — | 0 |
| 50 (β) | —SO$_2$—C$_6$H$_4$-2-CO$_2^-$Na$^+$ | 4 | 0 | — | 0 |
| 51 (α) | —SO—C$_6$H$_4$-2-CO$_2^-$Na$^+$ | 4 | 0 | — | 0 |
| 52 (β) | —SO—C$_6$H$_4$-2-CO$_2^-$Na$^+$ | 4 | 0 | — | 0 |

TABLE 7

| EXEMPLARY COMPOUND | —S(O)$_q$Z | n | m | —R | p |
|---|---|---|---|---|---|
| 53 (α) | —SO$_2$-[4,5-dihydrothiazole with 4-CH$_3$ and 5-CH$_2$CO$_2^-$Na$^+$] | 4 | 0 | — | 0 |
| 54 (β) | —SO$_2$-[4,5-dihydrothiazole with 4-CH$_3$ and 5-CH$_2$CO$_2^-$Na$^+$] | 4 | 0 | — | 0 |
| 55 (α) | —SO-[4,5-dihydrothiazole with 4-CH$_3$ and 5-CH$_2$CO$_2^-$Na$^+$] | 4 | 0 | — | 0 |
| 56 (β) | —SO-[4,5-dihydrothiazole with 4-CH$_3$ and 5-CH$_2$CO$_2^-$Na$^+$] | 4 | 0 | — | 0 |
| 57 (α) | —SO$_2$-[1,3,4-thiadiazol-2,5-diyl]-NHSO$_2$-[3-(SO$_3^-$Na$^+$)phenyl] | 4 | 0 | — | 0 |
| 58 (β) | —SO$_2$-[1,3,4-thiadiazol-2,5-diyl]-NHSO$_2$-[3-(SO$_3^-$Na$^+$)phenyl] | 4 | 0 | — | 0 |
| 59 (α) | —SO-[1,3,4-thiadiazol-2,5-diyl]-NHSO$_2$-[3-(SO$_3^-$Na$^+$)phenyl] | 4 | 0 | — | 0 |
| 60 (β) | —SO-[1,3,4-thiadiazol-2,5-diyl]-NHSO$_2$-[3-(SO$_3^-$Na$^+$)phenyl] | 4 | 0 | — | 0 |

TABLE 8

| EXEMPLARY COMPOUND | —S(O)$_q$Z | n | m | —R | p |
|---|---|---|---|---|---|
| 61 (α) | —SO$_2$-[1,3,4-thiadiazol-2,5-diyl]-SO$_2$(CH$_2$)$_4$SO$_3$NH$_4$ | 4 | 0 | — | 0 |
| 62 (β) | —SO$_2$-[1,3,4-thiadiazol-2,5-diyl]-SO$_2$(CH$_2$)$_4$SO$_3$NH$_4$ | 4 | 0 | — | 0 |

TABLE 8-continued

| EXEMPLARY COMPOUND | —S(O)qZ | n | m | —R | p |
|---|---|---|---|---|---|
| 63 (α) | —SO—[1,3,4-thiadiazole]—SO₂(CH₂)₄SO₃NH₄ | 4 | 0 | — | 0 |
| 64 (β) | —SO—[1,3,4-thiadiazole]—SO₂(CH₂)₄SO₃NH₄ | 4 | 0 | — | 0 |
| 65 (α) | —SO₂—[benzothiazole]—NHCO—[phenyl(SO₃⁻Na⁺)₂] | 4 | 0 | — | 0 |
| 66 (β) | —SO₂—[benzothiazole]—NHCO—[phenyl(SO₃⁻Na⁺)₂] | 4 | 0 | — | 0 |
| 67 (α) | —SO—[benzothiazole]—NHCO—[phenyl(SO₃⁻Na⁺)₂] | 4 | 0 | — | 0 |
| 68 (β) | —SO—[benzothiazole]—NHCO—[phenyl(SO₃⁻Na⁺)₂] | 4 | 0 | — | 0 |

TABLE 9

| EXEMPLARY COMPOUND | —S(O)qZ | n | m | —R | p |
|---|---|---|---|---|---|
| 69 (α) | —SO₂—[1,3,4-oxadiazole]—[phenyl-NHCO(CH₂)₂CO₂H] | 4 | 0 | — | 0 |
| 70 (β) | —SO₂—[1,3,4-oxadiazole]—[phenyl-NHCO(CH₂)₂CO₂H] | 4 | 0 | — | 0 |

TABLE 9-continued

| EXEMPLARY COMPOUND | —S(O)$_q$Z | n | m | —R | p |
|---|---|---|---|---|---|
| 71 (α) | —SO$_2$-(pyridinium)-N$^+$-(CH$_2$)$_4$SO$_3$$^-$K$^+$ | 4 | 0 | — | 0 |
| 72 (β) | —SO$_2$-(pyridinium)-N$^+$-(CH$_2$)$_4$SO$_3$$^-$K$^+$ | 4 | 0 | — | 0 |
| 73 (α) | —SO$_2$-(oxadiazole)-phenyl-NHCO(CH$_2$)$_2$CO$_2$H | 4 | 0 | — | 0 |
| 74 (β) | —SO$_2$-(oxadiazole)-phenyl-NHCO(CH$_2$)$_2$CO$_2$H | 4 | 0 | — | 0 |
| 75 (α) | —SO$_2$-(pyridinium)-N$^+$-(CH$_2$)$_4$SO$_3$$^-$K$^+$ | 4 | 0 | — | 0 |
| 76 (β) | —SO$_2$-(pyridinium)-N$^+$-(CH$_2$)$_4$SO$_3$$^-$K$^+$ | 4 | 0 | — | 0 |

TABLE 10

| EXEMPLARY COMPOUND | —S(O)$_q$Z | n | m | —R | p |
|---|---|---|---|---|---|
| 77(α) | —SO$_2$(CH$_2$)$_3$SO$_3$$^-$Li$^+$ | 2 | 0 | — | 0 |
|  | —SO$_2$(CH$_2$)$_3$SO$_2$NHCH$_2$CH(CH$_3$)$_2$ | 2 |  |  |  |
| 78(β) | —SO$_2$(CH$_2$)$_3$SO$_3$$^-$Li$^+$ | 2 | 0 | — | 0 |
|  | —SO$_2$(CH$_2$)$_3$SO$_2$NHCH$_2$CH(CH$_3$)$_2$ | 2 |  |  |  |
| 79(α) | —SO(CH$_2$)$_3$SO$_3$$^-$Li$^+$ | 2 | 0 | — | 0 |
|  | —SO(CH$_2$)$_3$SO$_2$NHCH$_2$CH(CH$_3$)$_2$ | 2 |  |  |  |
| 80(β) | —SO(CH$_2$)$_3$SO$_3$$^-$Li$^+$ | 2 | 0 | — | 0 |
|  | —SO(CH$_2$)$_3$SO$_2$NHCH$_2$CH(CH$_3$)$_2$ | 2 |  |  |  |

TABLE 11

| EXEMPLARY COMPOUND | —S(O)$_q$Z | n | m | —R | p |
|---|---|---|---|---|---|
| 81 | 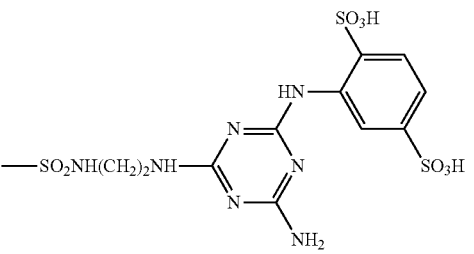 | 2 | 0 | —SO$_2$NH$_2$ | 2 |

TABLE 11-continued

| EXEMPLARY COMPOUND | —S(O)$_q$Z | n | m | —R | p |
|---|---|---|---|---|---|
| 82 | —SO$_2$NH(CH$_2$)$_2$NH— linked to triazine (with NH$_2$) —NH— naphthalene trisubstituted with SO$_3$H, SO$_3$H, SO$_3$H | 2 | 0 | —SO$_2$NH$_2$ | 2 |
| 83 | —SO$_2$NH(CH$_2$)$_2$NH— linked to triazine [—NH(CH$_2$)$_2$SO$_3$H] —NH— benzene disubstituted with SO$_3$H, SO$_3$H | 2 | 0 | —SO$_2$NH$_2$ | 2 |
| 84 | —SO$_2$NH(CH$_2$)$_2$NH— linked to triazine with two —NH(CH$_2$)$_2$SO$_3$H groups | 2 | 0 | —SO$_2$NH$_2$ | 2 |
| 85 | —SO$_2$NH(CH$_2$)$_2$NH— linked to triazine (with OH) —NH— benzene disubstituted with SO$_3$H, SO$_3$H | 2 | 0 | —SO$_2$NH$_2$ | 2 |
| 86 | —SO$_2$NH(CH$_2$)$_2$NH— linked to triazine [—S(CH$_2$)$_3$SO$_3$H] —NH— benzene disubstituted with SO$_3$H, SO$_3$H | 2 | 0 | —SO$_2$NH$_2$ | 2 |

TABLE 12

| EXEMPLARY COMPOUND | —S(O)$_q$Z | n | m | —R | p |
|---|---|---|---|---|---|
| 87 | —SO$_2$NH(CH$_2$)$_2$NH— triazine(NH$_2$)(NH(CH$_2$)$_2$N((CH$_2$)$_3$SO$_3$H)$_2$) | 2 | 0 | —SO$_2$NH$_2$ | 2 |
| 88 | —SO$_2$NH(CH$_2$)$_2$NH— triazine(NH(CH$_2$)$_2$SO$_3$H)(NH-(5-carboxy-2,6-dioxo-1,2,3,6-tetrahydropyrimidin-5-yl)) | 2 | 0 | —SO$_2$NH$_2$ | 2 |
| 89 | —SO$_2$NH(CH$_2$)$_2$NH— triazine(NH(CH$_2$)$_2$SO$_3$H)(NH-(4-(carboxymethyl)thiazol-2-yl)) | 2 | 0 | —SO$_2$NH$_2$ | 2 |
| 90 | —SO$_2$NH(CH$_2$)$_2$NH— triazine(NH(CH$_2$)$_2$SO$_3$H)(NH-(5-carboxy-1H-1,2,4-triazol-3-yl)) | 2 | 0 | —SO$_2$NH$_2$ | 2 |
| 91 | —SO$_2$NH(CH$_2$)$_2$NH— triazine(N(CH$_2$COOH)$_2$)(NH-(2,5-disulfophenyl)) | 2 | 0 | —SO$_2$NH$_2$ | 2 |

TABLE 13
| EXEMPLARY COMPOUND | —S(O)qZ | n | m | —R | p |
|---|---|---|---|---|---|
| 92 | 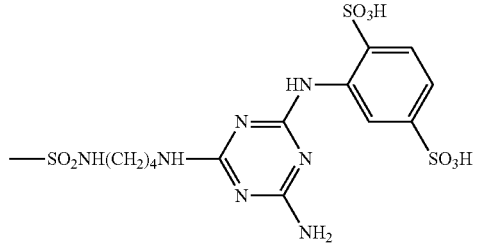 | 2 | 0 | —SO₂NH₂ | 2 |
| 93 | 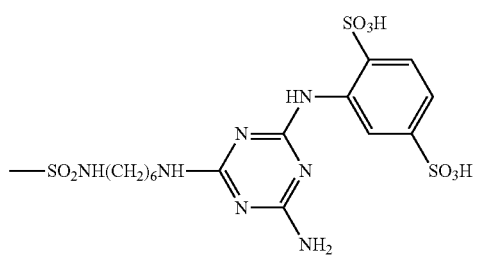 | 2 | 0 | —SO₂NH₂ | 2 |
| 94 | 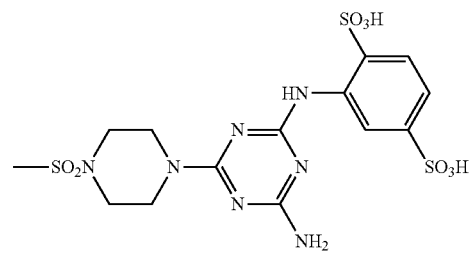 | 2 | 0 | —SO₂NH₂ | 2 |
| 95 | 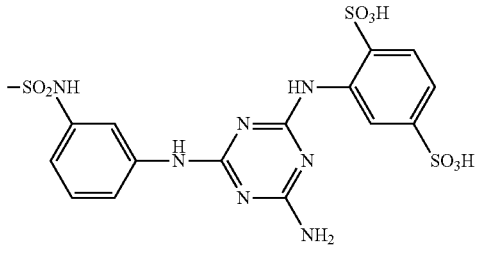 | 2 | 0 | —SO₂NH₂ | 2 |
| 96 | 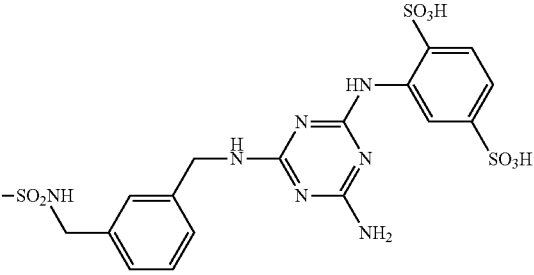 | 2 | 0 | —SO₂NH₂ | 2 |
| 97 | 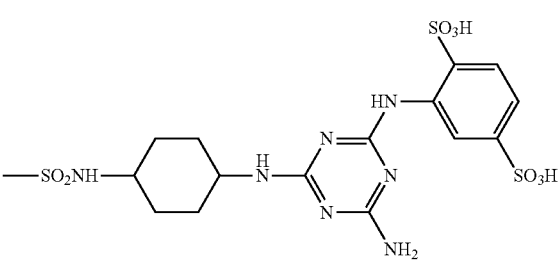 | 2 | 0 | —SO₂NH₂ | 2 |

TABLE 14

| EXEMPLARY COMPOUND | —S(O)$_q$Z | n | m | —R | p |
|---|---|---|---|---|---|
| 98 | structure with —SO$_2$NH(CH$_2$)$_4$NH– linked to triazine (NH$_2$) bearing HN-phenyl(SO$_3$H, SO$_3$H) | 2 | 0 | —SO$_2$NH$_2$ | 2 |
| 99 | structure with —SO$_2$NH–CH$_2$–cyclohexyl–CH$_2$–NH– linked to triazine (NH$_2$) bearing HN-phenyl(SO$_3$H, SO$_3$H) | 2 | 0 | —SO$_2$NH$_2$ | 2 |
| 100 | structure with —SO$_2$N(piperazine)N–(CH$_2$)$_2$NH– linked to triazine (NH$_2$) bearing HN-phenyl(SO$_3$H, SO$_3$H) | 2 | 0 | —SO$_2$NH$_2$ | 2 |
| 101 | structure with —SO$_2$N((CH$_2$)$_2$NH–)((CH$_2$)$_2$OH) linked to triazine (NH$_2$) bearing HN-phenyl(SO$_3$H, SO$_3$H) | 2 | 0 | —SO$_2$NH$_2$ | 2 |
| 102 | structure with —SO$_2$NH–phenyl(SO$_3$H)–NH– linked to triazine (NH$_2$) bearing HN-phenyl(SO$_3$H, SO$_3$H) | 2 | 0 | —SO$_2$NH$_2$ | 2 |

TABLE 15

| EXEMPLARY COMPOUND | —S(O)$_q$Z | n | m | —R | p |
|---|---|---|---|---|---|
| 103 | —NH(CH$_2$)$_2$NH(CH$_2$)$_2$NH— triazine(NH$_2$)—NH—C$_6$H$_3$(SO$_3$H)(SO$_3$H) | 2 | 0 | —SO$_2$NH$_2$ | 2 |
| 104 | —NH(CH$_2$)$_3$NH(CH$_2$)$_3$NH— triazine(NH$_2$)—NH—C$_6$H$_3$(SO$_3$H)(SO$_3$H) | 2 | 0 | —SO$_2$NH$_2$ | 2 |
| 105 | —SO$_2$NH(CH$_2$)$_2$NH— triazine(NH$_2$)—NH—C$_6$H$_2$(COOH)(OH)(SO$_3$H) | 2 | 0 | —SO$_2$NH$_2$ | 2 |
| 106 | —SO$_2$NH(CH$_2$)$_2$NH— triazine(NH$_2$)—NH—C$_6$H$_4$—SO$_3$H | 2 | 0 | —SO$_2$NH$_2$ | 2 |
| 107 | —SO$_2$NH(CH$_2$)$_2$NH— triazine(OCH$_3$)—NH—C$_6$H$_3$(SO$_3$H)(SO$_3$H) | 2 | 0 | —SO$_2$NH$_2$ | 2 |
| 108 | —SO$_2$NH(CH$_2$)$_2$NH— triazine(S(CH$_2$)$_3$SO$_3$H)(S(CH$_2$)$_3$SO$_3$H) | 2 | 0 | —SO$_2$NH$_2$ | 2 |

TABLE 16

| EXEMPLARY COMPOUND | —S(O)$_q$Z | n | m | —R | p |
|---|---|---|---|---|---|
| 109 | —SO$_2$NH(CH$_2$)$_2$NH—[triazine with two N(CH$_2$COOH)$_2$ groups] | 2 | 0 | —SO$_2$NH$_2$ | 2 |
| 110 | —SO$_2$NH(CH$_2$)$_2$NH—[triazine with two O(CH$_2$)$_3$SO$_3$H groups] | 2 | 0 | —SO$_2$NH$_2$ | 2 |
| 111 | —SO$_2$NH(CH$_2$)$_2$NH—[pyrimidine with NH$_2$ and HN-aryl(SO$_3$H)-benzothiazole(SO$_3$H)(COOH)] | 2 | 0 | —SO$_2$NH$_2$ | 2 |
| 112 | —SO$_2$NH(CH$_2$)$_2$NH—[pyrimidine with NH(CH$_2$)$_2$OH and HN-aryl(SO$_3$H)(SO$_3$H)] | 2 | 0 | —SO$_2$NH$_2$ | 2 |
| 113 | —SO$_2$NH(CH$_2$)$_2$NH—[pyrimidine with N((CH$_2$)$_2$OH)$_2$ and HN-aryl(SO$_3$H)(SO$_3$H)] | 2 | 0 | —SO$_2$NH$_2$ | 2 |

TABLE 17

| EXEMPLARY COMPOUND | —S(O)qZ | n | m | —R | P |
|---|---|---|---|---|---|
| 114 | —SO₂NH(CH₂)₂NH— pyrimidine substituted with HN-(2,5-disulfophenyl) and HN-(1H-1,2,4-triazol-3-yl) | 2 | 0 | —SO₂NH₂ | 2 |
| 115 | —SO₂NH(CH₂)₂NH— pyrimidine substituted with HN-(2,5-disulfophenyl) and S-(1H-1,2,4-triazol-3-yl) | 2 | 0 | —SO₂NH₂ | 2 |
| 116 | —SO₂NH(CH₂)₂NH— pyrimidine substituted with HN-(2,5-disulfophenyl) and HN-(uracil-5-yl) | 2 | 0 | —SO₂NH₂ | 2 |
| 117 | —SO₂NH(CH₂)₂NH— pyrimidine substituted with HN-(2,5-disulfophenyl) and HN-(glucosyl) | 2 | 0 | —SO₂NH₂ | 2 |
| 118 | —SO₂NH(CH₂)₂NH— triazine substituted with two —N(CH₃)(CH₂)₂SO₃H | 2 | 0 | —SO₂NH₂ | 2 |

TABLE 18

| EXEMPLARY COMPOUND | —S(O)$_q$Z | n | m | —R | p |
|---|---|---|---|---|---|
| 119 | —SO$_2$NH(CH$_2$)$_2$NH— triazine with HN-phenyl(COOH)(COOH) and HN—(CH$_2$)$_2$SO$_3$H | 2 | 0 | —SO$_2$NH$_2$ | 2 |
| 120 | —SO$_2$NH(CH$_2$)$_2$NH— triazine with SO$_3$H and SO$_3$H | 2 | 0 | —SO$_2$NH$_2$ | 2 |
| 121 | —SO$_2$NH(CH$_2$)$_2$NH— triazine with COOH and COOH | 2 | 0 | —SO$_2$NH$_2$ | 2 |

TABLE 19

| EXEMPLARY COMPOUND | —S(O)$_q$Z | n | m | —R | p |
|---|---|---|---|---|---|
| 122 | — | 0 | 1 | — | 0 |
| 123 | — | 0 | 2 | — | 0 |
| 124 | — | 0 | 3 | — | 0 |
| 125 | — | 0 | 0 | —NH$_2$ | 1 |
| 126 | — | 0 | 1 | —NH$_2$ | 1 |
| 127 | — | 0 | 2 | —NH$_2$ | 1 |
| 128 | — | 0 | 3 | —NH$_2$ | 1 |
| 129 | — | 0 | 0 | —NH$_2$ | 2 |
| 130 | — | 0 | 1 | —NH$_2$ | 2 |
| 131 | — | 0 | 2 | —NH$_2$ | 2 |
| 132 | — | 0 | 3 | —NH$_2$ | 2 |
| 133 | — | 0 | 0 | —NH$_2$ | 3 |
| 134 | — | 0 | 1 | —NH$_2$ | 3 |
| 135 | — | 0 | 2 | —NH$_2$ | 3 |
| 136 | — | 0 | 3 | —NH$_2$ | 3 |

The content of the predetermined dye with respect to the total mass of the first aqueous dye ink is preferably 0.1 percent by mass or more, more preferably 1.0 percent by mass or more, and further preferably 2.0 percent by mass or more. The content of the predetermined dye with respect to the total mass of the first aqueous dye ink is preferably 25.0 percent by mass or less, more preferably 20.0 percent by mass or less, and further preferably 15.0 percent by mass or less.

An amount of monovalent cations in the first aqueous dye ink is preferably 2,000 ppm or less with respect to the total mass of the first aqueous dye ink. Since the amount of monovalent cations is 2,000 ppm or less, when the aqueous dye ink is mixed with the pigment, the aggregation is suppressed, and the generation of deposits in the cap can be suppressed. The amount of monovalent cations in the first aqueous dye ink is preferably 1,400 ppm or less, more preferably 1,200 ppm or less, and further preferably 1,000 ppm or less. Since the amount of monovalent cations is the above value or less, the aggregation is further suppressed when the aqueous dye ink is mixed with the pigment, and the generation of deposits in the cap can be further suppressed. The amount of monovalent cations in the first aqueous dye ink with respect to the total mass of the first aqueous dye ink is preferably 200 ppm or more, more preferably 300 ppm or more, and further preferably 400 ppm or more. Since the amount of monovalent cations is the above value or more, a color developing property of the dye ink can be enhanced.

The amount of monovalent cations is calculated from a value measured by an ion chromatography using a 1,000-time diluted dye ink. As the ion chromatograph, for example, "IC940" (trade name, manufactured by Metrohm AG) may be mentioned.

Poly(Oxyalkylene) Alkyl Ether

Since containing a poly(oxyalkylene) alkyl ether, the first aqueous dye ink further suppresses the aggregation of the pigment ink to be mixed and can further suppress the generation of deposits caused by mixing with the pigment ink. The poly(oxyalkylene) alkyl ether is preferably represented by the following formula (P-1).

$$R^{P1}-O-(CH_2CH_2O)_s-H \quad (P\text{-}1)$$

In the formula (P-1), $R^{P1}$ represents a monovalent hydrocarbon group having at least 16 carbon atoms, and s represents an average number of addition moles and is 2 to 16.

The number of carbon atoms of the hydrocarbon group of $R_{P1}$ is preferably 8 to 24 and more preferably 8 to 18.

s represents preferably two to eight and more preferably four to eight.

As a commercially available product of the poly(oxyalkylene) alkyl ether, for example, there may be mentioned 1006, 1020, 1204, or 1860 (product name, manufactured by Nippon Nyukazai Co., Ltd.) of "Newcol" Series or 103 (trade name, manufactured by Kao Corporation) of "Emulgen" Series.

The content of the poly(oxyalkylene) alkyl ether with respect to the total mass of the first aqueous dye ink is preferably 0.1 percent by mass or more, more preferably 0.5 percent by mass or more, and further preferably 0.8 percent by mass or more. Since the content of the poly(oxyalkylene) alkyl ether is in the range described above, the aggregation of the pigment ink is further suppressed, and the generation of deposits caused by mixing with the pigment ink can be further suppressed. The content of the poly(oxyalkylene) alkyl ether with respect to the total mass of the first aqueous dye ink is preferably 10.0 percent by mass or less, more preferably 5.0 percent by mass or less, and further preferably 3.0 percent by mass or less. Since the content of the poly(oxyalkylene) alkyl ether is in the range described above, the generation of deposits caused by mixing with the pigment ink can be further suppressed.

Water

Although the water contained in the ink is not particularly limited, for example, there may be mentioned ion-exchanged water, ultrafiltration water, reverse osmosis water, or distilled water. When water sterilized by UV radiation or addition of hydrogen peroxide is used, in the case in which the ink is stored for a long period, generation of fungi and bacteria can be preferably prevented.

The content of the water with respect to the total mass of the first aqueous dye ink is preferably 40 percent by mass or more, more preferably 50 percent by mass or more, and further preferably 60 percent by mass or more. The content of the water with respect to the total mass of the first aqueous dye ink is preferably 90 percent by mass or less, more preferably 85 percent by mass or less, and further preferably 80 percent by mass or less.

Aqueous Organic Solvent

The first aqueous dye ink preferably contains an aqueous organic solvent. Although the aqueous organic solvent is not particularly limited, for example, there may be mentioned a polyalkylene glycol such as a polyethylene glycol; a diol, such as ethylene glycol, propylene glycol, butylene glycol, diethylene glycol, dipropylene glycol, triethylene glycol, tripropylene glycol, thio diglycol, 1,3-butanediol, 1,5-pentanediol, 1,2-hexanediol, or hexylene glycol; 1,2,6-hexanetriol; glycerin; or a pyrrolidone, such as 2-pyrrolidone or N-methyl-2-pyrrolidone. Those aqueous organic solvents may be used alone, or at least two types thereof may be used in combination.

The content of the aqueous organic solvent with respect to the total mass of the first aqueous dye ink is preferably 5 percent by mass or more, more preferably 7 percent by mass or more, and further preferably 10 percent by mass or more. The content of the water with respect to the total mass of the first aqueous dye ink is preferably 40 percent by mass or less, more preferably 35 percent by mass or less, and further preferably 30 percent by mass or less.

The first aqueous dye ink may contain, besides the components described above, a resin binder, a dispersant, a surfactant, a viscosity modifier, a surface tension adjuster, a pH adjuster, a dye solubilizer, an antiseptic/fungicide agent, and/or an antirust agent.

Second Aqueous Dye Ink

The second aqueous dye ink contains a second dye. As the second dye, a dye represented by the following formula (M-1) is preferable. Since a dye ink containing the dye represented by the formula (M-1) as the second aqueous dye ink in combination with the first aqueous dye ink is used, a discoloration rate becomes similar to that of an image formed using the first aqueous dye ink, and hence, the change in color tone caused by aging degradation can be prevented.

[Chem. 8]

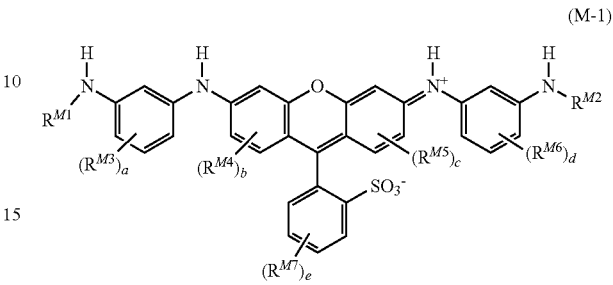

(M-1)

In the formula (M-1), $R^{M1}$ and $R^{M2}$ each independently represent a substituted or unsubstituted alkyl group, a substituted or unsubstituted aryl group, a substituted or unsubstituted heterocyclic group, a substituted or unsubstituted alkylsulfonyl group, a substituted or unsubstituted arylsulfonyl group, a substituted or unsubstituted alkoxycarbonyl group, a substituted or unsubstituted aryloxycarbonyl group, a substituted or unsubstituted carbamoyl group, a substituted or unsubstituted monoalkylaminocarbonyl group, a substituted or unsubstituted dialkylaminocarbonyl group, a substituted or unsubstituted monoarylaminocarbonyl group, a substituted or unsubstituted diarylaminocarbonyl group, or a substituted or unsubstituted alkylarylaminocarbonyl group; $R^{M3}$, $R^{M4}$, $R^{M5}$, $R^{M6}$, and $R^{M7}$ each independently represent a substituent; a, d, and e each independently represent an integer of zero to four, and b and c each independently represent an integer of zero to three.

$R^{M3}$ and $R^{M6}$ each independently represent preferably a substituted or unsubstituted alkyl group, a substituted or unsubstituted aryl group, a substituted or unsubstituted alkoxy group, a substituted or unsubstituted aryloxy group, a carboxyl group, or a halogen atom, more preferably a substituted or unsubstituted alkyl group, a substituted or unsubstituted aryl group, or a substituted or unsubstituted alkoxy group, and further preferably a substituted or unsubstituted alkyl group. The alkyl group is preferably an alkyl group having one to six carbon atoms, more preferably an alkyl group having one to three carbon atoms, and further preferably a methyl group.

a and d each independently represent preferably an integer of 1 to 3, more preferably an integer of 2 or 3, and further preferably 3. The substitution position is preferably the 2-position, the 4-position, and/or the 6-position of the 1,3-phenylene group.

$R^{M7}$ represents preferably a substituted or unsubstituted alkyl group, a substituted or unsubstituted aryl group, a substituted or unsubstituted alkoxy group, a substituted or unsubstituted aryloxy group, a hydroxyl group, a halogen atom, or a sulofo group and more preferably a hydroxyl group, a halogen atom, or a sulofo group.

e represents preferably an integer of 0 to 3, more preferably 0 or 1, and further preferably 0.

$R^{M4}$ and $R^{M5}$ each independently represent preferably a substituted or unsubstituted alkyl group, a substituted or unsubstituted aryl group, a halogen atom, or a sulofo group and more preferably a sulofo group.

b and c each independently represent preferably zero or one. b+c represents preferably an integer of 0 to 2, more preferably 1 or 2, and further preferably 1.

The alkyl groups at $R^{M1}$ and $R^{M2}$ are each preferably an alkyl group having one to six carbon atoms, more preferably an alkyl group having one to three carbon atoms, and further preferably a methyl group or an ethyl group. In addition, when the alkyl group has a substituent, as the substituent, a substituent selected from the substituent group A described above may be mentioned, an aryl group is preferable, and a phenyl group is particularly preferable.

The aryl groups at $R^{M1}$ and $R^{M2}$ are each preferably an aryl group having 6 to 14 carbon atoms, more preferably an aryl group having 6 to 10 carbon atoms, and further preferably a phenyl group. In addition, when the aryl group has a substituent, as the substituent, a substituent selected from the substituent group A described above may be mentioned.

The heterocyclic groups at $R^{M1}$ and $R^{M2}$ are each preferably a triazine group, a thiazolyl group, a benzothiazolyl group, or a thiadiazolyl group. In addition, when the heterocyclic group has a substituent, as the substituent, a substituent selected from the substituent group A described above may be mentioned. Among those substituents, a substituted or unsubstituted amino group or a substituted or unsubstituted sulfamoyl group is preferable.

The alkylsulfonyl groups at $R^{M1}$ and $R^{M2}$ are each preferably an alkylsulfonyl group having one to six carbon atoms, more preferably an alkylsulfonyl group having one to three carbon atoms, and further preferably a methylsulfonyl group. In addition, when the alkylsulfonyl group has a substituent, as the substituent, a substituent selected from the substituent group A described above may be mentioned.

The arylsulfonyl groups at $R^{M1}$ and $R^{M2}$ are each preferably an arylsulfonyl group having 6 to 14 carbon atoms, more preferably an arylsulfonyl group having 6 to 10 carbon atoms, and further preferably a phenylsulfonyl group. In addition, when the arylsulfonyl group has a substituent, as the substituent, a substituent selected from the substituent group A described above may be mentioned, and a carboxyl group is particularly preferable.

The alkoxycarbonyl groups at $R^{M1}$ and $R^{M2}$ are each preferably a group represented by —$COOR^{M10}$. In this case, $R^{M10}$ represents an alkyl group having one to six carbon atoms, preferably an alkyl group having one to four carbon atoms, and more preferably an isopropyl group. In addition, when the alkoxycarbonyl group has a substituent, as the substituent, a substituent selected from the substituent group A described above may be mentioned.

The aryloxycarbonyl groups at $R^{M1}$ and $R^{M2}$ are each preferably a group represented by —$COOR^{M11}$. In this case, $R^{M11}$ represents an aryl group having 6 to 14 carbon atoms, preferably an aryl group having 6 to 10 carbon atoms, and more preferably a phenyl group. In addition, when the aryloxycarbonyl group has a substituent, as the substituent, a substituent selected from the substituent group A described above may be mentioned, and a nitro group is particularly preferable.

The monoalkylaminocarbonyl groups at $R^{M1}$ and $R^{M2}$ are each preferably a group represented by —$CONHR^{M12}$. In this case, $R^{M12}$ represents an alkyl group having 1 to 12 carbon atoms, preferably an alkyl group having 1 to 10 carbon atoms, more preferably an alkyl group having 1 to 6 carbon atoms, further preferably a methyl group, an ethyl group, an isopropyl group, a hexyl group, a 2-ethylhexyl group, a dodecyl group, or a cyclohexyl group, and even further preferably an isopropyl group. In addition, when the monoalkylaminocarbonyl group has a substituent, as the substituent, a substituent selected from the substituent group A described above may be mentioned. Among the substituents, a phenyl group, a carboxyl group, a substituted or unsubstituted amino group, or a hydroxyl group is particularly preferable.

The dialkylaminocarbonyl groups at $R^{M1}$ and $R^{M2}$ are each preferably a group represented by —$CONR^{M13}R^{M14}$. In this case, $R^{M13}$ and $R^{M14}$ each independently represent an alkyl group having 1 to 10 carbon atoms, preferably an alkyl group having one to six carbon atoms, and more preferably a methyl group or an isopropyl group. In addition, when the dialkylaminocarbonyl group has a substituent, as the substituent, a substituent selected from the substituent group A described above may be mentioned. Among the substituents, a carboxyl group or an alkyloxycarbonyl group having two to six carbon atoms is preferable, and an alkyloxycarbonyl group, such as an ethyloxycarbonyl group, is particularly preferable.

The monoarylaminocarbonyl groups at $R^{M1}$ and $R^{M2}$ are each preferably a group represented by —$CONHR^{M15}$. In this case, $R^{M15}$ represents an aryl group having 6 to 14 carbon atoms, preferably an aryl group having 6 to 12 carbon atoms, more preferably an aryl group having 6 to 10, further preferably a phenyl group, a biphenyl group, or a naphthyl group, and more further preferably a phenyl group. In addition, when the monoarylaminocarbonyl group has a substituent, as the substituent, a substituent selected from the substituent group A described above may be mentioned. Among the substituents, a carboxyl group, a hydroxyl group, a phosphono group, or an alkoxy group having one to six carbon atoms is preferable, and an alkoxy group, such as a cyclohexyloxy group, is more preferable.

The diarylaminocarbonyl groups at $R^{M1}$ and $R^{M2}$ are each preferably a group represented by —$CONR^{M16}R^{M17}$. In this case, $R^{M16}$ and $R^{M17}$ each independently represent an aryl group having 6 to 14 carbon atoms, preferably an aryl group having 6 to 10 carbon atoms, and more preferably a phenyl group. In addition, when the diarylaminocarbonyl group has a substituent, as the substituent, a substituent selected from the substituent group A described above may be mentioned.

In view of color saturation, heat resistance, humidity resistance, light resistance, and gas resistance, $R^{M1}$ and $R^{M2}$ each independently represent preferably a substituted or unsubstituted alkylsulfonyl group, a substituted or unsubstituted arylsulfonyl group, a substituted or unsubstituted alkoxycarbonyl group, a substituted or unsubstituted aryloxycarbonyl group, a substituted or unsubstituted carbamoyl group, a substituted or unsubstituted monoalkylaminocarbonyl group, a substituted or unsubstituted dialkylaminocarbonyl group, a substituted or unsubstituted monoarylaminocarbonyl group, or a substituted or unsubstituted diarylaminocarbonyl group, more preferably a substituted or unsubstituted alkylsulfonyl group, a substituted or unsubstituted arylsulfonyl group, a substituted or unsubstituted monoalkylaminocarbonyl group, a substituted or unsubstituted dialkylaminocarbonyl group, a substituted or unsubstituted monoarylaminocarbonyl group, or a substituted or unsubstituted diarylaminocarbonyl group, and further preferably a substituted or unsubstituted monoalkylaminocarbonyl group, a substituted or unsubstituted dialkylaminocarbonyl group, a substituted or unsubstituted monoarylaminocarbonyl group, or a substituted or unsubstituted diarylaminocarbonyl group.

Although the second dye is not particularly limited, for example, the following compounds may be mentioned. In the following structural formula, Me represents a methyl group, Et represents an ethyl group, i-Pr represents an isopropyl group, and n-Bu represents an n-butyl group. In addition, ratios at R and M each represent a molar ratio.

[Chem. 9]
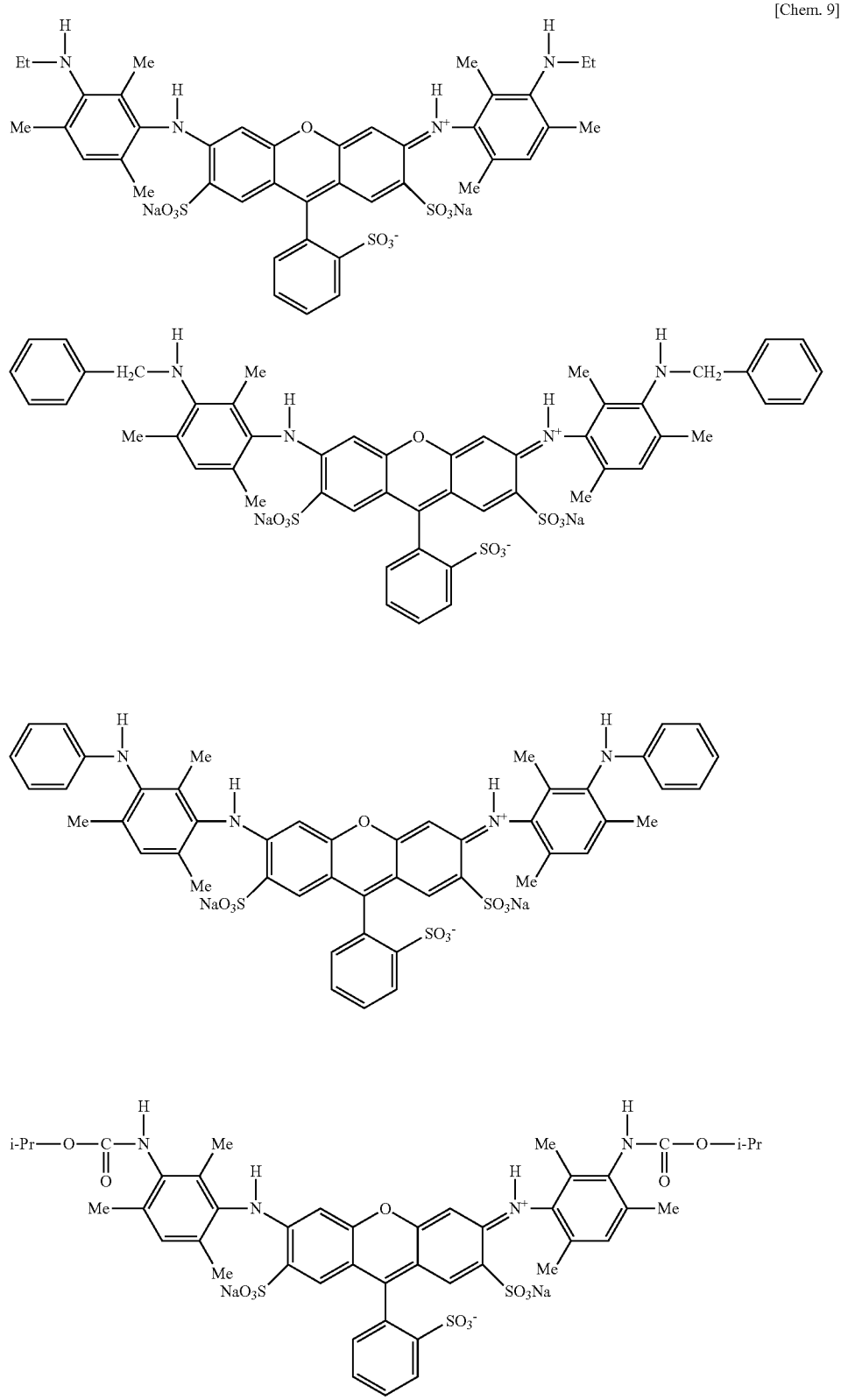

-continued
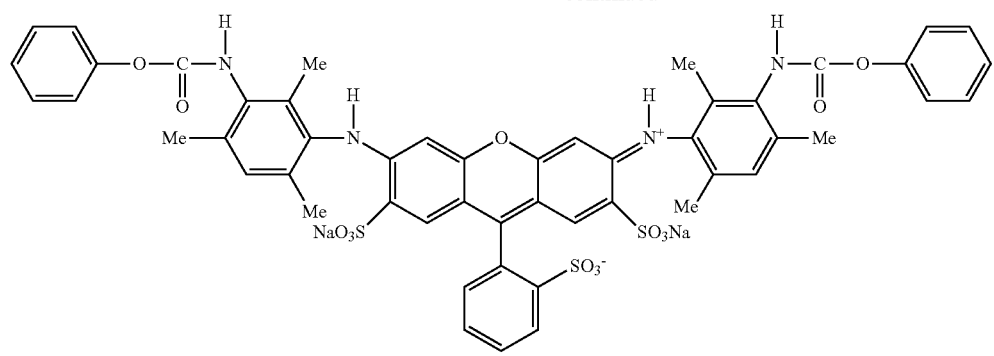
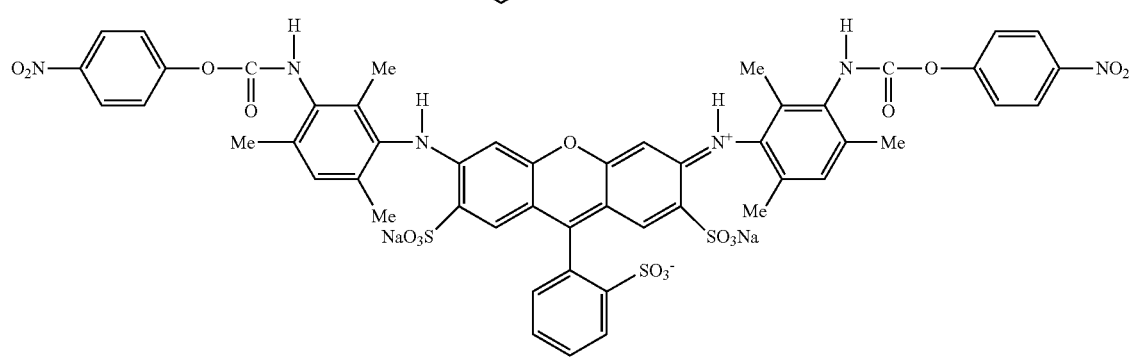
[Chem. 10]
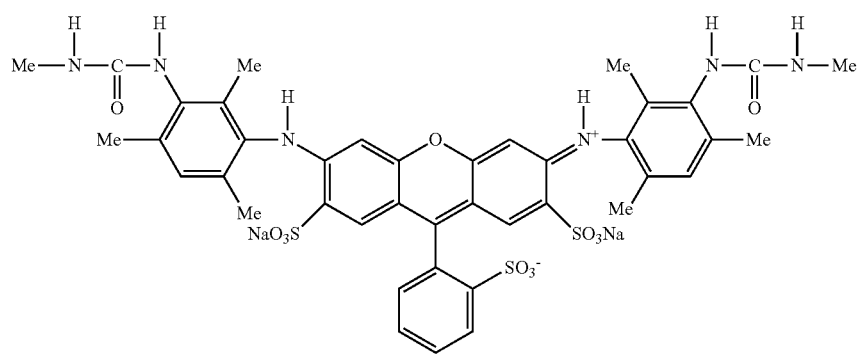
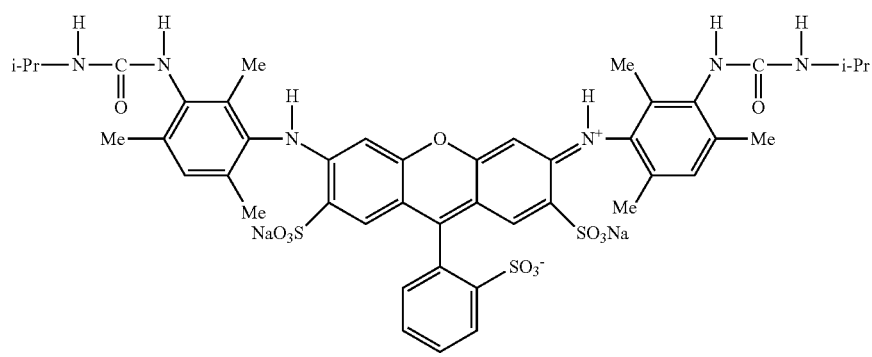

-continued
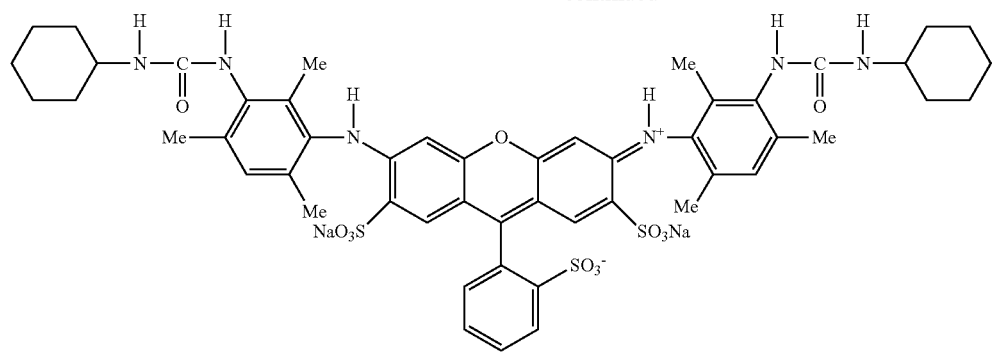
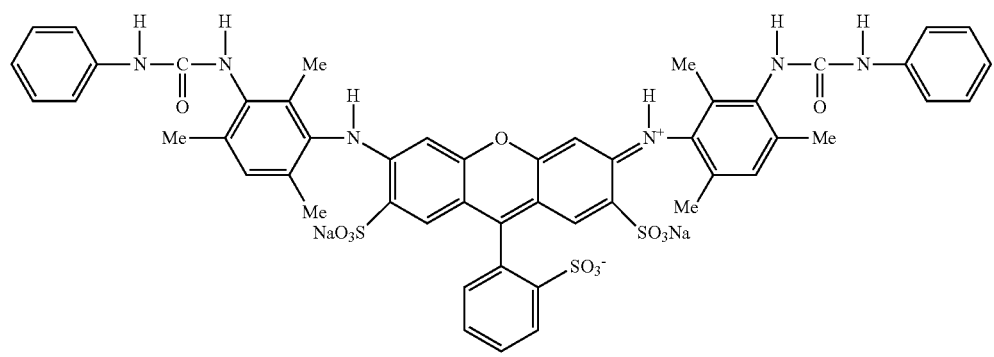
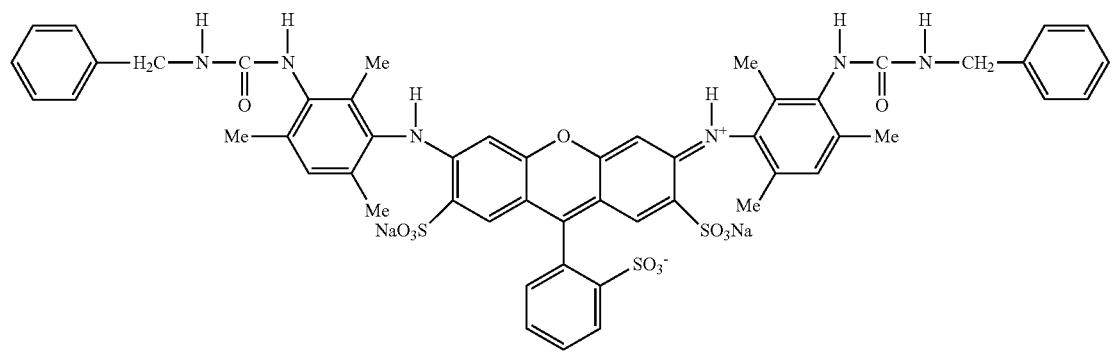
[Chem. 11]
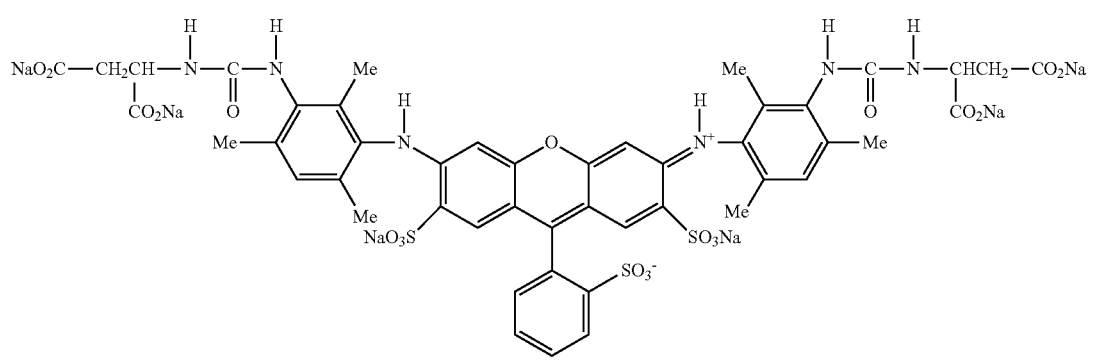

-continued
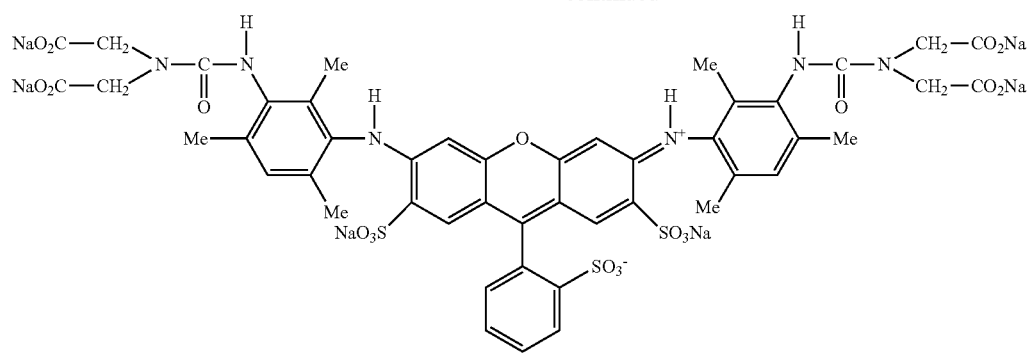
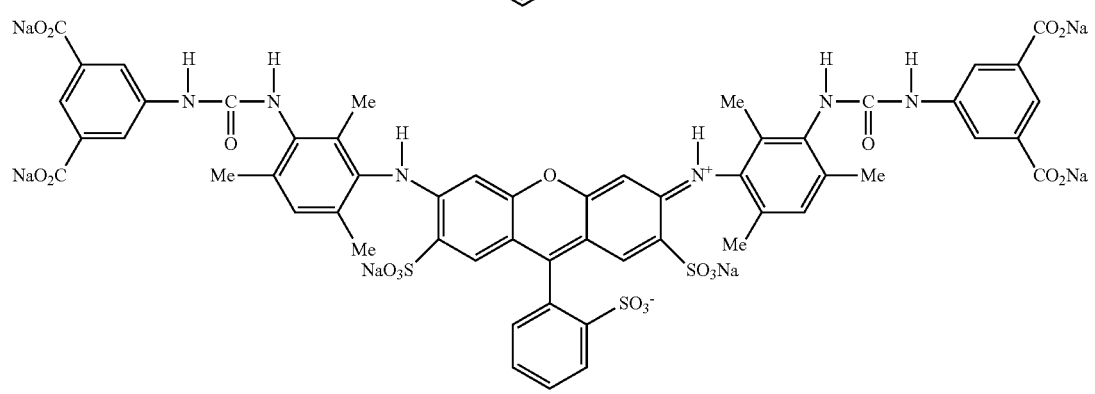
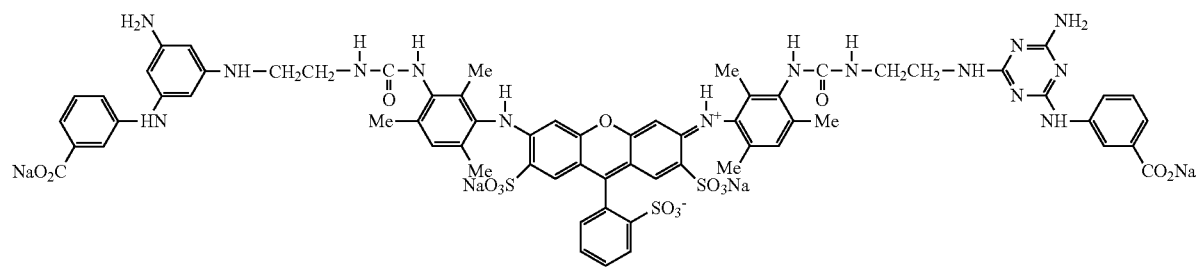
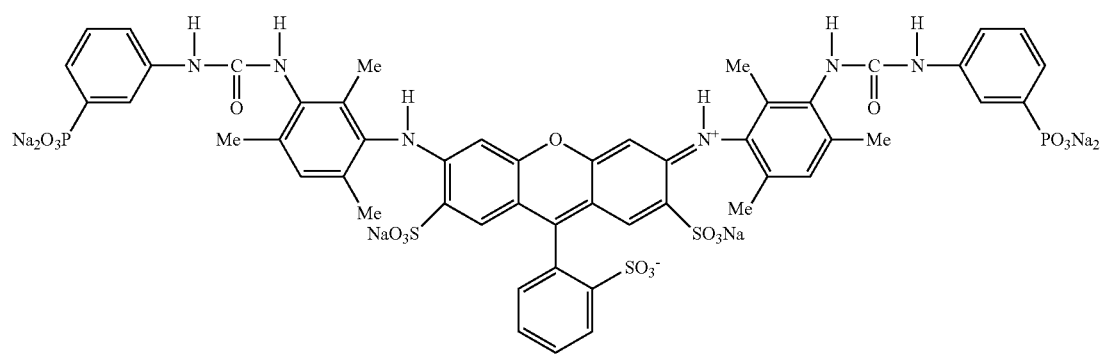

-continued
[Chem.12]
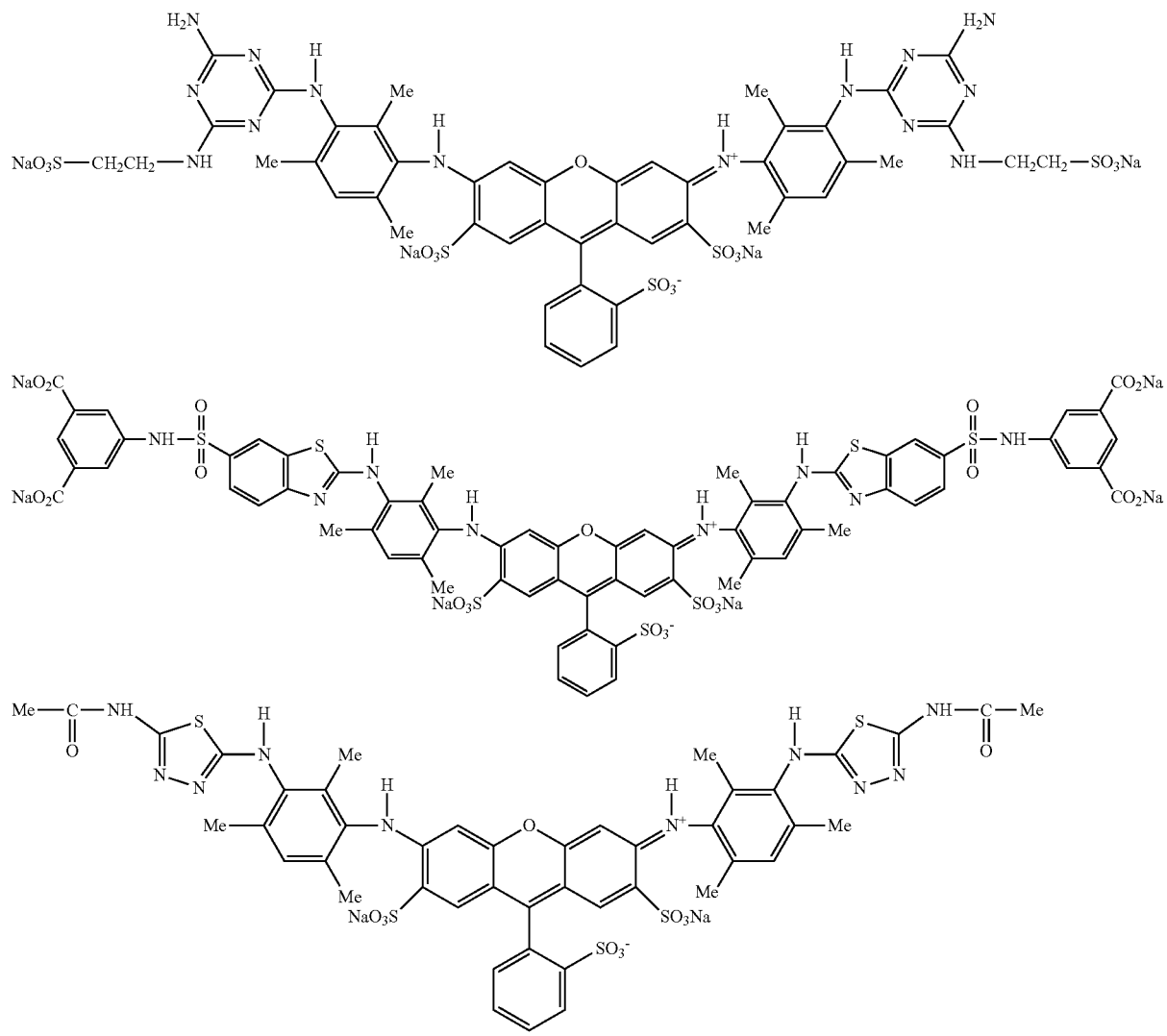
45
[Chem. 13]
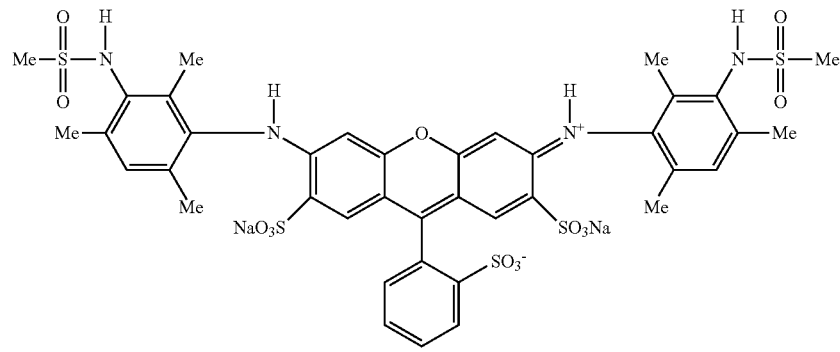

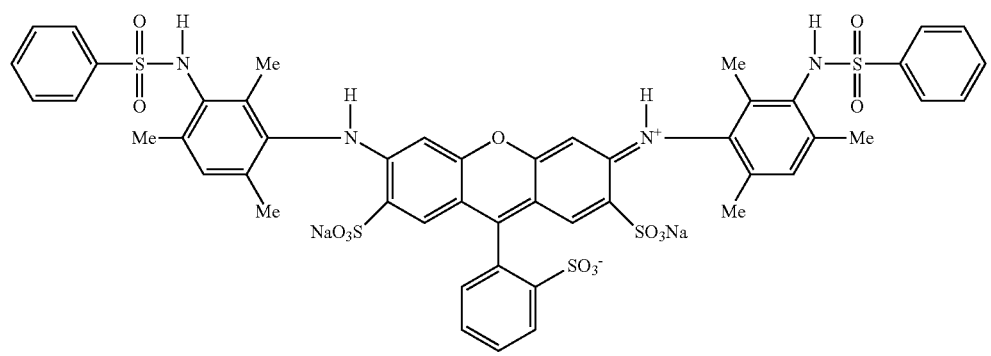
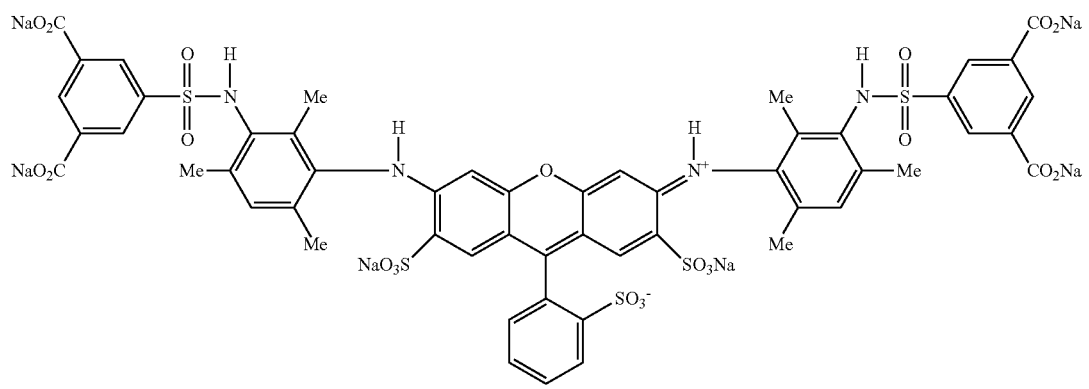
[Chem. 14]
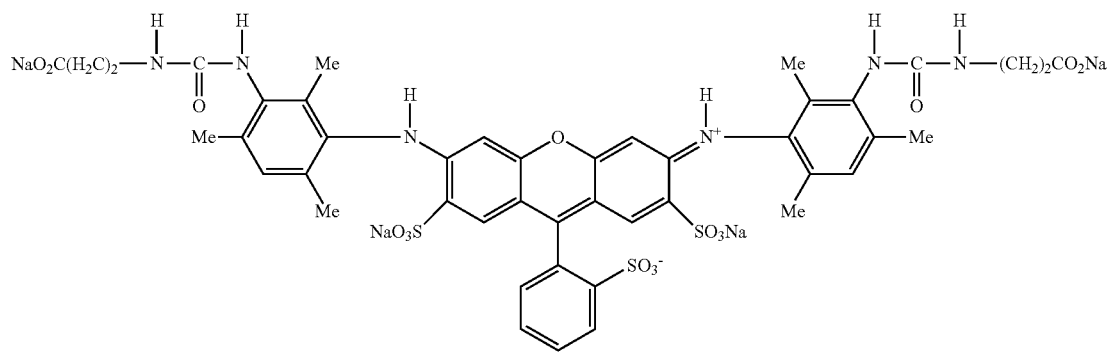
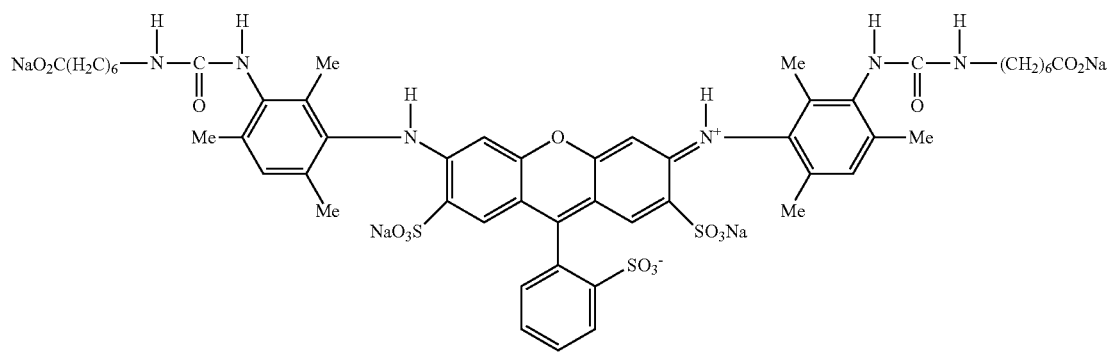

-continued
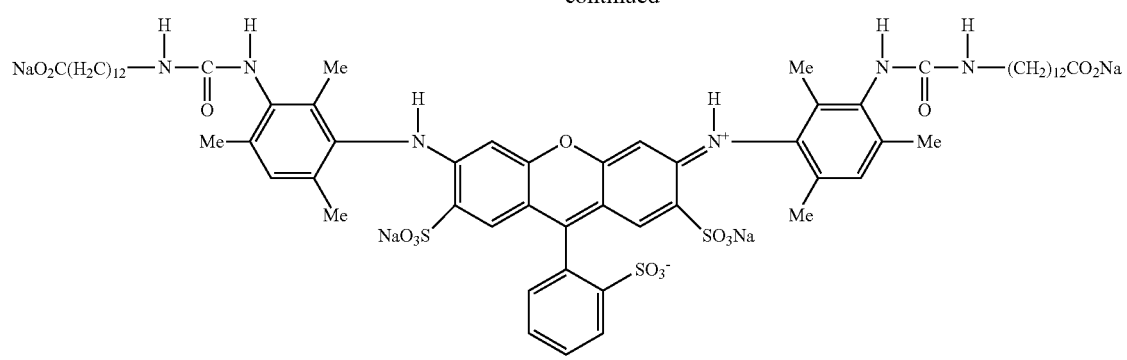
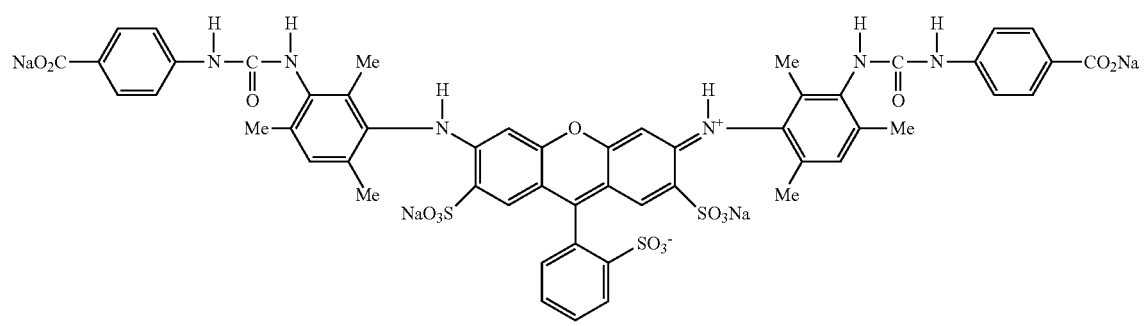
[Chem. 15]
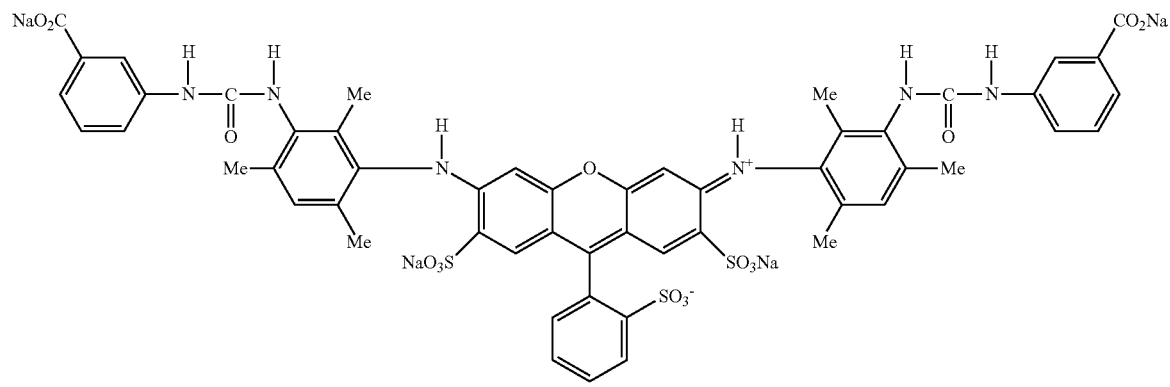
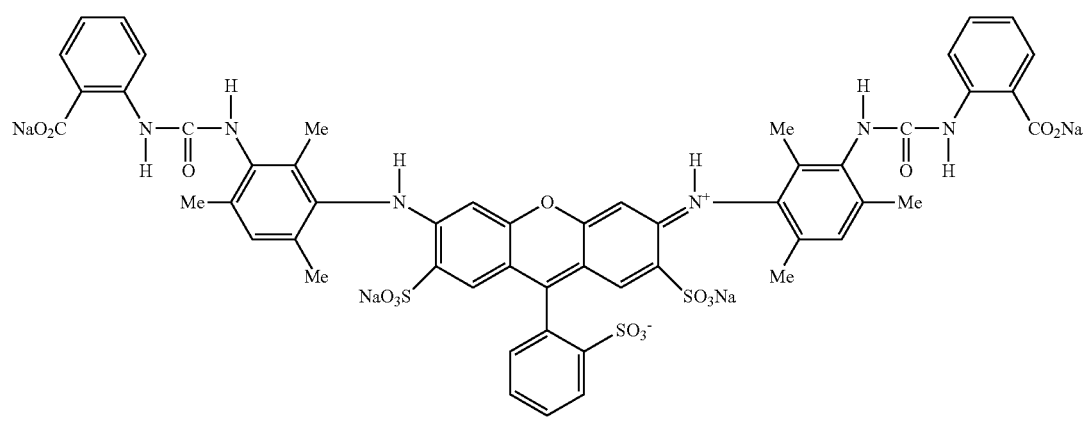

67 68
-continued
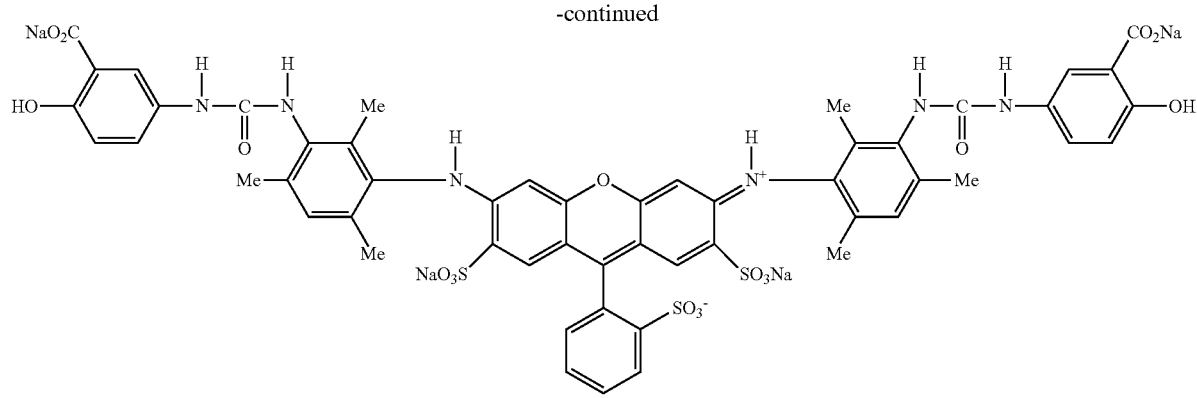
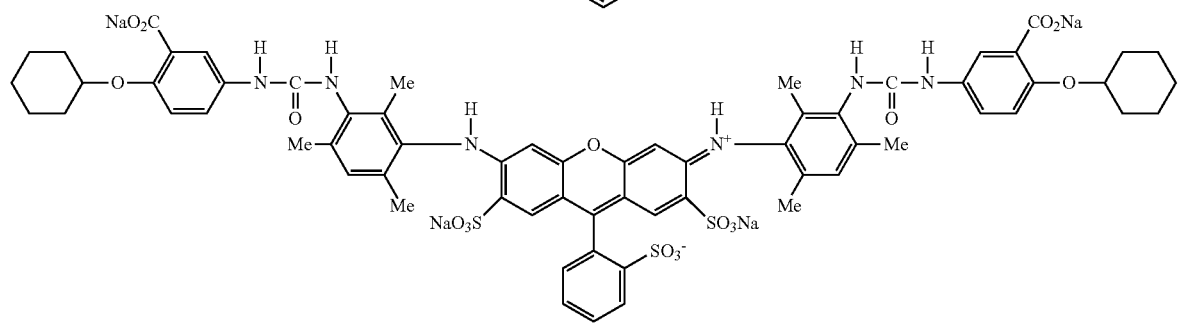
[Chem. 16]
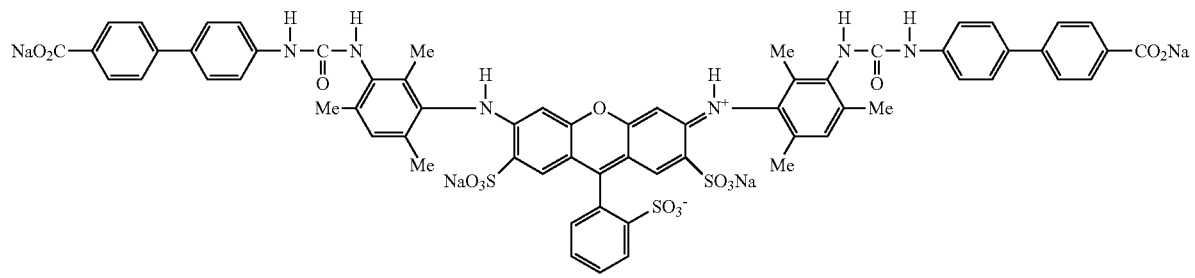
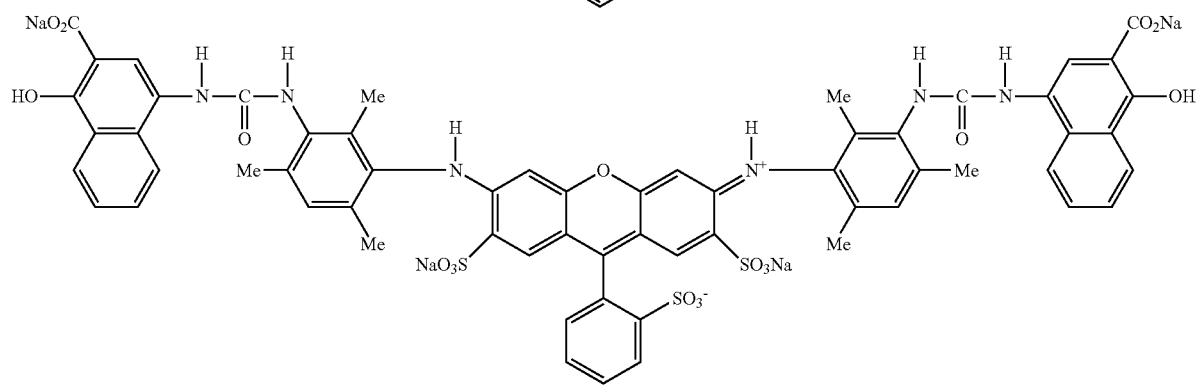
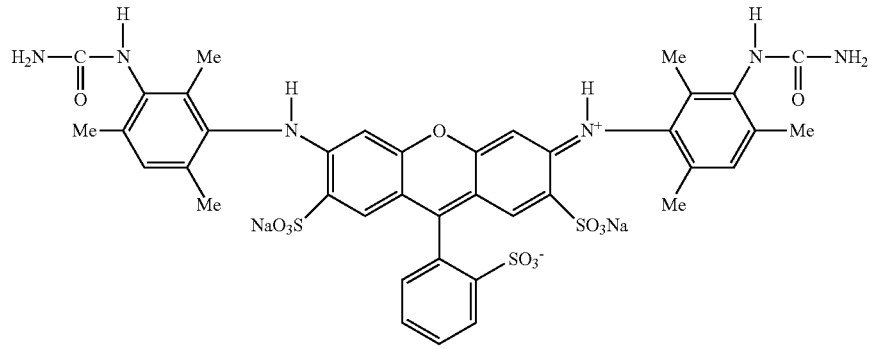

-continued
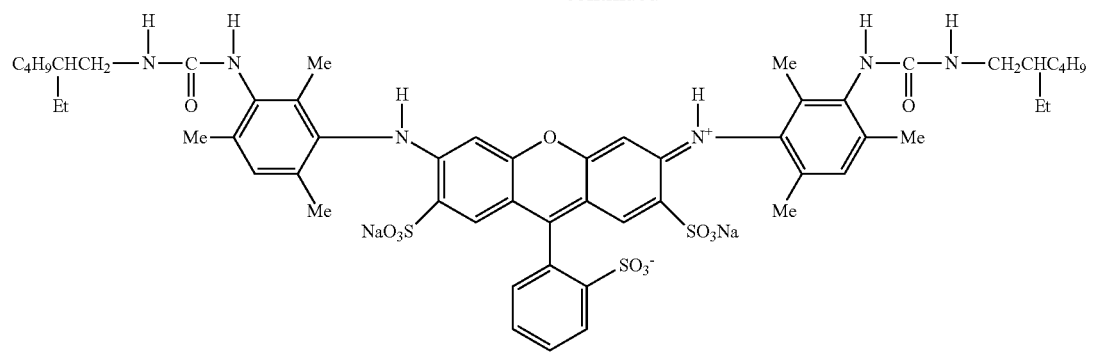
[Chem. 17]
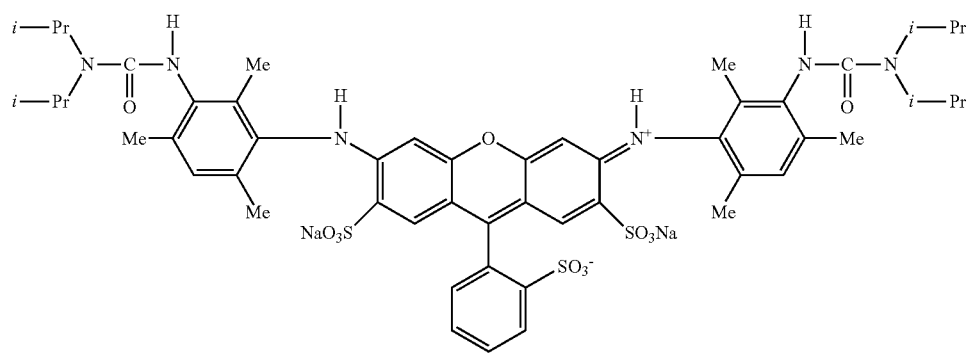
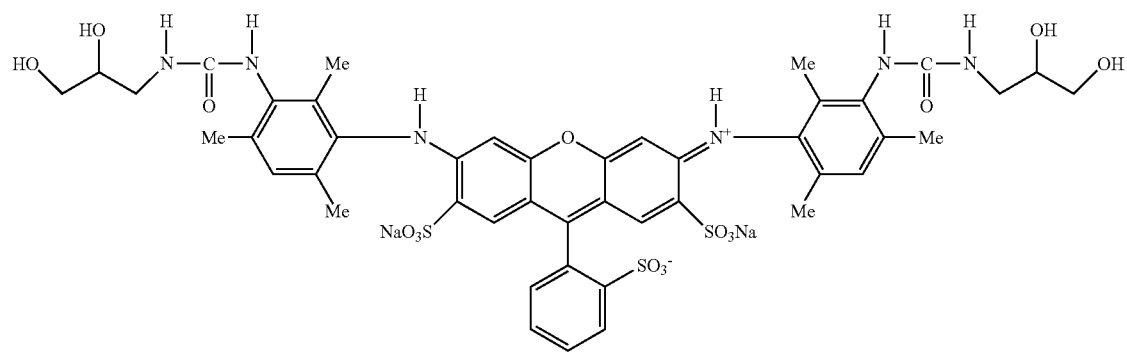
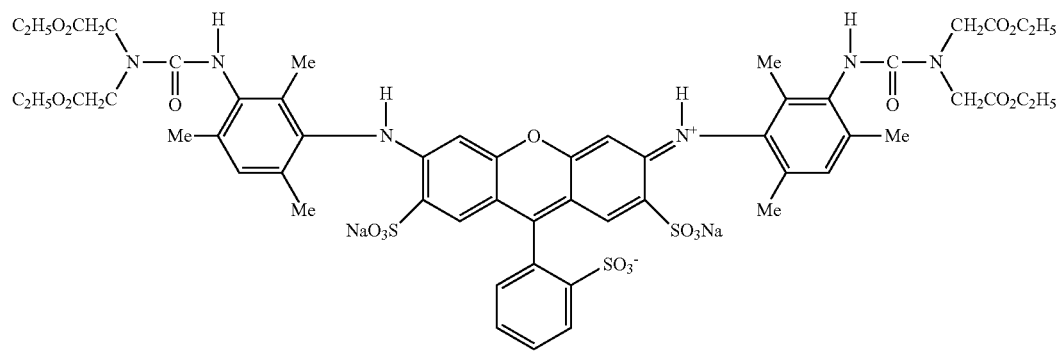

[Chem. 18]
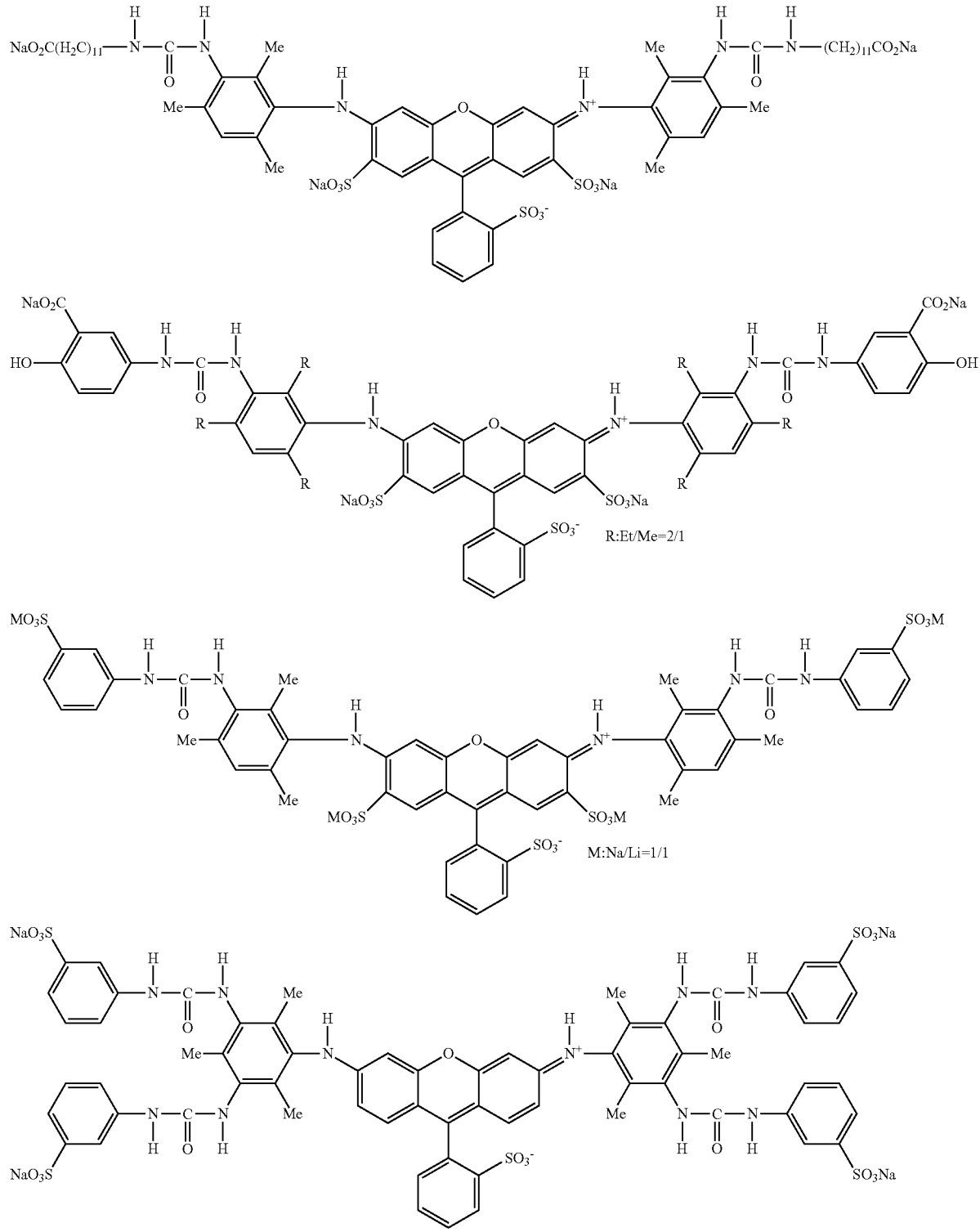

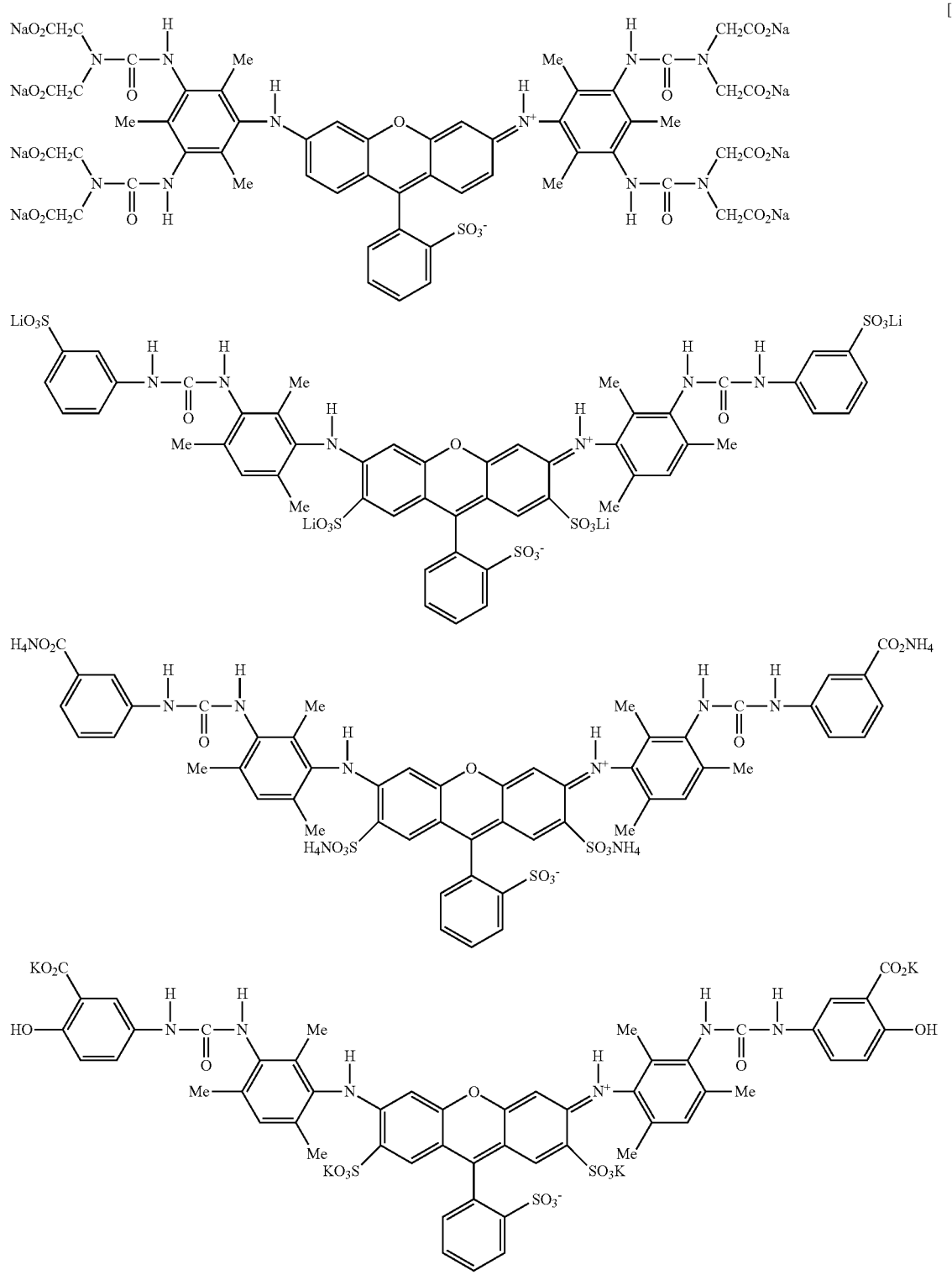

-continued
[Chem. 20]
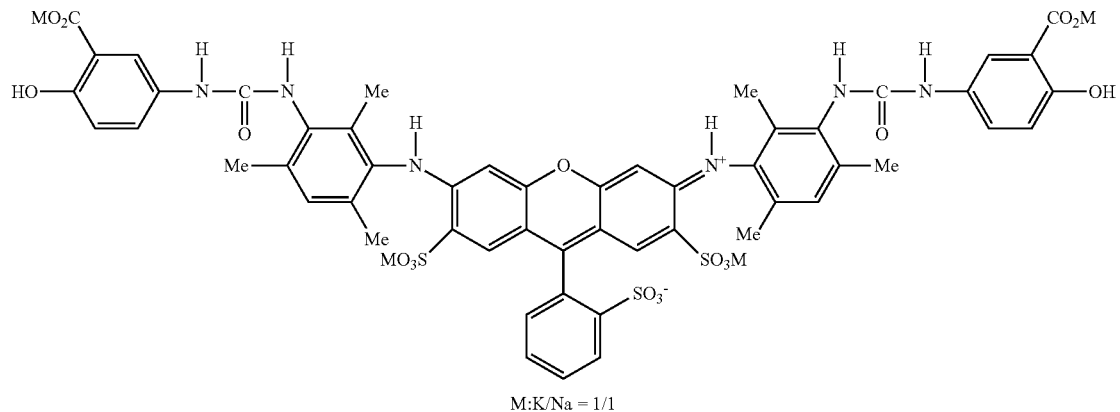
M:K/Na = 1/1
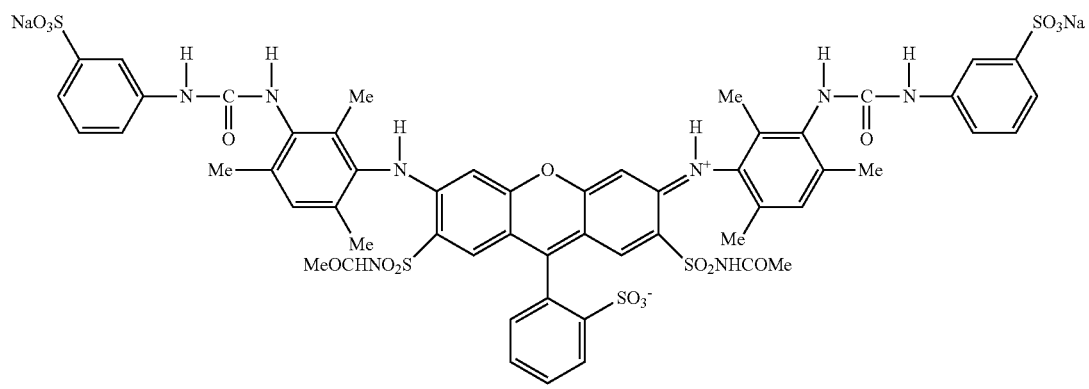
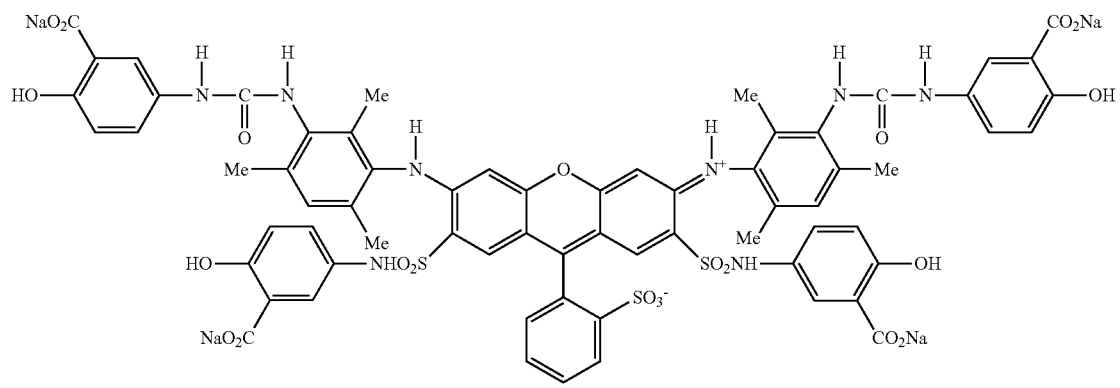
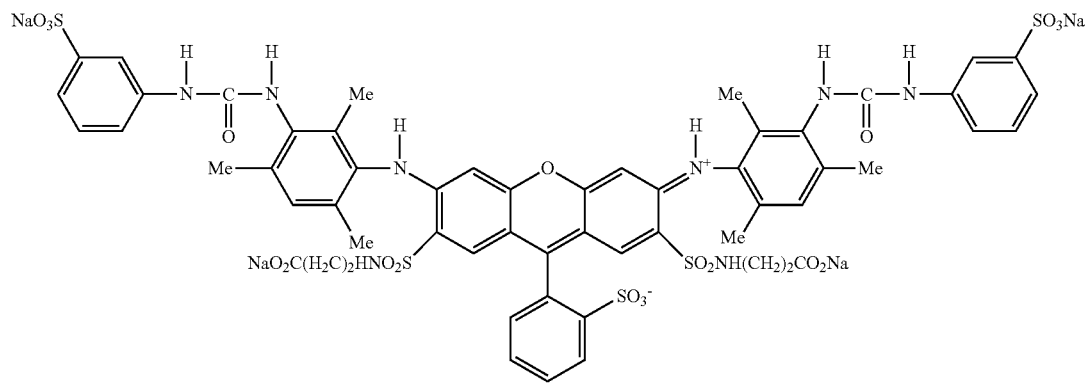

-continued
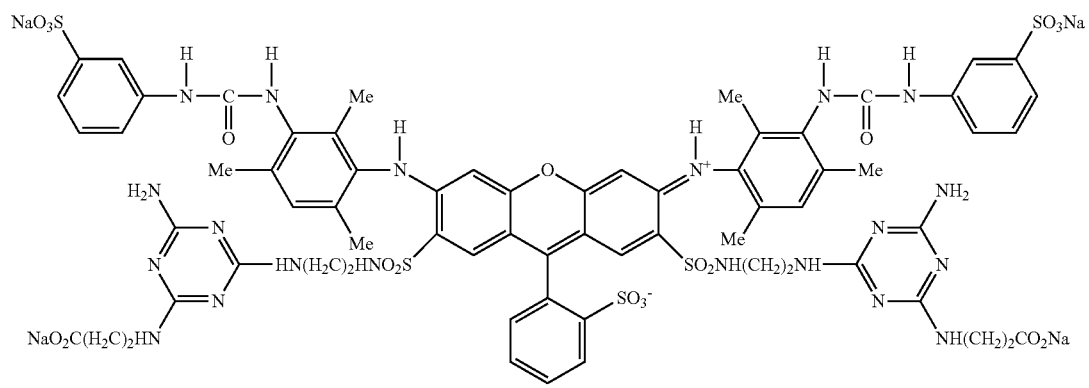
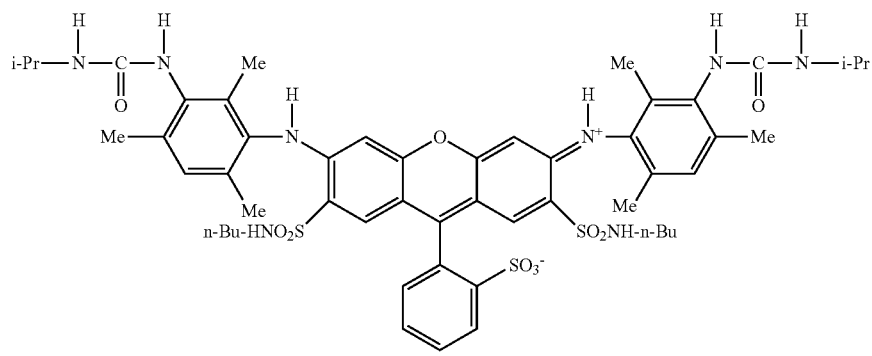
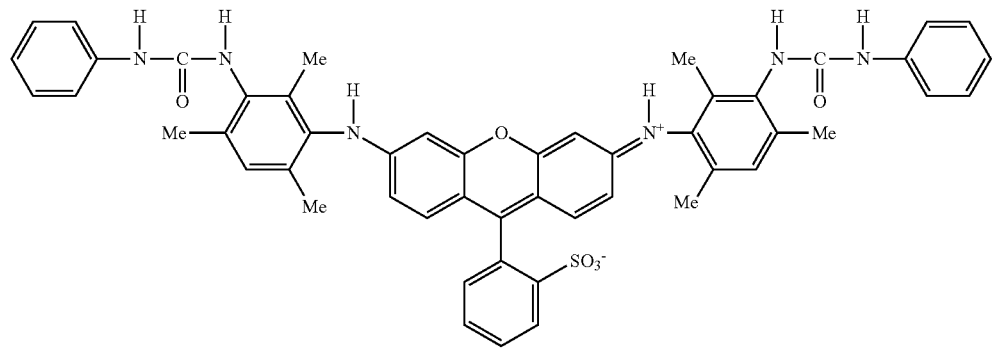
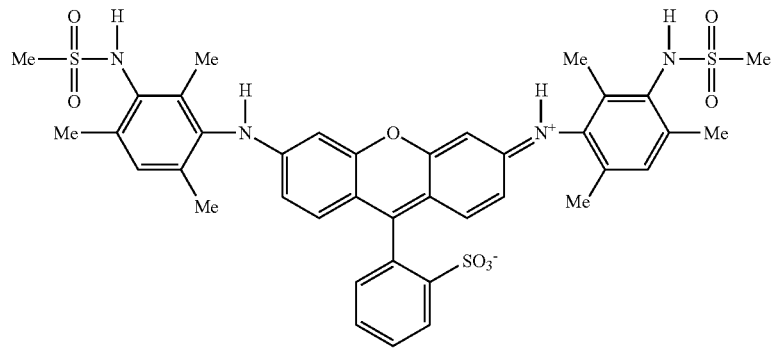

-continued

[Chem. 22]

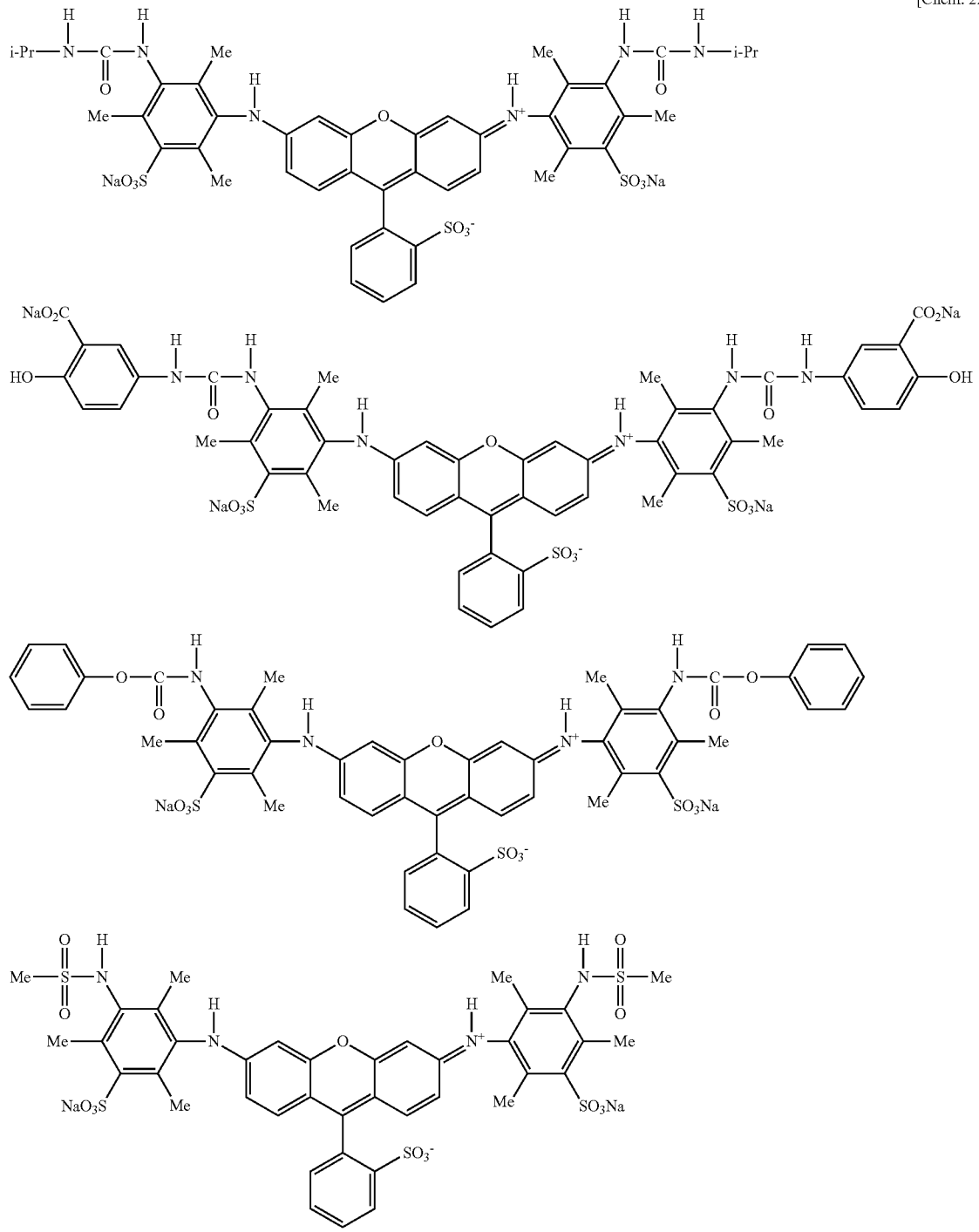

The content of the second dye with respect to the total mass of the second aqueous dye ink is preferably 0.1 percent by mass or more, more preferably 1.0 percent by mass or more, and further preferably 2.0 percent by mass or more. The content of the second dye with respect to the total mass of the second aqueous dye ink is preferably 25.0 percent by mass or less, more preferably 20.0 percent by mass or less, and further preferably 15.0 percent by mass or less.

An amount of monovalent cations in the second aqueous dye ink is preferably 3,000 ppm or less with respect to the total mass of the second aqueous dye ink. Since the amount of monovalent cations is 3,000 ppm or less, aggregation is suppressed when the second aqueous dye ink is mixed with the pigment, and generation of deposits in the cap can be suppressed. The amount of monovalent cations in the second aqueous dye ink is preferably 2,800 ppm or less, more preferably 2,600 ppm or less, and further preferably 2,500 ppm or less. Since the amount of monovalent cations is the value described above or less, when the second aqueous dye ink is mixed with the pigment, the aggregation is further suppressed, and the generation of deposits in the cap can be further suppressed. The amount of monovalent cations in the second aqueous dye ink with respect to the total mass of the second aqueous dye ink is preferably 200 ppm or more, more preferably 500 ppm or more, and further preferably 1,000 ppm or more. Since the amount of monovalent cations is the value described above or more, the color developing property of the dye ink can be enhanced.

Water and an aqueous organic solvent contained in the second aqueous dye ink and the amounts thereof are the same as those described by way of example in the first aqueous dye ink.

The second aqueous dye ink may contain, besides the components described above, a resin binder, a dispersant, a surfactant, a viscosity modifier, a surface tension adjuster, a pH adjuster, a dye solubilizer, an antiseptic/fungicide agent, and/or an antirust agent.

Third Aqueous Dye Ink

The third aqueous dye ink contains a third dye. As the third dye, a dye represented by the following formula (Y-1) is preferable. Since a dye ink containing the dye represented by the formula (Y-1) as the third aqueous dye ink in combination with the first aqueous dye ink described above is used, a discoloration rate becomes similar to that of the image formed using the first aqueous dye ink, and hence, the change in color tone caused by aging degradation can be prevented.

Although the ionic hydrophilic group is not particularly limited, for example, a sulfo group, a carboxyl group, a phospho group, or a quaternary ammonium group may be mentioned. Among those mentioned above, a sulfo group, a carboxyl group, or a phospho group is preferable, a sulfo group or a carboxyl group is more preferable, and a sulfo group is further preferable. Although being not particularly limited, the number of ionic hydrophilic groups for substitution is preferably 1 to 5, more preferably 1 to 4, further preferably 1 to 3, more further preferably 1 or 2, and even more further preferably 1.

Although the alkyl group substituted with the ionic hydrophilic group is not particularly limited, for example, there may be mentioned a sulfomethyl group, a sulfoethyl group, a 2,3-disulfopropyl group, a 3-sulfopropyl group, a 4-sulfobutyl group, a 5-sulfopentyl group, a 6-sulfohexyl group, a 7-sulfoheptyl group, a 8-sulfooctyl group, a carboxymethyl group, a carboxyethyl group, a 3-carboxypropyl group, a 4-carboxybutyl group, a 5-carboxypentyl group, a 6-carboxyhexyl group, a 7-carboxyheptyl group, a 8-carboxyoctyl group, a phosphomethyl group, a phosphoethyl group, a 3-phosphopropyl group, a 4-phosphobutyl group, a 5-phosphopentyl group, a 6-phosphohexyl group, a 7-phosphoheptyl group, a 8-phosphooctyl group, a trimethylammoniummethyl group, a trimethylammoniumethyl group, a 3-trimethylammoniumpropyl group, a 4-trimethylammoniumbutyl group, a 5-trimethylammoniumpentyl group, a

[Chem. 23]

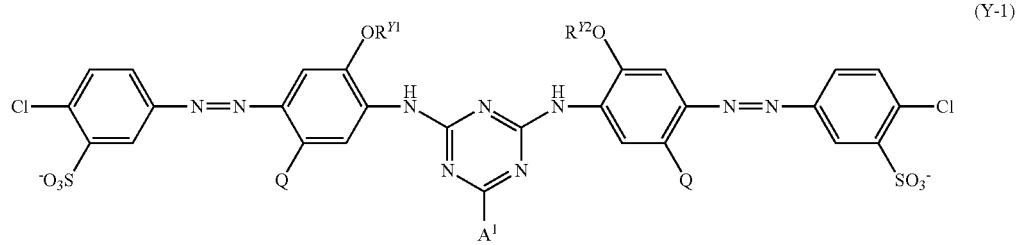

(Y-1)

In the formula (Y-1), Q's each independently represent a halogen atom, $R^{Y1}$ and $R^{Y2}$ each independently represent an alkyl group substituted with an ionic hydrophilic group, $A^1$ represents a group represented by the following formula (A1-1), a monoalkylamino group having a sulfo group, an alkoxy-substituted alkylamino group, a monoalkylamino group, a monoalkylamino group having at least two hydroxyl groups, or a cyclic amino group.

[Chem. 24]

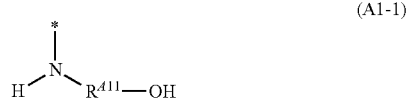

(A1-1)

In the formula ($A^1$-1), $R^{411}$ represents a branched chain alkylene group, and * represents a bonding site.

As the halogen atom at Q, a fluorine atom, a chlorine atom, a bromine atom, or an iodine atom may be mentioned. Among those mentioned above, a fluorine atom or a chlorine atom is preferable, and a chlorine atom is more preferable.

In $R^{Y1}$ and $R^{Y2}$, the number of carbon atoms of the alkyl group is preferably two to four and more preferably three.

6-trimethylammoniumhexyl group, a 7-trimethylammoniumheptyl group, a 8-trimethylammoniumoctyl group, a 2-methyl-3-sulfopropyl group, a 2,2-dimethyl-3-sulfopropyl group, a 4-sulfocyclohexyl group, or a 2,5-disulfocyclohexylmethyl group. Among those mentioned above, a 3-sulfopropyl group is preferable.

$A^1$ is a group preferably represented by the formula ($A^1$-1). Since $A^1$ is the group represented by the formula ($A^1$-1), a discoloration rate becomes similar to that of the image formed using the first aqueous dye ink, and hence, the change in color tone caused by aging degradation can be prevented.

$R^{411}$ represents a branched chain alkylene group. The number of carbon atoms of the alkylene group of $R^{411}$ is preferably an integer of 2 to 20, more preferably an integer of 3 to 12, further preferably an integer of 3 to 8, and more further preferably an integer of 3 to 6.

Although the group represented by the formula (A1-1) is not particularly limited, for example, there may be mentioned an isopropylene group, an isobutylene group, an s-butylene group, a t-butylene group, a 1-methyl-n-butylene group, a 2-methyl-n-butylene group, a 3-methyl-n-butylene group, a 1,1-dimethyl-n-propylene group, a 1,2-dimethyl-n-propylene group, a 2,2-dimethyl-n-propylene group, a 1-ethyl-n-propylene group, a n-hexylene group, a 1-methyln-pentylene group, a 2-methyl-n-pentylene group, a 3-methyl-n-pentylene group, a 4-methyl-n-pentylene group, a 1,1-dimethyl-n-butylene group, a 1,2-dimethyl-n-butylene group, a 1,3-dimethyl-n-butylene group, a 2,2-dimethyl-n-butylene group, a 2,3-dimethyl-n-butylene group, a 3,3-dimethyl-n-butylene group, a 1-ethyl-n-butylene group, a 2-ethyl-n-butylene group, a 1,1,2-trimethyl-n-propylene group, a 1,2,2-trimethyl-n-propylene group, a 1-ethyl-1-methyl-n-propylene group, or a 1-ethyl-2-methyl-n-propylene group. Among those mentioned above, an isobutylene group or a 3-methyl-n-butylene group is preferable.

Although the third dye is not particularly limited, for example, the following compounds may be mentioned.

[Chem. 25]

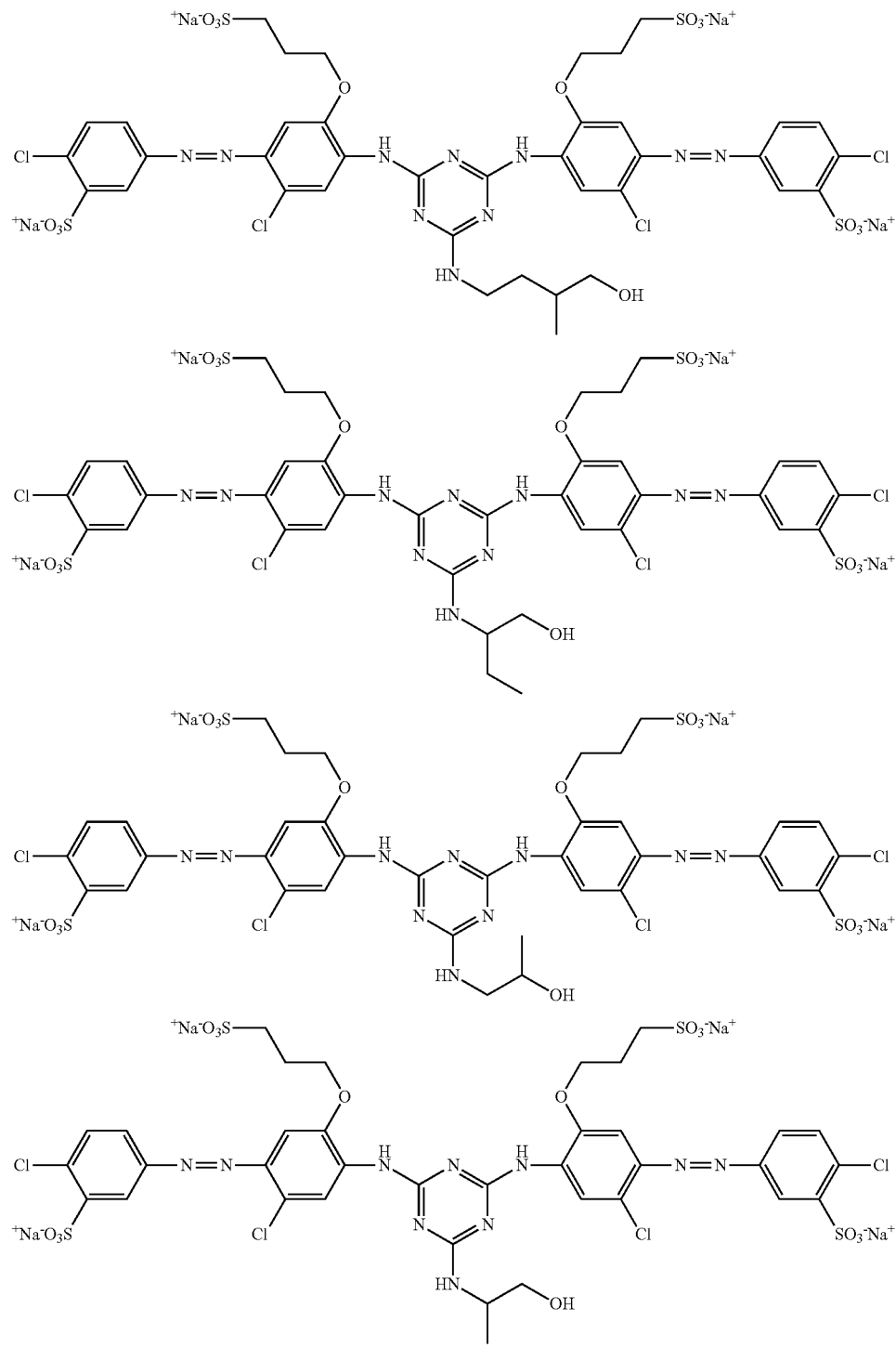

-continued
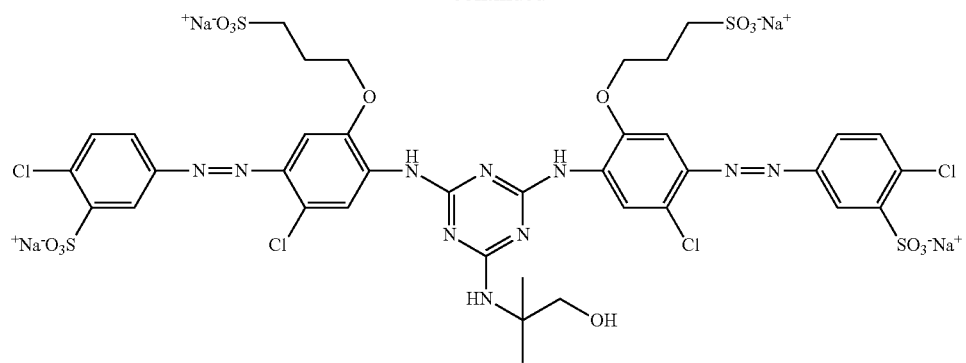
[Chem. 26]
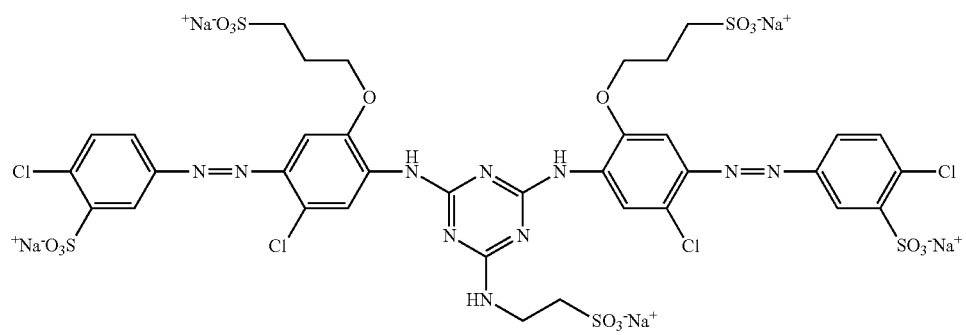
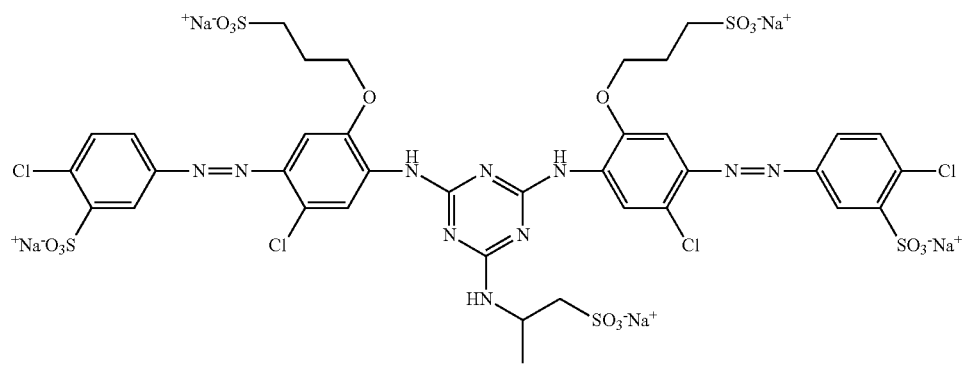
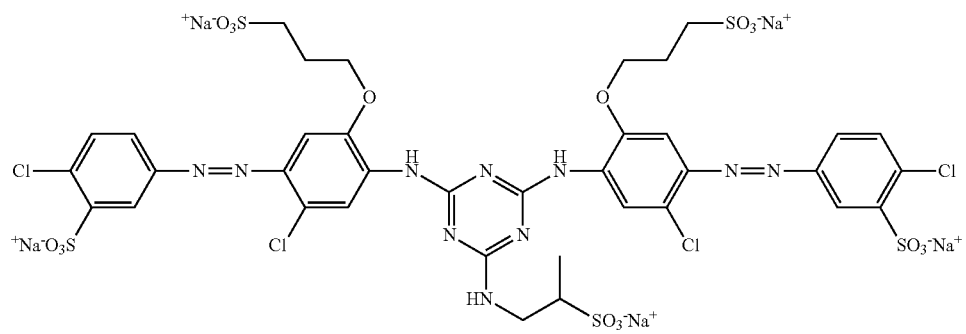

-continued

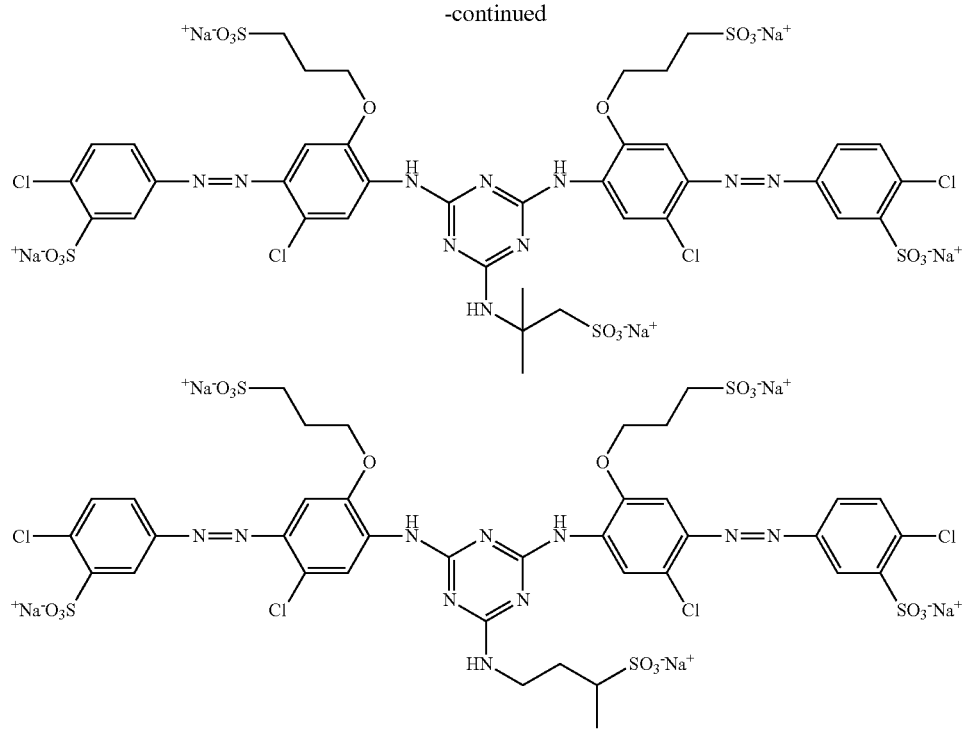

Among those mentioned above, a dye having the group represented by the formula (A$^1$-1) is preferable. When the third aqueous dye ink is mixed with the pigment ink, aggregation can be further suppressed, and the change in color tone caused by aging degradation can be prevented.

The content of the third dye with respect to the total mass of the third aqueous dye ink is preferably 0.1 percent by mass or more, more preferably 1.0 percent by mass or more, and further preferably 2.0 percent by mass or more. The content of the third dye with respect to the total mass of the third aqueous dye ink is preferably 25.0 percent by mass or less, more preferably 20.0 percent by mass or less, and further preferably 15.0 percent by mass or less.

An amount of monovalent cations in the third aqueous dye ink is preferably 6,000 ppm or less with respect to the total mass of the third aqueous dye ink. Since the amount of monovalent cations is 6,000 ppm or less, when the third aqueous dye ink is mixed with the pigment, the aggregation is suppressed, and the generation of deposits in the cap is suppressed. The amount of monovalent cations in the third aqueous dye ink is preferably 5,500 ppm or less and more preferably 5,000 ppm or less. Since the amount of monovalent cations is in the range described above, when the third aqueous dye ink is mixed with the pigment, the aggregation is further suppressed, and the generation of deposits in the cap can be further suppressed. The amount of monovalent cations in the third aqueous dye ink with respect to the total mass of the third aqueous dye ink is preferably 200 ppm or more, more preferably 500 ppm or more, and further preferably 1,000 ppm or more. Since the amount of monovalent cations is the value described above or less, the color developing property of the dye ink can be enhanced.

Water and an aqueous organic solvent contained in the third aqueous dye ink and the amounts thereof are the same as those described by way of example in the first aqueous dye ink.

The third aqueous dye ink may contain, besides the components described above, a resin binder, a dispersant, a surfactant, a viscosity modifier, a surface tension adjuster, a pH adjuster, a dye solubilizer, an antiseptic/fungicide agent, and/or an antirust agent.

Aqueous Pigment Ink

The aqueous pigment ink contains a self-dispersible pigment. Since being used in combination with the aqueous dye ink described above, when the aqueous pigment ink and the aqueous dye ink are mixed with each other, aggregation of the self-dispersible pigment can be suppressed.

The self-dispersible pigment is a pigment capable of being dispersed in an aqueous medium with no dispersant. In this case, "being dispersed in an aqueous medium with no dispersant" indicates a state in which without using a dispersant which disperses a pigment, by hydrophilic groups on the surface of the pigment, the pigment is stably present in the aqueous medium. When the self-dispersible pigment is used, since the amount of a dispersant to disperse the pigment can be decreased, foaming of the ink caused by the dispersant can be reduced, and an ink excellent in ejection stability is likely to be prepared. In addition, when the self-dispersible pigment is used, since an increase in viscosity of the dispersant itself can be prevented, an increase in pigment concentration can be realized, and hence, a high color development can be achieved.

A specific surface area of the self-dispersible pigment is preferably 10 to 76 mm$^2$/g. This specific surface area is a value calculated from a measurement using a pulse NMR. The specific surface area is a parameter indicating the polarity, that is, the hydrophilicity or the hydrophobicity of a pigment particle. As the specific surface area is larger, the pigment has a higher hydrophilic property and is regarded to be stably dispersed in an aqueous solution. When the specific surface area is 10 m$^2$/g or more, the aggregation is further suppressed. On the other hand, when the specific surface area is 76 m²/g or less, the color developing property of the self-dispersible pigment is improved.

The self-dispersible pigment is preferably surface-treated by an oxidation treatment using a hypohalous acid or its salt, an oxidation treatment using ozone, or an oxidation treatment using persulfuric acid or its salt. When the concentration and/or the type of oxidizing agent in this oxidation treatment is adjusted, the amount of hydrophilic groups to be introduced on the pigment surface can be adjusted, and hence, the specific surface area of the self-dispersible pigment can be adjusted.

The aqueous pigment ink is preferably used as a black ink (hereinafter, also referred to as "aqueous pigment black ink" in some cases). In this case, the self-dispersible pigment is preferably a carbon black. In terms of a high color development, the self-dispersible pigment is preferably a carbon black processed by the surface treatment described above.

The aqueous pigment ink may also be used as a color ink (hereinafter, also referred to as "pigment color ink" in some cases) other than a black color, and in this case, in terms of a high color development, the pigment preferably has the hydrophilic groups on its surface with phenyl groups interposed therebetween. As a surface treatment method which bonds the hydrophilic groups onto the pigment surface with phenyl groups interposed therebetween, various known surface treatment methods may be used, and for example, there may be mentioned a method in which hydrophilic groups are bonded to the pigment surface with phenyl groups interposed therebetween by bonding sulfanilic acid, p-aminobenzoic acid, 4-aminosalicylic acid, or the like on the pigment surface.

As a commercially available product of a carbon black as the self-dispersible pigment, for example, "CW-1", "CW-3", or "CW-5" (trade name, manufactured by Orient Chemical Industries Co., Ltd.) may be mentioned.

The content of the self-dispersible pigment with respect to the total mass of the aqueous pigment ink is preferably 0.1 percent by mass or more, more preferably 1.0 percent by mass or more, and further preferably 2.0 percent by mass or more. The content of the self-dispersible pigment with respect to the total mass of the aqueous pigment ink is preferably 20.0 percent by mass or less, more preferably 15.0 percent by mass or less, and further preferably 10.0 percent by mass or less.

Water and an aqueous organic solvent contained in the aqueous pigment ink and the amounts thereof are the same as those described by way of example in the first aqueous dye ink.

The aqueous pigment ink may contain, besides the components described above, a resin binder, a dispersant, a surfactant, a viscosity modifier, a surface tension adjuster, a pH adjuster, a dye solubilizer, an antiseptic/fungicide agent, and/or an antirust agent.

Ink Jet Recording Apparatus

An ink jet recording apparatus according to this embodiment comprises a first ejection port to eject an aqueous dye ink, a second ejection port to eject an aqueous pigment ink, and a cap to collectively cap the first ejection port and the second ejection port, the cap being composed of the same member as that forming the first ejection port and the second ejection port. The aqueous dye ink and the aqueous pigment ink are received in ink cartridges or the like in the ink jet recording apparatus so as to be ejected from the first ejection port and the second ejection port, respectively.

Hereinafter, the ink jet recording apparatus according to this embodiment will be described with reference to FIGS. 1 to 3. FIG. 1 is a perspective view showing the structure of a printer 1 as the ink jet recording apparatus according to this embodiment. In addition, this printer 1 indicates a serial printer. As shown in FIG. 1, the printer 1 includes a carriage 4 which mounts a recording head 2 and to which an ink cartridge 3 is detachably fitted, a platen 5 which is disposed under the recording head 2 and on which a recording medium 6 is transported, a carriage transfer mechanism 7 which transfers the carriage 4 in a medium width direction of the recording medium 6, and a medium transport mechanism 8 which transports the recording medium 6 in a medium transport direction. In addition, the printer 1 also includes a control device CONT which controls the entire operation of the printer 1. In addition, the medium width direction indicates a main scanning direction (head scanning direction). The medium transport direction indicates a sub-scanning direction (direction orthogonal to the main scanning direction).

The ink cartridge 3 according to this embodiment includes independent ink cartridges 3a, 3b, 3c, and 3d. In the ink cartridges 3a to 3d, the aqueous pigment ink and the aqueous dye inks described above are respectively filled. In this embodiment, the aqueous pigment ink, the first aqueous dye ink, the second aqueous dye ink, and the third aqueous dye ink are filled in the ink cartridges 3a, 3b, 3c, and 3d, respectively.

The arrangement sequence of the ink cartridge 3 is not particularly limited, and the cartridges may be arranged in a desired order. In addition, the first aqueous dye ink, the second aqueous dye ink, and the third aqueous dye ink correspond to the dye inks described above, and the color phases thereof are different from each other.

The carriage 4 is fitted so as to be supported by a guide rod 9 functioning as a support member provided in the main scanning direction. In addition, the carriage 4 is to be transferred in the main scanning direction along the guide rod 9 by the carriage transfer mechanism 7.

A linear encoder 10 is configured to detect a position of the carriage 4 in the main scanning direction by a signal. The signal thus detected is to be sent to the control device CONT as positional information. The control CONT is configured to recognize a scanning position of the recording head 2 based on the positional information from this linear encoder 10 and to control a recording operation (ejection operation) performed by the recording head 2. In addition, the control device CONT is configured to perform a variable control of the transfer rate of the carriage 4.

Figure 2:
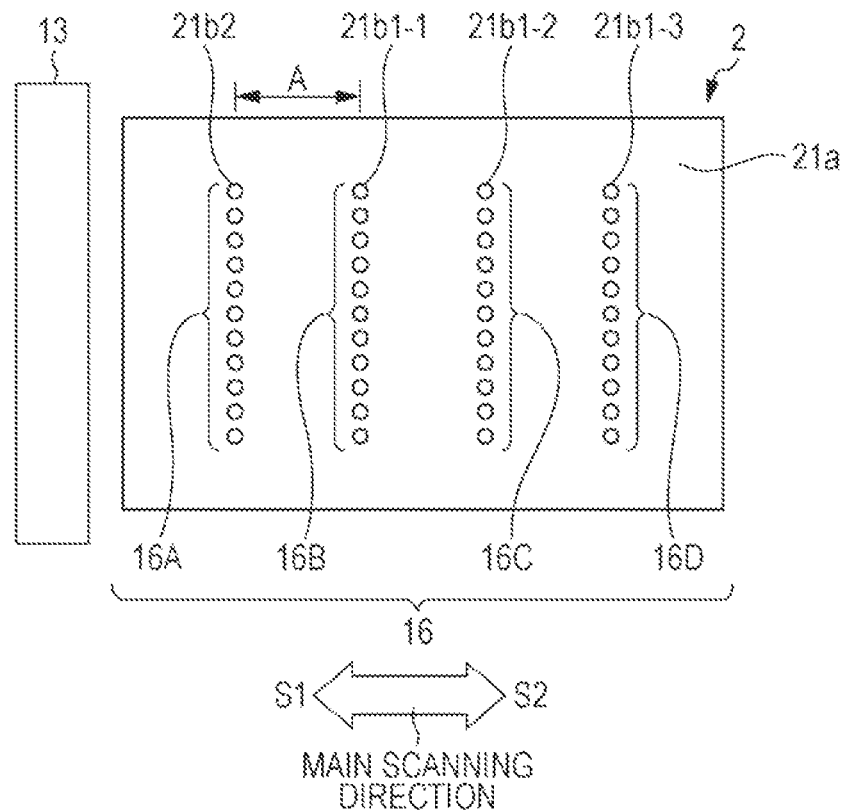
FIG. 2 is a schematic view showing a nozzle plate 21a in a recording head 2 according to this embodiment.

FIG. 2 is a schematic view showing a nozzle plate 21a of the recording head 2 according to this embodiment. As shown in FIG. 2, the recording head 2 has the nozzle plate 21a. In the nozzle plate 21a which also functions as an ejection surface of the ink, a plurality of nozzle lines 16 is provided. The nozzle lines 16 are each formed of ejection ports 21b each of which function as a nozzle hole to eject the ink.

The nozzle lines 16 are formed to be able to eject inks having different compositions from each other. In the example shown in FIG. 2, four nozzle lines corresponding to the ink compositions are provided and are each arranged along the main scanning direction. In particular, a nozzle line 16A formed of second ejection ports 21b2 each of which eject the aqueous pigment ink, a nozzle line 16B formed of first ejection ports 21b1-1 each of which eject the first aqueous dye ink, a nozzle line 16C formed of first ejection ports 21b1-2 each of which eject the second aqueous dye ink, and a nozzle line 16D formed of first ejection ports 21b1-3 each of which eject the third aqueous dye ink are provided.

In the example shown in FIG. 2, although the nozzle lines 16A to 16D extend in the nozzle plate 21 along a direction orthogonal to the main scanning direction, the arrangement thereof is not limited thereto, and the nozzle lines 16A to 16D each may be provided in the nozzle plate 21 to have an angle with respect to the direction orthogonal to the main scanning direction.

A distance A between the nozzle lines is preferably 4 to 8 mm. The reason for this is that when the distance between the nozzle lines is short, by mixing between the pigment ink and the dye ink in the cap, aggregates are liable to be disadvantageously deposited in the cap.

In a region of the platen 5 outside of a transfer range of the recording head 2, a home position functioning as a scanning start point of the recording head 2 is provided. At this home position, a maintenance unit 11 including a cap 12 and a wiper 13 is provided.

Figure 3:
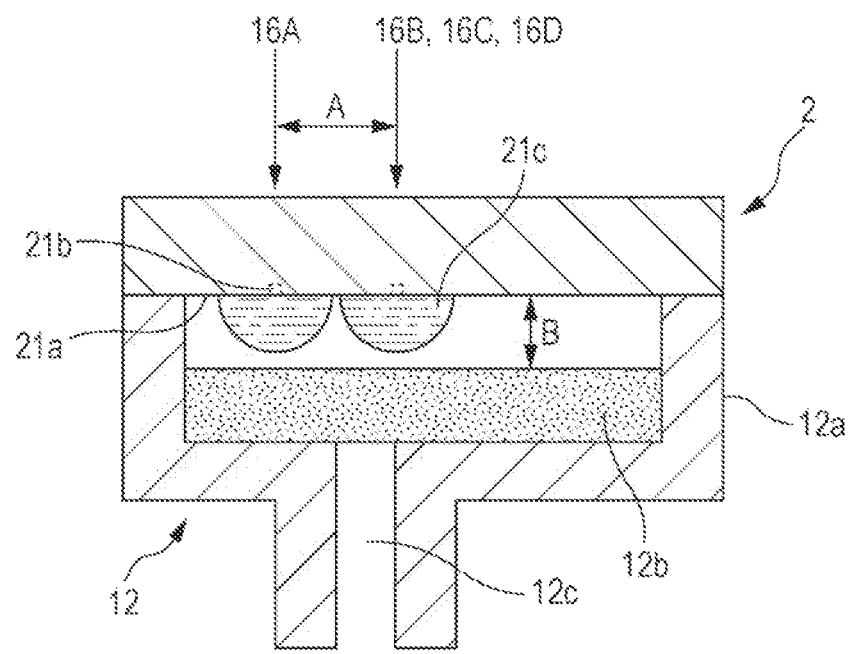
FIG. 3 is a schematic view showing the structure of a cap 12.

FIG. 3 is a schematic view showing the structure of the cap 12. As shown in FIG. 3, the printer 1 according to this embodiment includes the cap 12 to receive an ink discharged by ink jet cleaning or flushing. The cap 12 is configured to collectively cap the ejection ports 21b corresponding to the pigment ink and the dye inks, the cap being composed of the same member as that forming the ejection ports 21b. In this case, the cap 12 is a cap to collectively caps the ejection ports 21b corresponding to the pigment ink and the dye inks, the cap being composed of the same member as that forming the ejection ports 21b, and when being brought into contact with the nozzle plate 21, the cap caps the ejection ports 21b described above in the same space. In addition, the same member indicates that at least a member forming a contact surface of the cap 12 may be the same as that of the nozzle plate 21a. When ink jet cleaning or flushing is performed, the ink cartridge 3 is transferred so that the nozzle plate 21 of the recording head 2 is disposed to face the cap 12.

The cap 12 includes a cap main body 12a, an absorbent 12b, and a waste ink suction port 12c. In a state in which the nozzle plate 21a and the cap 12 are disposed to face each other, a distance B between the nozzle plate 21a and the absorbent 12b disposed in the cap 12 is preferably 0.6 to 2.5 mm. When the distance B is more than 2.5 mm, many liquid pools are generated on a nozzle surface in cleaning and cannot be fully removed even by wiping. On the other hand, if the distance B is less than 0.5 mm, when being swollen by absorption of the ink, the absorbent comes into contact with the head, and the head is contaminated.

Ink Jet Recording Method

An ink jet recording method of this embodiment uses the ink jet recording apparatus according to this embodiment described above. The ink jet recording method of this embodiment comprises a first ink adhesion step of ejecting the aqueous dye ink according to this embodiment by an ink jet method so as to adhere the ink to a recording medium; and a second ink adhesion step of ejecting the aqueous pigment ink according to this embodiment by an ink jet method so as to adhere the ink to the recording medium.

According to the structure described above, the ink jet recording method of this embodiment can suppress the generation of deposits in the cap of the ink jet recording apparatus.

Recording Medium

Although a recording medium is not particularly limited, for example, either an absorptive recording medium or a non-absorptive recording medium may be used. Although the recording method of this embodiment can be widely applied to recording media having various absorptive performances from a non-absorptive recording medium into which a water-soluble ink composition is difficult to permeate to an absorptive recording medium into which a water-soluble ink composition is easy to permeate, the recording method of this embodiment is preferably applied to an absorptive recording medium.

The "absorptive recording medium" in this specification indicates a recording medium having a property of absorbing an ink composition. The "non-absorptive recording medium" indicates a recording medium having a property of absorbing no ink composition or a property of hardly absorbing an ink composition. In a quantitative point of view, the "absorptive recording medium" is a recording medium having a water absorption of more than 10 mL/m$^2$ in a period of from a contact start to 30 msec$^{1/2}$ by Bristow method. The "non-absorptive recording medium" is a recording medium having a water absorption of 10 mL/m$^2$ or less. The details of Bristow method has been disclosed in Standard No. 51 "Paper and Paperboard-Liquid Absorption Test Method-Bristow Method", JAPAN TAPPI PAPER AND PULP TEST METHODS, 2000.

Although the absorptive recording medium is not particularly limited, for example, there may be mentioned regular paper, such as electrophotographic paper, having a high ink composition permeability; ink jet paper (ink jet exclusive paper including an ink absorptive layer formed of silica particles or alumina particles or an ink absorptive layer formed of a hydrophilic polymer, such as a poly(vinyl alcohol) (PVA) or a poly(vinyl pyrrolidone) (PVP)); or art paper, coated paper, or cast paper, each of which have a relatively low ink permeability.

Although the non-absorptive recording medium is not particularly limited, for example, there may be mentioned a film or a plate made of a plastic, such as a poly(vinyl chloride), a polyethylene, a polypropylene, or a poly(ethylene terephthalate) (PET); a plate of a metal, such as iron, silver, copper, or aluminum; a metal plate or a plastic-made film manufactured by deposition of at least one of the metals mentioned above; or an alloy plate of stainless steel, a brass, or the like.

In the first ink adhesion step and the second ink adhesion step, an ink jetting amount is preferably 1.0 to 5.0 mg/inch$^2$ and more preferably 2.0 to 4.0 mg/inch$^2$.

Nozzle Cleaning Step

The ink jet recording method of this embodiment preferably further comprises a nozzle cleaning step of ejecting and mixing the aqueous dye ink according to this embodiment and the aqueous pigment ink according to this embodiment in the cap and then discharging the mixture therefrom.

The case in which the printer 1 is used will be described by way of example. As shown in FIG. 3, by ink jet cleaning or flushing, ink droplets 21c are ejected from the ejection ports 21b into the cap 12. Those ink droplets 21c are absorbed in the absorbent 12b disposed in the cap 12 and then discharged outside through the waste ink suction port 12c. In this step, in the cap 12, when the aqueous dye ink and the aqueous pigment ink are mixed with each other, the pigment is aggregated, and the aggregates are deposited in the cap in some cases; however, by using the ink set according to this embodiment, the generation of deposits can be suppressed.

The ink jet recording method of this embodiment may further comprise, besides the steps described above, at least one known step of a related ink jet recording method.

EXAMPLES

Hereinafter, with reference to examples and comparative examples, the present disclosure will be described in more detail. However, the present disclosure is not limited to the following examples.

Preparation of Aqueous Dye Ink

Materials were mixed with each other to have compositions shown in the following Tables 20 to 22 and then sufficiently stirred, so that respective ink compositions were obtained. In particular, the materials were uniformly mixed with each other and then filtrated with a filter to remove insoluble materials, so that the respective inks were prepared. In addition, in the following Tables 20 to 22, the numerical unit of the value indicates percent by mass, and the total indicates 100.0 percent by mass.

TABLE 20

| AQUEOUS DYE INK | | | C-ink1 | C-ink2 | C-ink3 | C-ink4 | C-ink5 | C-ink6 | C-ink7 | C-ink8 |
|---|---|---|---|---|---|---|---|---|---|---|
| COMPOSITION (PERCENT BY MASS) | DYE | CE-1 | 4.0 | | | 4.0 | | | | 4.0 |
| | | CE-2 | | 4.0 | | | | | | |
| | | CE-3 | | | 4.0 | | 6.0 | | | |
| | | CE-4 | | | | | | 5.0 | 3.0 | |
| | | NUMBER OF BENZENE RINGS | 0 | 2 | 0 | 0 | 0 | 8 | 8 | 0 |
| | | NUMBER OF ALKYL CHAIN CARBONS | 3 | 2 | 0 | 3 | 0 | 2 | 2 | 3 |
| | ORGANIC SOLVENT | GLYCERIN | 10.0 | 10.0 | 10.0 | 10.0 | 10.0 | 10.0 | 10.0 | 10.0 |
| | | 1,2-HEXANEDIOL | 10.0 | 10.0 | 10.0 | 10.0 | 10.0 | 10.0 | 10.0 | 10.0 |
| | POLY (OXYALKYLENE) ALKYL ETHER | NEWCOL 1006 | 1.0 | 1.0 | 1.0 | — | — | 1.0 | 1.0 | — |
| | | NEWCOL 1210 | — | — | — | 1.0 | 1.0 | — | — | — |
| | ACETYLENE-BASED SURFACTANT | OLFINE E1010 | 1.0 | 1.0 | 1.0 | 1.0 | 1.0 | 1.0 | 1.0 | 1.0 |
| | PURE WATER | | BALANCE | BALANCE | BALANCE | BALANCE | BALANCE | BALANCE | BALANCE | BALANCE |
| | TOTAL | | 100.0 | 100.0 | 100.0 | 100.0 | 100.0 | 100.0 | 100.0 | 100.0 |

CE-1: mixture of a compound represented by the following formula (CE-1A) and a compound represented by the following formula (CE-1B). The mixing ratio was (CE-1A): (CE-1B)=1:9.

[Chem. 27]

(CE-1A)

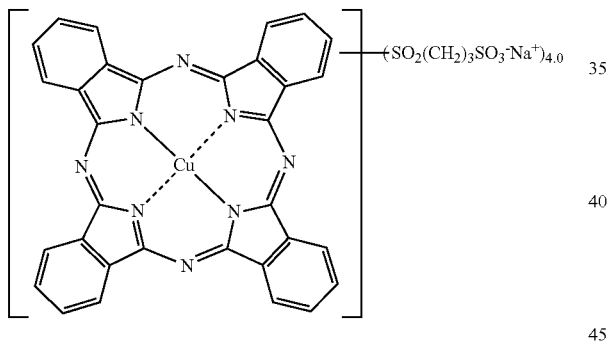

$-(SO_2(CH_2)_3SO_3^-Na^+)_{4.0}$

However, the substitution position was the α-position substitution type (one of 1,4,5,8,9,12,13, and 16-positions) of a phthalocyanine ring. The number of the substituents indicates an average value of the mixture.

[Chem. 28]

(CE-1B)

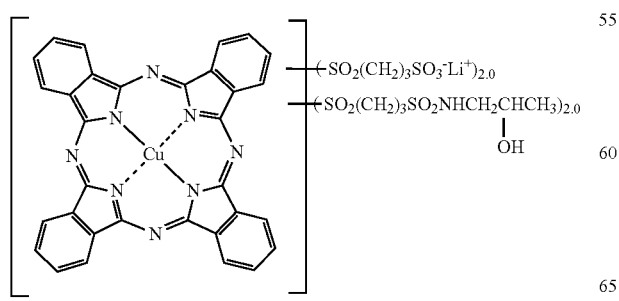

$-(SO_2(CH_2)_3SO_3^-Li^+)_{2.0}$
$-(SO_2(CH_2)_3SO_2NHCH_2CHCH_3)_{2.0}$
$\qquad\qquad\qquad\qquad\quad |$
$\qquad\qquad\qquad\qquad\,\,\,OH$ However, the substitution position was the β-position substitution type (one of 2,3,6,7,10,11,14, and 15-positions) of a phthalocyanine ring. The number of the substituents indicates an average value of the mixture.

CE-2: Compound Represented by the Following Formula (CE-2)

[Chem. 29]

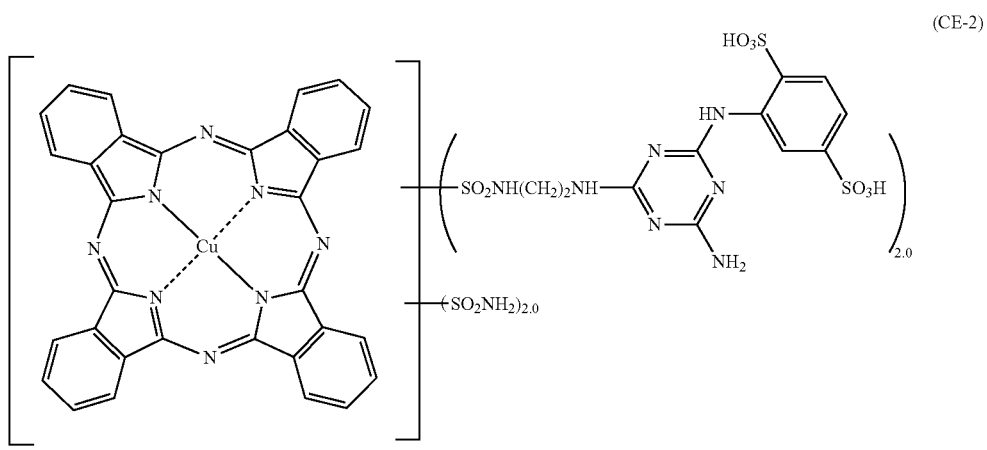

In addition, the number of the substituents indicates an average value of the mixture.

CE-3: Compound Represented by the Following Formula (CE-3)

[Chem. 30]

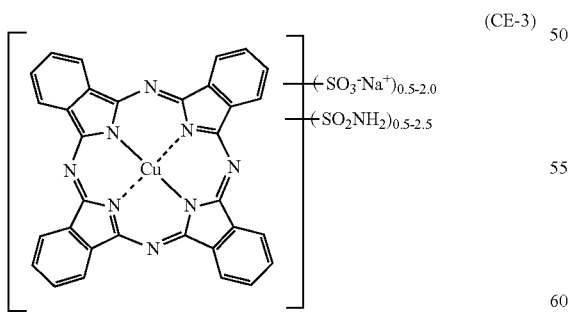

In addition, the number of the substituents indicates an average value of the mixture.

CE-4: Compound Represented by the Following Formula (CE-4)

[Chem. 31]

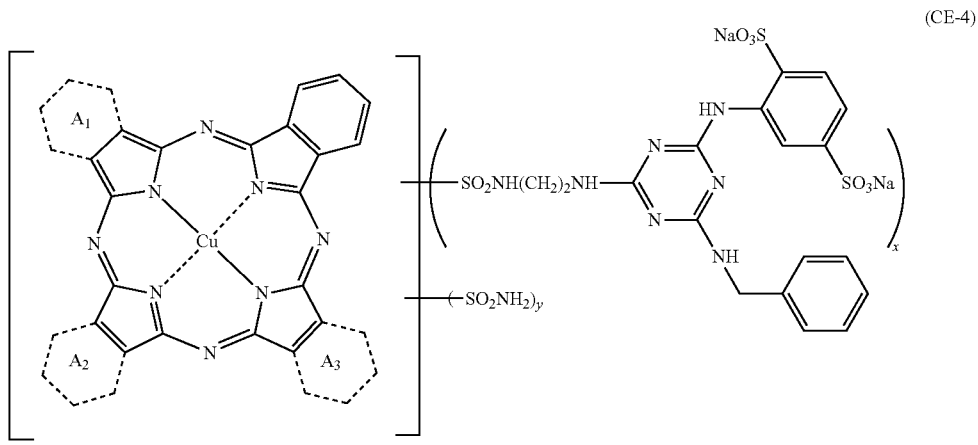

(CE-4)

In the formula, x and y are integers which satisfy $0 \leq x \leq 4$, $0 \leq y \leq 4$, $1 \leq (x+y) \leq 4$, $A_1$, $A_2$, and $A_3$ each represent a benzene ring or a 2,3 (or 3,2)-pyridine ring. At least one of $A_1$, $A^2$, and $A^3$ represents a pyridine ring.

(Poly(Oxyalkylene) Alkyl Ether)

Newcol 1006: polyoxyethylene-2-ethylhexyl ether, "Newcoal 1006" (product name, manufactured by Nippon Nyukazai Co., Ltd.)

Newcol 1210: polyoxyethylene oleyl ether, "Newcoal 1210" (product name, manufactured by Nippon Nyukazai Co., Ltd.)

(Acetylene-Based Surfactant)

Olfine E1010: acetylene-based surfactant "Olfine E1010" (product name, manufactured by Nisshin Chemical Industry Co., Ltd.)

TABLE 21

| AQUEOUS DYE INK | | | M-ink1 | M-ink2 |
|---|---|---|---|---|
| COMPOSITION (PERCENT BY MASS) | DYE | ME-1 | 3.0 | |
| | | ME-2 | | 4.0 |
| | ORGANIC SOLVENT | GLYCERIN | 10.0 | 10.0 |
| | | 1,2-HEXANEDIOL | 10.0 | 10.0 |
| | ACETYLENE-BASED SURFACTANT | OLFINE E1010 | 1.0 | 1.0 |
| | PURE WATER | | BALANCE | BALANCE |
| | TOTAL | | 100.0 | 100.0 |

ME-1: Compound Represented by the Following Formula (ME-1)
[Chem. 32]
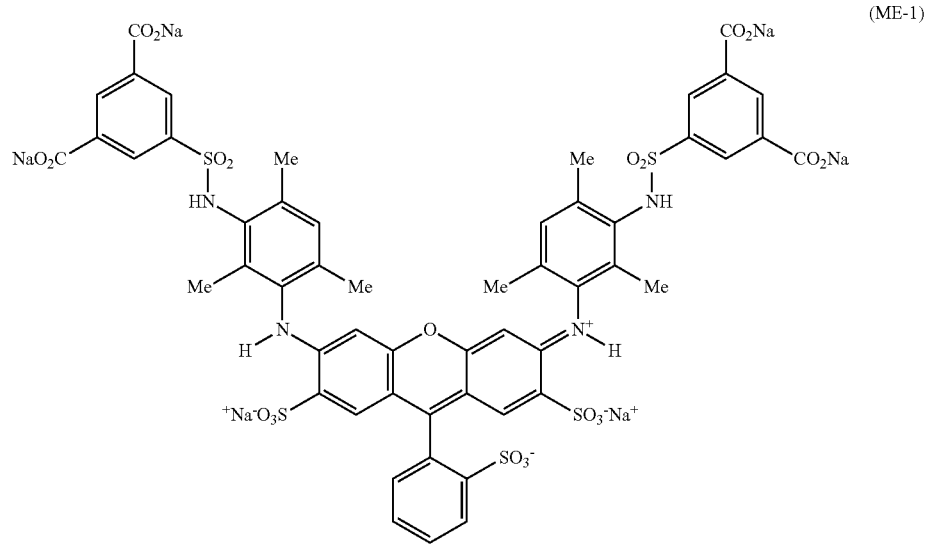
ME-2: Compound Represented by the Following Formula (ME-2)
[Chem. 33]
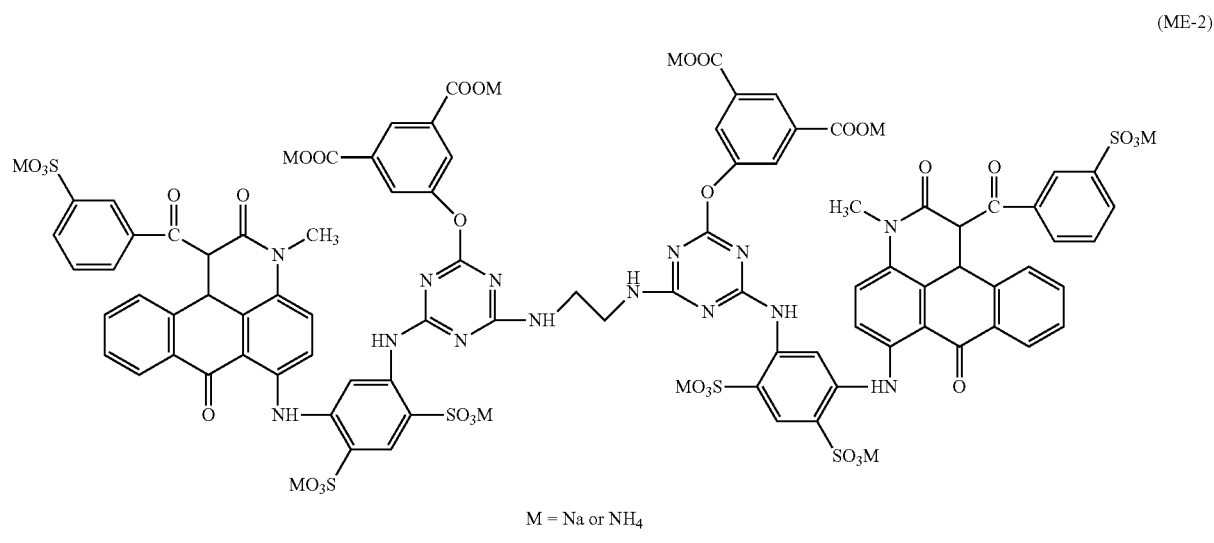
M = Na or $NH_4$
TABLE 22
| AQUEOUS DYE INK | | | Y-ink1 | Y-ink2 |
|---|---|---|---|---|
| COMPOSITION (PERCENT BY MASS) | DYE | YE-1 | 4.0 | |
| | | YE-2 | | 4.0 |
| | ORGANIC SOLVENT | GLYCERIN | 10.0 | 10.0 |
| | | 1,2-HEXANEDIOL | 10.0 | 10.0 |

TABLE 22-continued

| AQUEOUS DYE INK | | Y-ink1 | Y-ink2 |
|---|---|---|---|
| ACETYLENE-BASED SURFACTANT | OLFINE E1010 | 1.0 | 1.0 |
| PURE WATER | | BALANCE | BALANCE |
| TOTAL | | 100.0 | 100.0 |

(Dye)

YE-1: Compound Represented by the Following Formula (YE-1)

[Chem. 34]

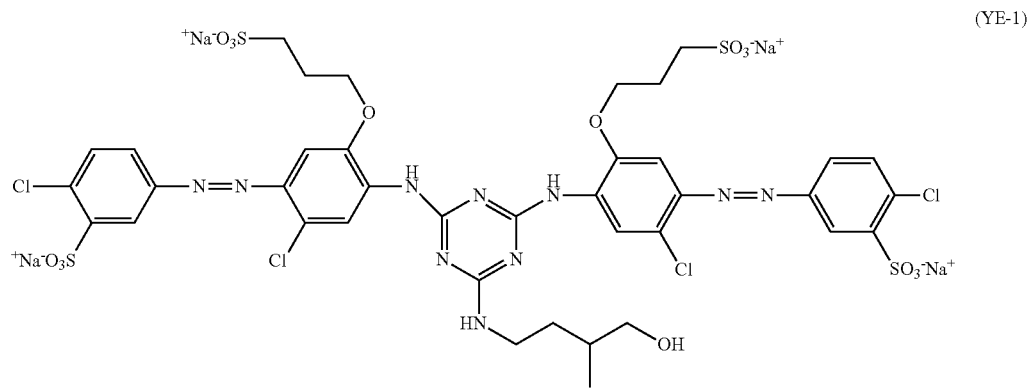

(YE-1)

YE-2: Compound Represented by the Following Formula (YE-2)

[Chem. 35]

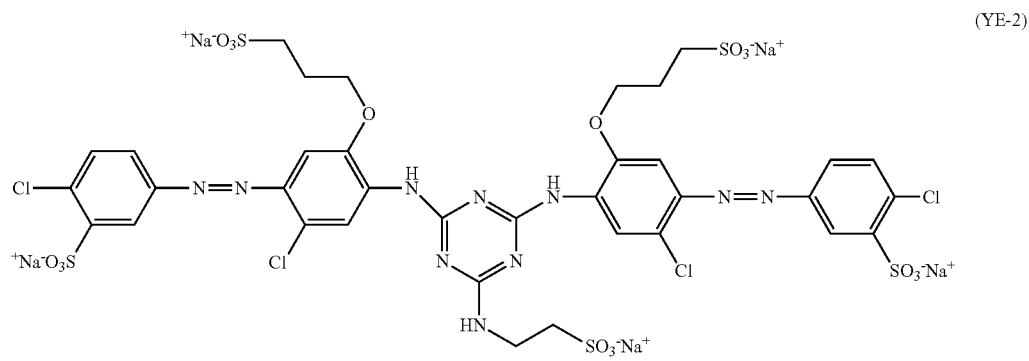

(YE-2)

Preparation of Aqueous Pigment Ink

Materials were mixed with each other to have compositions shown in the following Table 23 and then sufficiently stirred, so that respective ink compositions were obtained. In particular, the materials were uniformly mixed with each other and then filtrated with a filter to remove insoluble materials, so that the respective inks were prepared. In addition, in the following Table 23, the numerical unit of the value indicates percent by mass, and the total indicates 100.0 percent by mass.

TABLE 23

| AQUEOUS PIGMENT INK | | | B-ink1 |
|---|---|---|---|
| COMPOSITION (PERCENT BY MASS) | SELF-DISPERSIBLE PIGMENT | | 4.0 |
| | ORGANIC SOLVENT | GLYCERIN | 5.0 |
| | | TEGmBE | 5.0 |
| | ACETYLENE-BASED SURFACTANT | OLFINE E1010 | 1.0 |
| | PURE WATER | | BALANCE |
| TOTAL | | | 100.0 |

Self-dispersible pigment: carbon black "CW-1" (product name, manufactured by Orient Chemical Industries Co., Ltd.)

TEGmBE: triethylene glycol monobutyl ether

Evaluation of Aggregation Suppression

After all the aqueous color dye inks and the aqueous pigment ink shown in Table 24 were mixed with each other so that the amounts thereof were equivalent to each other, by using a zeta-potential & particle size analyzer "ELSZ-1000" (trade name, manufactured by Otsuka Electronics Co., Ltd.), an average particle diameter was measured. In addition, according to the result obtained by measurement of the aqueous pigment ink before the mixing, the average particle diameter was 150 nm. The evaluation criteria are as described below.

Evaluation Criteria
S: an average particle diameter of less than 350 nm.
A: an average particle diameter of 350 to less than 400 nm.
B: an average particle diameter of 400 to less than 500 nm.
C: an average particle diameter of 500 to less than 1,000 nm.
D: an average particle diameter of 1,000 nm or more.

Evaluation of Suppression of Deposit Generation

An ink jet printer "EW-M630" (product name, manufactured by Seiko Epson Corporation) was used which included a cap to collectively cap ink ejection ports, the cap being composed of the same member as that forming the ejection ports. In ink cartridges of the ink jet printer described above, the aqueous dye inks and the aqueous pigment ink shown in Table 24 were filed. Subsequently, at a temperature of 40° C. and a relative humidity of 20%, printing was continuously performed for two weeks while nozzle cleaning was outputted once per ten minutes. After the printing was performed, the presence or absence of deposits in the cap was confirmed, and the evaluation was performed in accordance with the following criteria.

Evaluation Criteria
A: No deposits are generated.
C: Deposits are generated.

Degradation Test

In ink cartridges of an ink jet printer "EP-30VA" (trade name, manufactured by Seiko Epson Corporation), the aqueous dye inks and the aqueous pigment ink shown in Table 24 were filed. By the ink jet printer, a Gray pattern (JEITA CP-3901B) was recorded on a recording medium "Photo Paper (Gloss)" (manufactured by Seiko Epson Corporation) by selecting "no color correction" as the mode. Subsequently, a recorded matter thus obtained was exposed to an environment at an ozone concentration of 5 ppm for 40 hours (degradation test corresponding to exposure for 10 years). The optical density (hereinafter, simply referred to as "OD" in some cases) of each of cyan, magenta, yellow, and black colors of the image thus stored was measured using an optical densitometer "i1" (product name, manufactured by X-rite), and the imbalance was calculated by the following equation.

$$\text{Imbalance} = (\text{OD remaining rate}_{max} \text{ after exposure}) - (\text{OD remaining rate}_{min} \text{ after exposure})$$

In the equation, the OD remaining rate$_{max}$ after exposure indicates the maximum OD remaining rate among those of the colors, and the OD remaining rate$_{min}$ after exposure indicates the minimum OD remaining rate among those of the colors. In addition, the OD remaining rate is represented by the following equation.

$$\text{OD remaining rate (\%)} = (\text{OD after measurement}) / (\text{OD before measurement}) \times 100$$

Evaluation Criteria
A: maximum imbalance after exposure is less than 10%.
B: maximum imbalance after exposure is 10% to less than 15%.
C: maximum imbalance after exposure is 15% or more.

TABLE 24

|  |  | EXAMPLE 1 | EXAMPLE 2 | EXAMPLE 3 | EXAMPLE 4 | EXAMPLE 5 | EXAMPLE 6 | EXAMPLE 7 | COMPARATIVE EXAMPLE 1 | COMPARATIVE EXAMPLE 2 | COMPARATIVE EXAMPLE 3 |
|---|---|---|---|---|---|---|---|---|---|---|---|
| AQUEOUS DYE INK (CYAN) | TYPE | C-ink1 | C-ink2 | C-ink3 | C-ink1 | C-ink1 | C-ink4 | C-ink5 | C-ink6 | C-ink7 | C-ink8 |
|  | DYE | CE-1 | CE-2 | CE-3 | CE-1 | CE-1 | CE-1 | CE-3 | CE-4 | CE-4 | CE-1 |
|  | NUMBER OF BENZENE RING STRUCTURES OF DYE OTHER THAN PHTHALOCYANINE SKELETON | 0 | 2 | 0 | 0 | 0 | 0 | 0 | 8 | 8 | 0 |
|  | POLY(OXYALKYLENE) ALKYL ETHER (PERCENT BY MASS) | 1.0 | 1.0 | 1.0 | 1.0 | 1.0 | 1.0 | 1.0 | 1.0 | 1.0 | 0 |
|  | AMOUNT OF MONOVALENT CATIONS [ppm] | 800 | 1200 | 1400 | 800 | 800 | 800 | 2100 | 2400 | 1600 | 800 |
| AQUEOUS DYE INK (MAGENTA) | TYPE | M-ink1 | M-ink1 | M-ink1 | M-ink1 | M-ink2 | M-ink1 | M-ink1 | M-ink1 | M-ink1 | M-ink1 |
|  | DYE | ME-1 | ME-1 | ME-1 | ME-1 | ME-2 | ME-1 | ME-1 | ME-1 | ME-1 | ME-1 |
|  | AMOUNT OF MONOVALENT CATIONS [ppm] | 2400 | 2400 | 2400 | 2400 | 3200 | 2400 | 2400 | 2400 | 2400 | 2400 |
| AQUEOUS DYE INK | TYPE | Y-ink 1 | Y-ink 1 | Y-ink 1 | Y-ink2 | Y-ink 1 | Y-ink1 | Y-ink1 | Y-ink 1 | Y-ink 1 | Y-ink1 |
|  | DYE | YE-1 | YE-1 | YE-1 | YE-2 | YE-1 | YE-1 | YE-1 | YE-1 | YE-1 | YE-1 |

TABLE 24-continued

|  |  | EXAMPLE 1 | EXAMPLE 2 | EXAMPLE 3 | EXAMPLE 4 | EXAMPLE 5 | EXAMPLE 6 | EXAMPLE 7 | COMPARATIVE EXAMPLE 1 | COMPARATIVE EXAMPLE 2 | COMPARATIVE EXAMPLE 3 |
|---|---|---|---|---|---|---|---|---|---|---|---|
| (YELLOW) | AMOUNT OF MONOVALENT CATIONS [ppm] | 5000 | 5000 | 5000 | 7000 | 5000 | 5000 | 5000 | 5000 | 5000 | 5000 |
| AQUEOUS DYE INK (BLACK) | TYPE | B-ink1 | B-ink1 | B-ink1 | B-ink 1 | B-ink1 | B-ink1 | B-ink1 | B-ink1 | B-ink1 | B-ink1 |
| EVALUATION | EVALUATION OF AGGREGATION SUPPRESSION | S | A | B | B | B | A | B | D | C | C |
|  | EVALUATION OF DEPOSIT GENERATION SUPPRESSION | A | A | A | A | A | A | A | C | C | C |
|  | DEGRADATION TEST | A | B | B | B | B | A | B | B | C | A |

According to the results of the examples and the comparative examples, it is found that by the ink set according to this embodiment, the generation of deposits in the cap of the ink jet recording apparatus can be suppressed.

From the results of Example 1 and Comparative Examples 1 and 2, it is found that as the predetermined dye according to this embodiment, when the predetermined copper phthalocyanine compound is contained, the aggregation of the pigment can be suppressed, and the generation of deposits in the cap of the ink jet recording apparatus can be further suppressed.

From the results of Examples 1 and 6 and Comparative Example 3, it is found that since the poly(oxyalkylene) alkyl ether is contained, the effects of the present application can be obtained.

From the results of Examples 1 to 3, it is found that since the predetermined dye according to this embodiment has an aliphatic hydrocarbon chain having at least three carbon atoms, an aggregation suppression effect and a deposit generation suppression effect can be further improved. From the results of Examples 1 and 2, it is found that since the number of the aromatic ring structures other than the phthalocyanine skeleton in the predetermined dye according to this embodiment is two or less, the aggregation suppression effect and the deposit generation suppression effect can be further improved.

From the results of Examples 1 and 4, it is found that since the third dye according to this embodiment is a dye represented by the formula (Y-1), and $A^1$ is a group represented by the formula ($A^1$-1), the aggregation suppression effect can be further improved, and an excellent result can be obtained in the degradation test.

From the results of Examples 1 and 5, it is found that since the second dye according to this embodiment is a dye represented by the formula (M-1), the aggregation suppression effect can be further improved, and an excellent result can be obtained in the degradation test.

From the results of Example 7 and the other examples, it is found that since the amount of monovalent cations in the aqueous dye ink according to this embodiment is 2,000 ppm or less, the aggregation suppression effect can be further improved.

What is claimed is:

1. An ink jet ink set comprising:
   an aqueous dye ink; and
   an aqueous pigment ink,
   wherein the ink jet ink set is an ink set to be used for an ink jet recording apparatus which includes a first ejection port to eject the aqueous dye ink, a second ejection port to eject the aqueous pigment ink, and a cap to collectively cap the first ejection port and the second ejection port, the cap being composed of the same member as that forming the first ejection port and the second ejection port,
   the aqueous dye ink contains a dye and a poly(oxyalkylene) alkyl ether,
   the poly(oxyalkylene) alkyl ether is either polyethylene glycol 2-ethylhexyl ether or polyethylene glycol oleyl ether,
   the dye includes a copper phthalocyanine compound having two or less benzene ring structures other than a phthalocyanine skeleton,
   the aqueous pigment ink contains a self-dispersible pigment,
   the aqueous dye ink contains monovalent cations at an amount of 1400 ppm or less,
   wherein the copper phthalocyanine compound is a compound represented by the following formula (C-1):

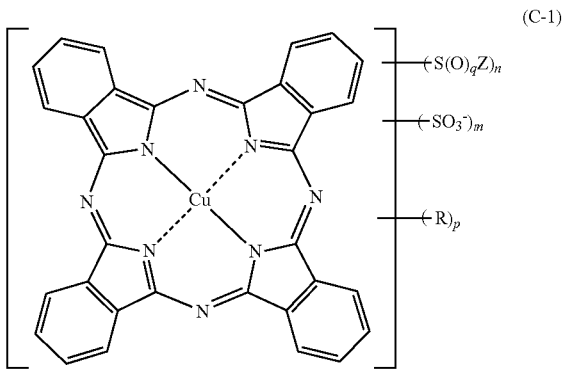

(C-1)

where in the formula (C-1), each q independently represents an integer of one to three: each Z independently represents a substituted or unsubstituted alkyl group, a substituted or unsubstituted monoalkylamino group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, and at least one Z has an ionic hydrophilic group as a substituent: each R independently represents a halogen atom, an alkyl group, a cycloalkyl group, an alkenyl group, an aralkyl group, an aryl group, a heterocyclic group, a cyano group, a hydroxyl group, a nitro group, an amino group, an alkylamino ureido group, a sulfamoylamino group, an amide group, an arylamino group, an alkoxycarbonylamino group, a sulfonamino group, a carboxyl group, a sulfamoyl group, an alkoxycarbonyl group, a heterocyclic oxy group, an azo group, an acyloxy group, a carbamoloxy group, a siloxy group, an aryloxycarbonyl group, an aryloxycarbonylamino group, an imide group, a heterocyclic thio group, a phosphoryl group, an acyl group, or an ionic hydrophilic group, and those groups each further have no substituents or at least one substituent: n represents an Integer of one to four; m represents an integer of zero to four; p represents an integer of zero to eight; and n+m+p represents an integer of 1 to 12, and wherein $S(O)_q Z$ in the formula (C-1) represents at least one group represented by the following formula (C1-3):

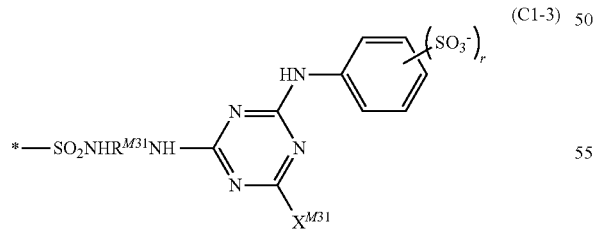

in the formula (C1-3), $R^{M31}$ represents a divalent hydrocarbon group having one to six carbon atoms, $X^{M31}$ represents a chlorine atom, a hydroxyl group, an alkoxygroup, an amino group, or a dialkylamino group, r represents an integer of one to three, * represents a bonding site, and the alkyl group of the alkoxygroup or the dialkylamino has no substituents or at least one substituent.

2. The ink jet ink set according to claim 1,
wherein the dye has an aliphatic hydrocarbon chain having at least three carbon atoms.

3. The ink jet ink set according to claim 1,
wherein the number of the benzene ring structures other than a phthalocyanine skeleton in the copper phthalocyanine compound is two or less.

4. The ink jet ink set according to claim 1, further comprising: an aqueous dye ink containing a dye represented by the following formula (Y-1),

[Chem. 5]

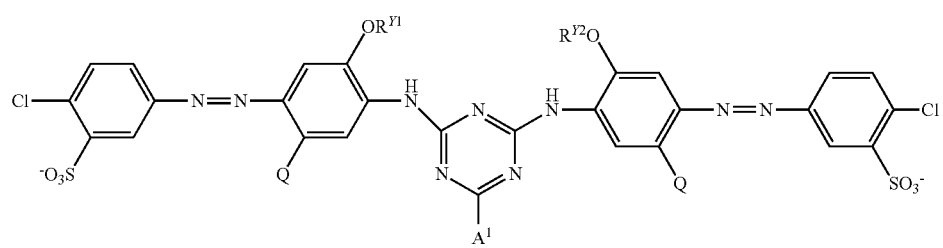

where in the formula (Y-1), O's each independently represent a halogen atom, $R^{Y1}$ and $R^{Y2}$ each independently represent an alkyl group substituted with an ionic hydrophilic group, and $A^1$ represents a group represented by the following formula (A1-1), a monoalkylamino group having a sulfo group, an alkoxy-substituted alkylamino group, a monoalkylamino group, a monoalkylamino group having at least two hydroxyl groups, or a cyclic amino group, and

[Chem. 6]

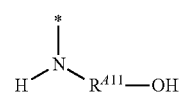

in the formula (A1-1), $R^{411}$ represents a branched chain alkylene group, and * represents a bonding site.

5. The ink jet ink set according to claim 1, further comprising: an aqueous dye ink containing a dye represented by the following formula (M-1),

[Chem. 7]

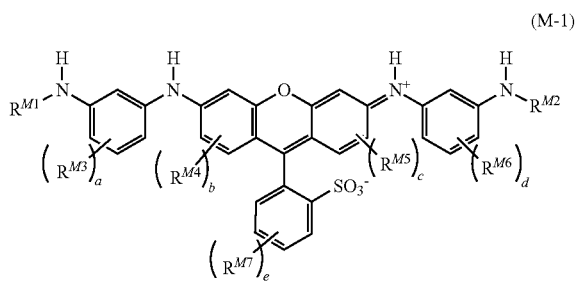

wherein in the formula (M-1), $R^{M1}$ and $R^{M2}$ each independently represent a substituted or unsubstituted alkyl group, a substituted or unsubstituted aryl group, a substituted or unsubstituted heterocyclic group, a substituted or unsubstituted alkylsulfonyl group, a substituted or unsubstituted arylsulfonyl group, a substituted or unsubstituted alkoxycarbonyl group, a substituted or unsubstituted aryloxycarbonyl group, a substituted or unsubstituted carbamoyl group, a substituted or unsubstituted monoalkylaminocarbonyl group, a substituted or unsubstituted dialkylaminocarbonyl group, a substituted or unsubstituted monoarylaminocarbonyl group, a substituted or unsubstituted diarylaminocarbonyl group, or a substituted or unsubstituted alkylarylaminocarbonyl group; $R^{M3}$, $R^{M4}$, $R^{M5}$, $R^{M6}$, and $R^{M7}$ each independently represent a substituent; a, d, and e each independently represent an integer of zero to four, and b and c each independently represent an integer of zero to three.

\* \* \* \* \*